(12) United States Patent
Chatlain et al.

(10) Patent No.: US 7,698,224 B2
(45) Date of Patent: Apr. 13, 2010

(54) SYSTEM AND METHOD FOR CERTIFICATION

(75) Inventors: David R Chatlain, Wichita, KS (US); Amy V Lim, Wichita, KS (US)

(73) Assignee: The Boeing Company, Chicago, IL (US)

( * ) Notice: Subject to any disclaimer, the term of this patent is extended or adjusted under 35 U.S.C. 154(b) by 969 days.

(21) Appl. No.: 11/374,642

(22) Filed: Mar. 13, 2006

(65) Prior Publication Data

US 2007/0226693 A1    Sep. 27, 2007

(51) Int. Cl.
*G06F 17/60* (2006.01)
(52) U.S. Cl. .............................. 705/51; 705/64; 705/6; 705/1
(58) Field of Classification Search ................ 705/51, 705/64, 67, 1
See application file for complete search history.

(56) References Cited

U.S. PATENT DOCUMENTS

| 5,828,969 | A | 10/1998 | Chamney et al. | |
|---|---|---|---|---|
| 6,535,890 | B2 | 3/2003 | Sandifer | |
| 6,993,448 | B2 * | 1/2006 | Tracy et al. | 702/119 |
| 7,324,954 | B2 * | 1/2008 | Calderaro et al. | 705/10 |
| 7,356,483 | B2 | 4/2008 | Shirley et al. | |
| 7,380,270 | B2 * | 5/2008 | Tracy et al. | 726/3 |
| 2003/0004783 | A1 * | 1/2003 | Calderaro et al. | 705/10 |
| 2003/0004967 | A1 * | 1/2003 | Calderaro et al. | 707/104.1 |
| 2003/0086536 | A1 * | 5/2003 | Salzberg et al. | 379/15.02 |

FOREIGN PATENT DOCUMENTS

JP     2002032538 A  *  1/2002

\* cited by examiner

*Primary Examiner*—Pierre E Elisca
(74) *Attorney, Agent, or Firm*—Harness, Dickey & Pierce, P.L.C.

(57) ABSTRACT

A method of preparing a certification project plan for certifying compliance for a mobile platform project with predefined regulations is provided. The method includes defining the project in a software system and defining a certification plan for the project in the software system. The method also includes selecting authorized representatives based on their delegated authorities from a database to carry out the certification plan. The method can include verifying the completion of the certification plan and generating at least one document to indicate that the mobile platform is in compliance based on the completed certification plan.

15 Claims, 51 Drawing Sheets

Welcome to JustCert!

| Home | Templates | FAR's | Projects | Plans | Reports | Admin | Help |

New Record —1029

1016

Please select a table:
F8100 Default Values

1030

| F8100 DEFAULT TYPE | NOTE DAS A | NOTE DAS B | NOTE STC A | NOTE STC B | APPLICANT | NOTE SUPERCEDE |
|---|---|---|---|---|---|---|
| Airplane | This Data approval is in support of Organizational Designation Project No. and DOES NOT constitute DER approval of the data listed herein and is not valid for any other purpose or application. | This Data approval is in support of Organizational Designation Project No. and DOES NOT constitute DER approval of the data listed herein and is not valid for any other purpose or application. | | | The Boeing Company - Wichita Division | This 8100-9 supercedes a previous approval. |

Delete Edit Not editable
1026  1028

FIG. 7

Welcome to JustCert!

| Home | Templates | FAR's | Projects | Plans | Reports | Admin | Help |

Cert Basis for Project

117  106                                                                56 — [Update]   AR's  Properties To add FAR's for a project, check the desired FAR's on the Available list and click the 'Add' button
                                                                            130        132
[_____] Filter
⊙ FAR's    ○ Special Rules  120   122                [Please select a project_____▼] Copy Available FAR's                                      Selected Certification Basis
  FAR  Amendment Latest Title                          FAR   Amendment Latest Title 103
  ☐ 25.2  [25-99]   x   Special retroactive            ☐ 25.1    [25-00]   x   Applicability.
                        requirements.
  ☐ 25.2  [25-72]       Special retroactive   [Add >]  ☐ 25.51   [25-38]   x   [Deleted.]
                        requirements.                  ☐ 25.301  [25-23]   x   Loads.
                                              124
  ☐ 25.2  [25-67]  118  Special retroactive            ☐ 25.303  [25-23]   x   Factor of safety
                        requirements.
  ☐ 25.2  [25-20]       Special retroactive            ☐ 25.305  [25-54]       Strength and
                        requirements.                                          deformation.
  ☐ 25.2  [25-17]       Special retroactive            ☐ 25.307  [25-72]   x   Proof of structure.
                        requirements.       128
  ☐ 25.2  [25-15]       [Special retroactive           ☐ 25.307  [25-54]       Proof of structure.
                        requirements.]      [< Delete]
  ☐ 25.21 [25-7]        Proof of compliance.           ☐ 25.365  [25-00]       Pressurized cabin
                                                                               loads.
  ☐ 25.21 [25-72]  x    Proof of compliance.  [Delete All]
  ☐ 25.21 [25-42]       Proof of compliance.    129    ☐ 25.471  [25-23]   x   General.
  ☐ 25.21 [25-23]       Proof of compliance.           ☐ 25.561  [25-91]   x   General.
  1 2 3 4 5 6 7 8 9 10 ...                             1 2 3 4 5
          126           116                                126         108
                                             107

Welcome to JustCert!

| Home | Templates | FAR's | Projects | Plans | Reports | Admin | Help |

Plans

[New] [Delete] [Edit Properties] [Edit Structure] —172  [New Rev] [Submit] —220

☑ Show Latest  |0000-RJ001-01 ▼|  |Please select an AR ... ▼|

| Plan | Status | Date Created | Revision | Cert Focal |
|---|---|---|---|---|
| —159 | —164 | —166 | —168 | —170  160 |
| ☐ Amy Test Plan | WIP | Jan 19, 2006 | 1 | Anderson, Steve |
| ☐ Bugs | WIP | Nov 07, 2005 | 1 | Spiker, Rebecca |
| ☑ Environmental Control Systems | Draft | Jan 13, 2006 | 1 | Heinz, Phil |
| ☐ Flower | Complete | Nov 07, 2005 | 1 | Spiker, Rebecca |

Welcome to JustCert!

| Home | Templates | FAR's | Projects | Plans | Reports | Admin | Help |

Plan structure for plan : Environmental Control Systems

—171

[New Feature] [Add] [Delete] [Edit]    Plan Properties  [Submit]

|Please select an area to filter the plan by ... ▼|  |Please select an AR to filter the plan by ... ▼|

167  ⊞ First Feature  Keep this one

Welcome to JustCert!

| Home | Templates | FAR's | Projects | Plans | Reports | Admin | Help |

Form F8100-9 Edit

[Close] 440

To create a new form, fill in the following fields and click 'Save':

[New F8100-9] 456 [Copy Form] 458 [Preview F8100] 430 [Save] 448

Forms: Form #601 Approved 13-FEB-06 ▼ 447

Delete: Please select a form to open... — Form #601 Approved 13-FEB-06 — 462

446 ↓

Approved By Chatlain, David

Approved On 13-FEB-06

Available Documents    Select All    Unselect All
123-12521321    401

Note
This is an optional note that is available for the AR to specify limitations. — 422

Purpose of Data
The Purpose of Data statement goes here. — 424

☐ Recommend approval    ☑ Approve — 436 / 438

AR Note (User comments. Does not show on F8100-9) — 426
This is an optional reference only comment area for the AR to maintain as side notes.

FIG. 64

SYSTEM AND METHOD FOR CERTIFICATION

FIELD

The present disclosure relates to software systems, and more particularly to a software-based Federal Aviation Administration (FAA) certification process management tool.

BACKGROUND

The FAA defines the many requirements for achieving FAA certification of a new or modified aircraft. As defined in FAA Order 8110.4 and additional related writings, an aircraft can be "Type Certified" when there is proof that the aircraft is compliant with every applicable rule during every condition for which the aircraft is designed to operate. The process required to identify the applicable rules and document design compliance is called "Type Certification" and is governed by federal law.

The first difficulty with certification can be the complexity of the process required to identify the applicable rules in a situation where each design detail can be affected by several specific rules. Under FAA Order 8110.4, the FAA requires the applicant to submit a certification plan that identifies all of the rules that apply to each part of the design. Without expert involvement, the applicability of specific rules can be difficult to ascertain due to the large number of rules (some with several amendments), the requirements for compliance with an individual rule may not be obvious, and the interactions between different rules are often affected by the versions of the rules applicable to a particular aircraft.

Although the FAA exclusively reserves the right to determine if a particular configuration is compliant with the applicable rules, they use a system of delegations defined under FAA Order 8100.9 and additional related writings to designate Authorized Representatives (AR). Those ARs are delegated authority in specific functional areas to complete findings of compliance on behalf of the FAA.

Certification plan development can also be limited by the level of detail included in the design proposal. The rules that "belong" in the certification plan may change as the design matures, so the certification plan must have some flexibility to document changes in the requirements (and the compliance plan) as the product definition is completed. This can be a significant limitation with traditional planning tools.

Typically, the certification plan can be developed on paper. The paper plan does not reflect the dynamic nature of the engineering environment, can be cumbersome to develop and distribute, can be difficult to revise and coordinate, and can be especially hindered when there are wide geographic separations between the engineering team and the FAA approvers. Accordingly, it would be desirable to provide a software system for managing all these aspects of the FAA certification process.

SUMMARY

The present teachings provide a method of preparing a certification project plan for certifying compliance for a mobile platform project with regulations in a software system. The method includes defining the project in the software system and defining a certification plan for the project in the software system. The method can also include selecting authorized representatives (ARs), based on their assigned delegated authorities, from a database to carry out the certification plan. The method can include verifying the completion of the certification plan and generating at least one document to indicate that the mobile platform is in compliance based on the completed certification plan.

The present teachings also provide a method of preparing a certification project plan for certifying compliance for a project with regulations in a software system. The method includes defining the certification project plan in the software system, where the project includes at least one element. The method also includes defining a certification basis for the element in the software system and selecting ARs, based on their delegated authorities, from a database for the certification of the element. The method can further include selecting a means of compliance (MOC) of the element and transmitting the certification basis for the element, including the MOC, to the ARs for approval.

Further areas of applicability of the present disclosure will become apparent from the detailed description provided hereinafter. It should be understood that the detailed description and specific examples, while indicating various embodiments of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 7 illustrates the "Master Tables" tab of the "Admin" drop-down list displaying the "F8100 Default Values" selection;

FIG. 21 illustrates the screen of the software for forming the certification basis for the project through the selection of applicable regulations;

FIG. 23 illustrates the "Plan Properties" screen of the software for defining a plan in the project;

FIG. 24 illustrates the "Plan structure" screen of the software showing the hierarchy of the plan;

FIG. 25 illustrates the "Plans" screen of the software for listing plans associated with a particular project;

FIG. 26 illustrates the "Plan structure" screen of the software during a first procedure used to define the plan;

FIG. 59 illustrates the "Form F8100-9 Edit" screen and a second procedure used by the AR to review compliance to the plan;

FIG. 60 illustrates the "Form F8100-9 Edit" screen and a third procedure used by the AR to approve compliance to the plan;

FIG. 61 illustrates the screen for a draft of a form F8100-9;

FIG. 62 illustrates a procedure used to approve the Form 8100-9 from the "Form F8100-9 Edit" screen;

FIG. 64 illustrates the procedure used from the "Form F8100-9 Edit" screen to revise an approved Form 8100-9;

DETAILED DESCRIPTION OF THE EMBODIMENTS

The following description of the embodiment(s) is merely exemplary in nature and is in no way intended to limit the disclosure, its application, or uses.

Although the following description is related generally to a certification tool for managing and automating a certification plan for an aircraft according to various FAA regulations (such as Title 14 of Code of Federal Regulations, Part 25, 34 and 36 regulations and their specific amendments, including special rules (FARs)), it will be understood that the certification tool as described and claimed herein can be used with any appropriate application. In addition, it will be noted that the principles disclosed herein could also be applicable to various other processes besides regulation-based certification. Therefore, it will be understood that the following discussions are not intended to limit the scope of the appended claims.

Figure 1:
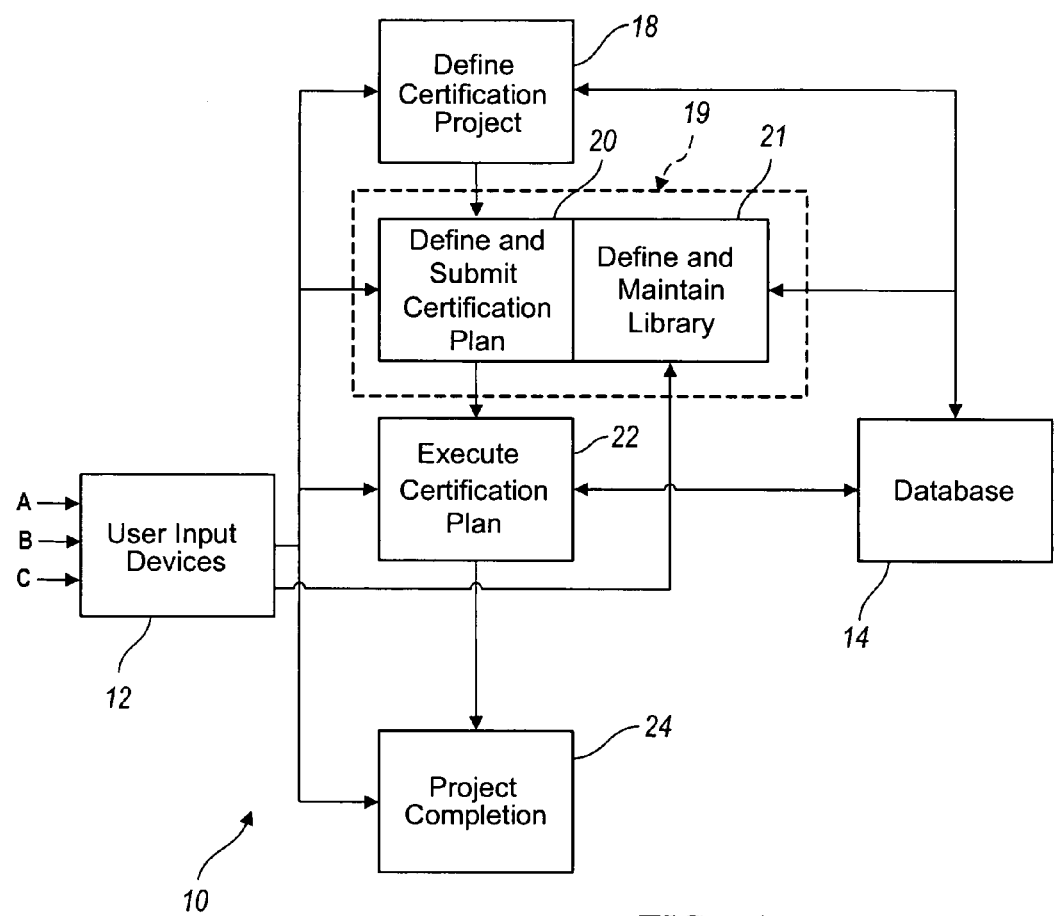
FIG. 1 is a simplified block diagram of the major modules of an embodiment of the system and method of the present disclosure.

With reference now to FIG. 1, a certification tool 10 is shown. The certification tool 10 can be used to enable the users to prepare a certification project plan for certifying compliance for an aircraft project with regulations, such as the FARs. The certification tool 10 can be implemented as a user-friendly software program adapted to run on suitable user input devices 12, such as a computer system. The user input device 12 enables a plurality of users to input information as needed into the certification tool 10. The certification tool 10 interfaces with a relational database 14 to provide additional information to the user input device 12 and to store information received through the user input device 12. The database 14 stores information related to the certification project and certification plan, or plans related to the project, and all relevant information to the certification tool 10, such as the applicable FARs.

The major modules of the certification tool 10 are shown in FIG. 1. Briefly, the certification tool 10 allows a user to define a certification project at module 18. The certification project can be an aircraft, or any other mobile platform subject to regulations, such as rotorcraft, spacecraft, marine vessels or automobiles. Based on the certification project defined by a originating user A and information received from the database 14, a certification plan is developed in module 19. The certification plan is defined in module 20 by the focal user B and is then submitted for concurrence by an authorized user C. "Concurrence" is the authorized user C's agreement that the regulations and MOC are relevant to the associated configuration item, as will be discussed in greater detail herein. The certification plan can also be available to originating user A to define and maintain a library at module 21. If the certification plan is concurred, at module 22, the execution of the certification plan can begin. The certification plan is executed based on input from an authorized representative (AR) or authorized user C through the user input device 12. Next, at module 24, the certification tool 10 performs project completion, which generally involves issuing the certification document and archiving the certification project, after the execution of the certification plan developed in module 20.

Figure 2:
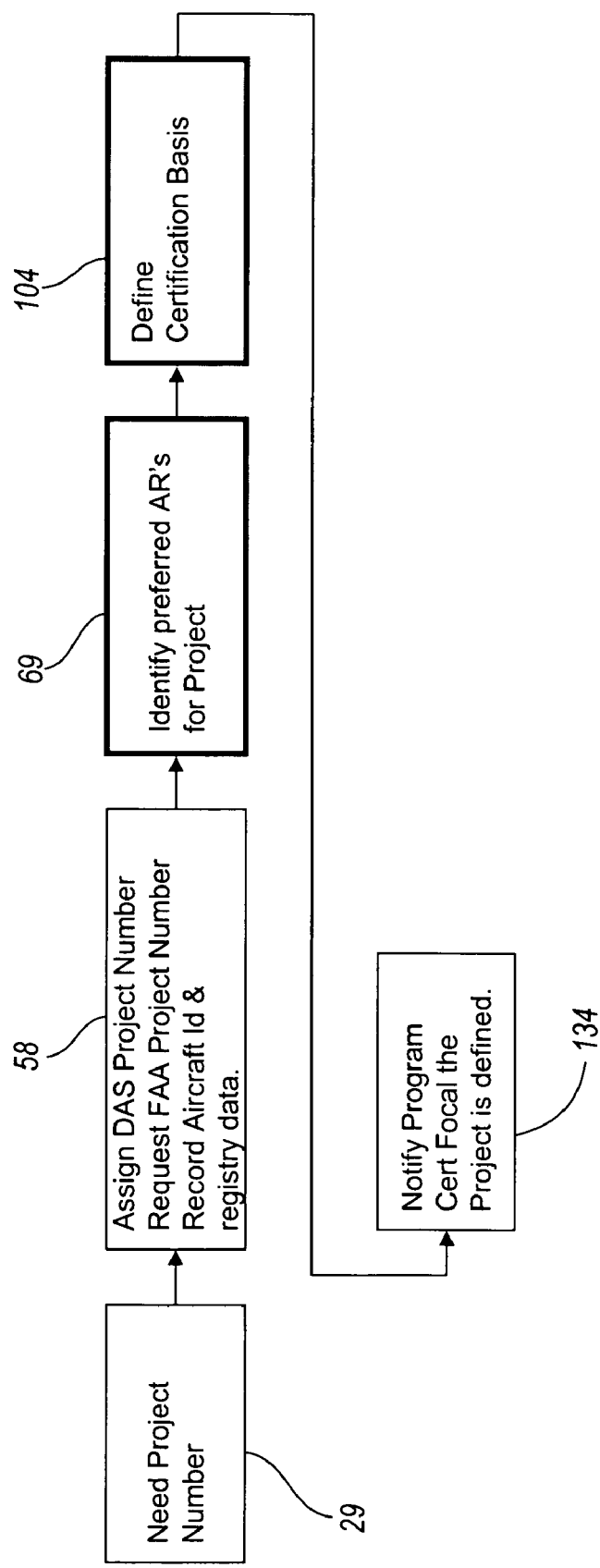
FIG. 2 is a simplified block diagram illustrating the process flow to establish a certification project.
Figures 3, 4:
FIG. 3 illustrates a start-up screen of the software.
FIG. 4 illustrates the screen of the software for creating a new project, including the "Projects" drop-down list.

With additional reference now to FIG. 2, a process flow diagram for defining the certification project at module 18 is shown. In operation 29, the originating user A is requested to provide a project number. In order to define a project, with reference to FIG. 3, the originating user A must select the "Process Tools" button 31 from a home screen 30. The home screen 30 provides a starting point when any user first enters the certification tool 10. The home screen 30 provides access to the functionalities of the certification tool 10 and also selected training related to the certification tool 10. Then, as shown in FIG. 4, a certification project is initiated by the originating user A opening the certification tool 10 and selecting the "New Project" option 32 from the "Project" drop-down list 34 on the "Project Properties" screen 38.

It will be appreciated that the "Project Properties" screen 38, as well as each of the screens subsequently described herein, each include "Home," "Templates," "FARs," "Projects," "Plans," "Reports," "Admin," and "Help" menu tabs. "Home," "Templates," "FARs," "Projects," and "Plans" are described herein.

Figure 13:
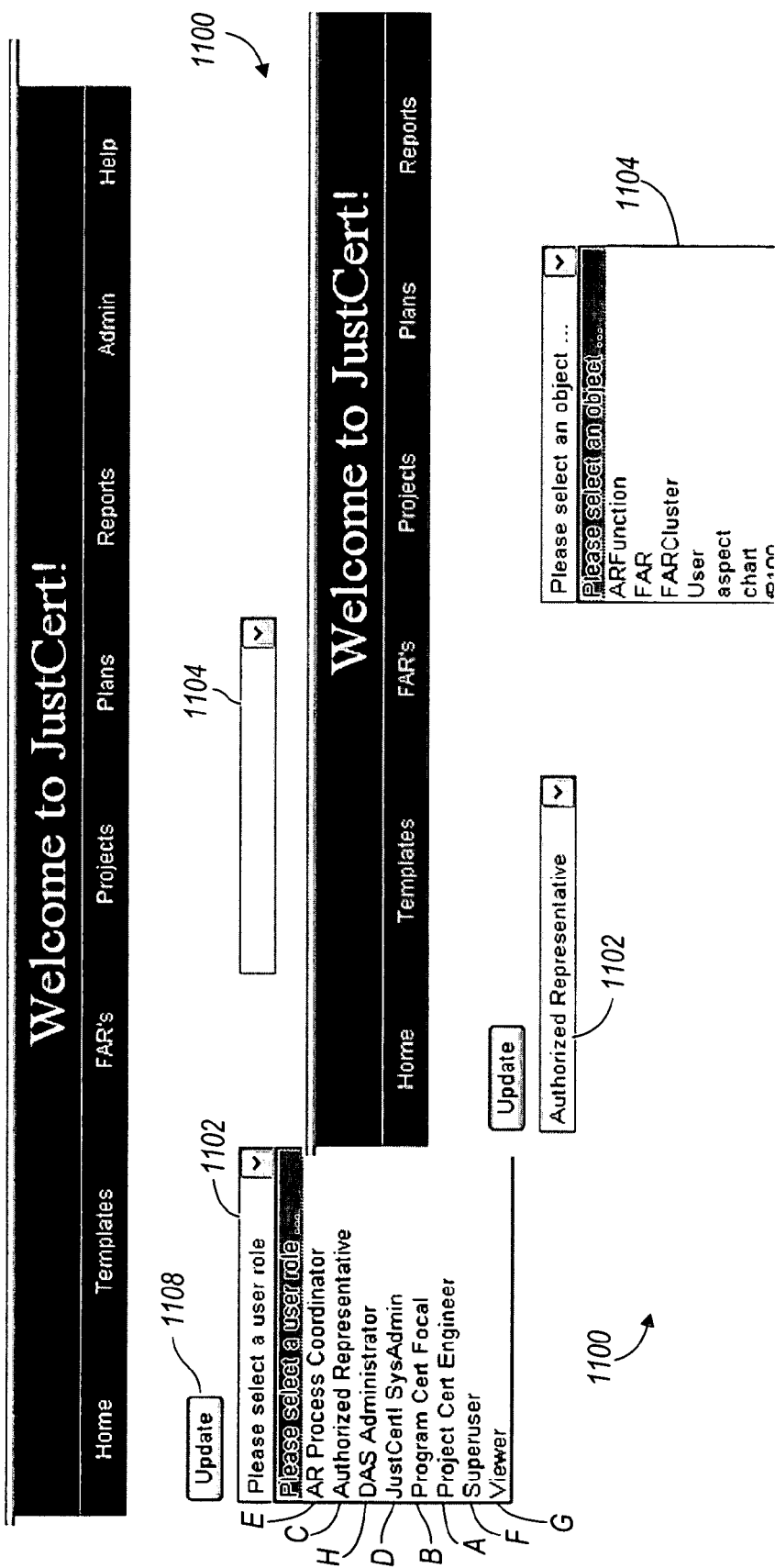
FIG. 13 illustrates the "Privileges" screen of the "Admin" drop-down list.
Figure 14:
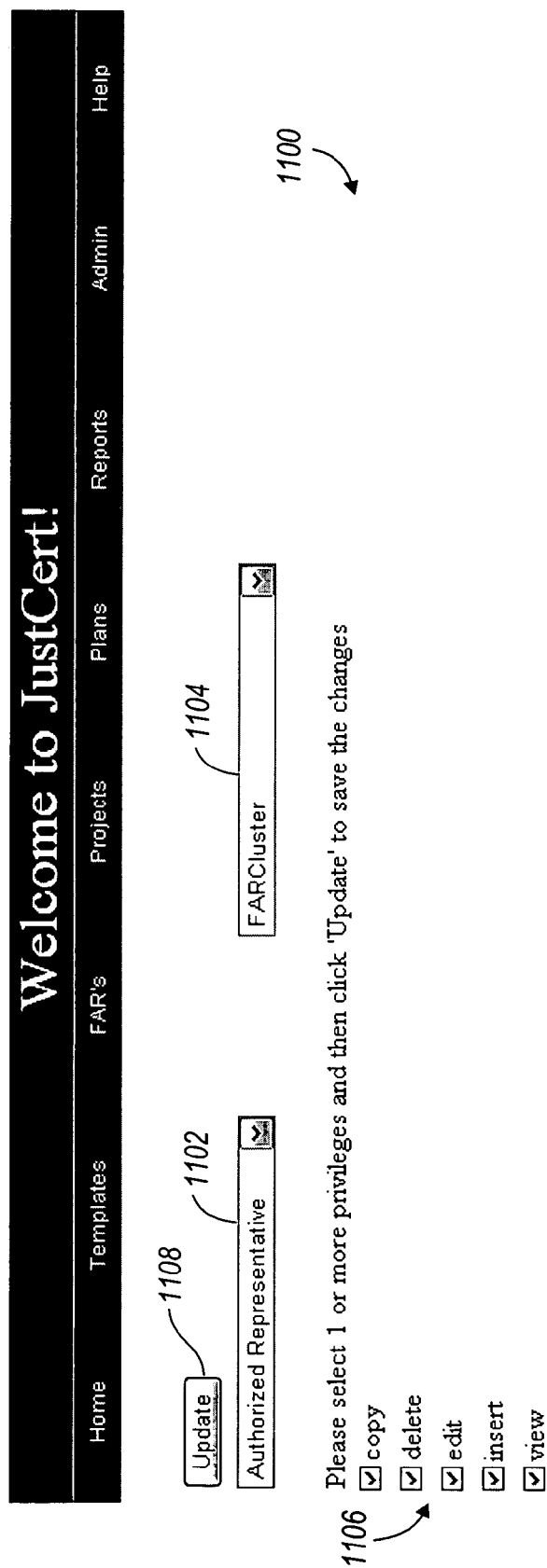
FIG. 14 illustrates the user roles selection of the "Privileges" screen of the "Admin" drop-down list.

Briefly, with reference to FIG. 13, a drop-down list 1102 is shown listing the user roles for the certification tool 10. Generally, eight user roles exist: three have already been described; and the five that remain are the administrative authorities within the certification tool 10. The "Project Cert Engineer" selection is for the person assigned the originating user A responsibilities, which are described herein. The "Program Cert Focal" selection is for the person assigned focal user B responsibilities, as described herein. The "Authorized Representative" selection is for the person assigned the authorized user C responsibilities, as described herein. The "JustCert! SysAdmin" selection identifies an administrative user D who controls the definition and distribution of functions and roles within the certification tool 10. The "AR process coordinator" selection is for a coordinator user E who manages the assignment of authorizations by chart, authorized area and function, as described herein. The "Superuser" F selection is for a user role that is assigned all available authorizations within the certification tool 10 to facilitate software testing, but this user role does not participate in project initiation, certification plan development or data approval. The "Viewer" G selection provides read-only access to authorized individuals for viewing of project, plan or report data. The "DAS Administrator" H selection is for an AR with administrative oversight responsibilities who provides the final approval for project completion (DAS stands for designated alteration station, a title that the FAA gives the delegated authority).

Figure 5:
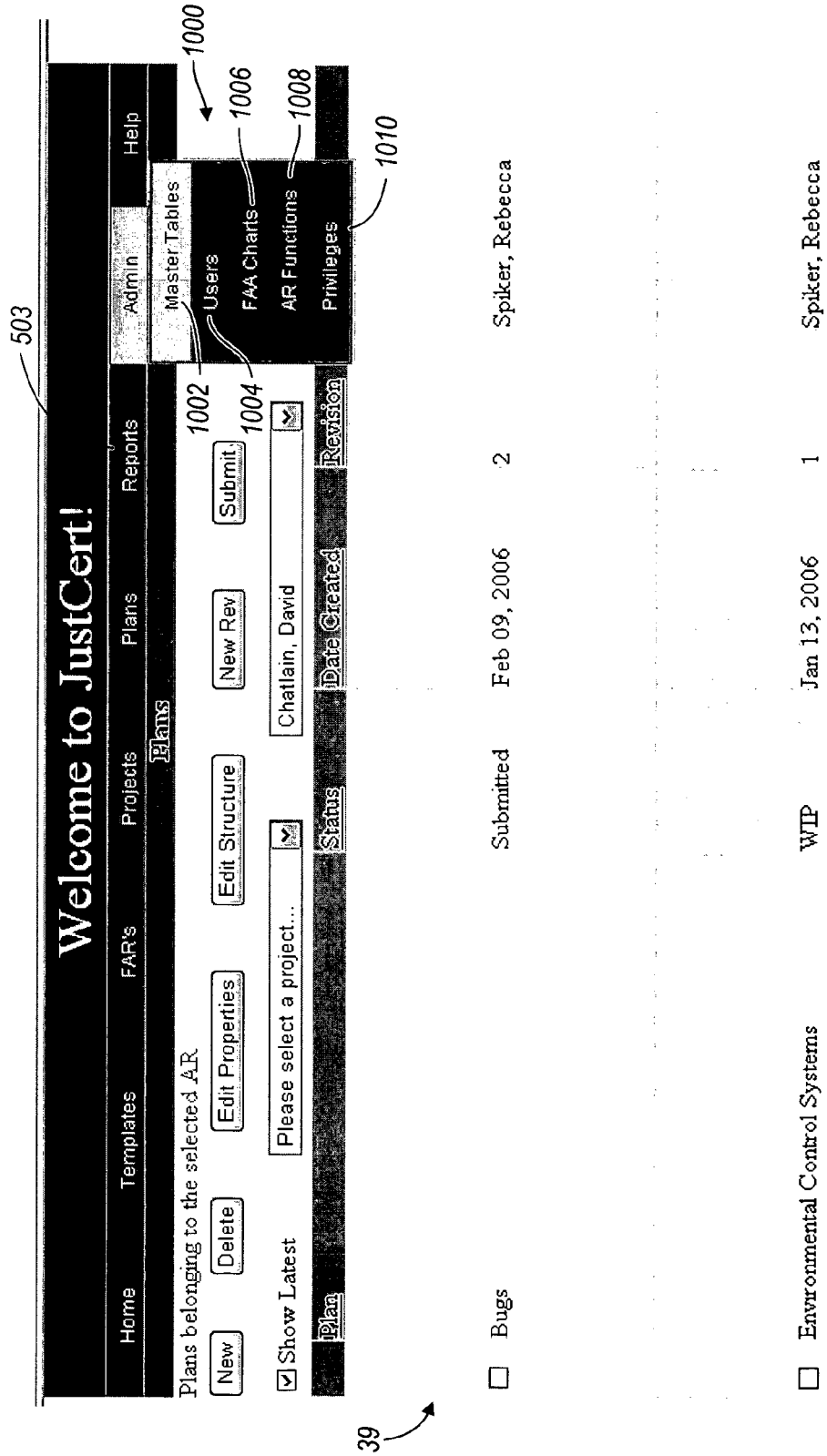
FIG. 5 illustrates the "Admin" drop-down list.

Briefly, with reference to FIG. 5, the "Admin" menu tab and "Admin" drop-down list 1000 is shown on a "Plans" Screen 39. The "Admin" drop-down list 1000 enables access to the certification tool 10 administrator functions. These functions control certain certification tool 10 defaults, the available authorized users C, authorized roles between the users and the assignment of authority, as will be described in greater detail herein. The "Admin" drop-down list 1000 includes the "Master Tables" selection 1002, the "Users" selection 1004, the "FAA Charts" selection 1006, the "AR Functions" selection 1008 and the "Privileges" selection 1010.

Figure 6:
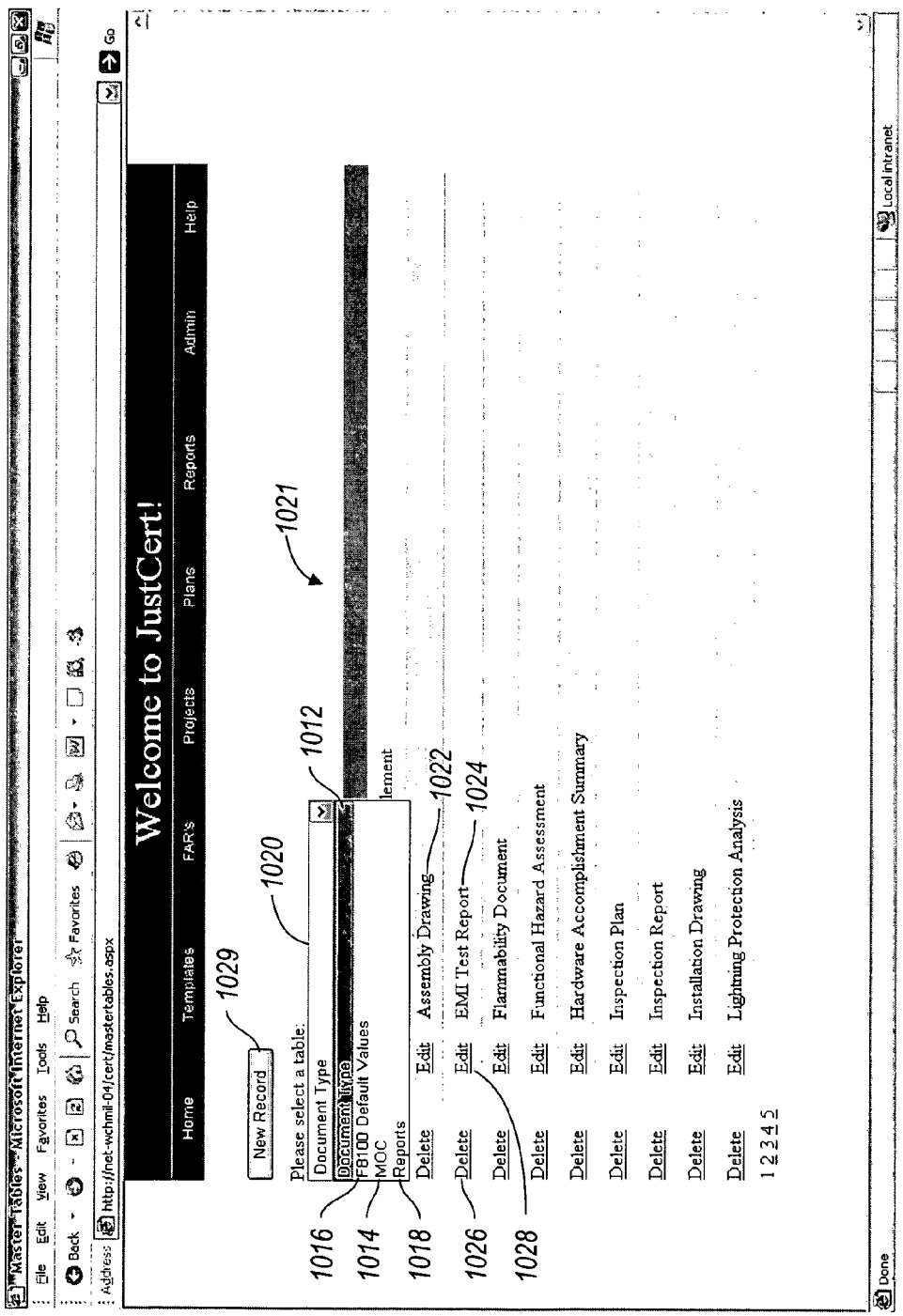
FIG. 6 illustrates the "Master Tables" tab of the "Admin" drop-down list displaying the "Document Type" selection.

With reference to FIG. 6, the "Master Tables" selection 1002 provides access to edit or delete the text selections that the certification tool 10 displays on the "Document Type" selection 1012, "MOC" selection 1014, "F8100 Default Values" selection 1016 and "Reports" selection 1018, as selected from a drop down menu 1020. Once the administrative user D selects either the "Document Type" selection 1012, the "MOC" selection 1014, the "F8100 Default Values" selection 1016 or the "Reports" selection 1018, the defined values for those sections are displayed by the certification tool 10. For example, if the "Document Type" selection 1012 is selected, the certification tool 10 displays all of the document types 1021 included in the database 14 (such as "Assembly Drawing" 1022, "EMI Test Report" 1024, etc.). These document types assist the focal user B during development of the certification plan 20. To manage this data, the administrative user D can select either the "Delete" selection 1026 or the "Edit" selection 1028 to delete or modify the selected document type. Alternatively, the administrative user D can select a "New Record" button 1029 to add a new record to the database 14.

Figure 8:
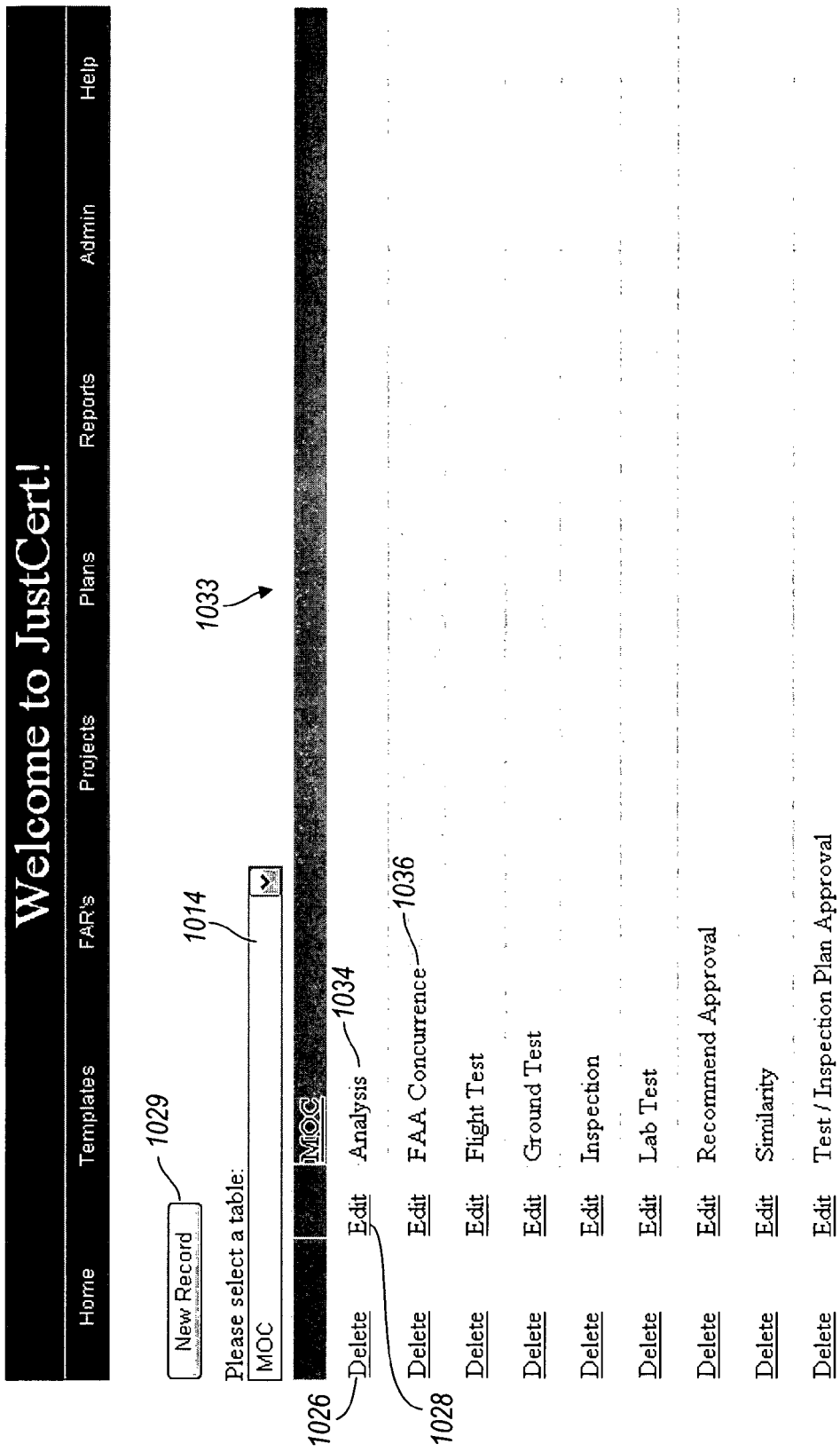
FIG. 8 illustrates the "Master Tables" tab of the "Admin" drop-down list displaying the "MOC" selection.

With reference to FIG. 7, if the administrative user D selects the "F8100 Default Values" selection 1016, the certification tool 10 displays the default values the system uses for preparation of the FAA Form 8100-9 in a table format 1030. If the administrative user D selects the "MOC" selection 1014, as shown in FIG. 8, the certification tool 10 displays the MOC 1033 values supported by the certification tool 10. For example, the MOC can include "Analysis" 1034, "FAA Concurrence" 1036, etc. The administrative user D can either select the "Delete" selection 1026 or the "Edit" selection 1028 to delete or modify the selected MOC.

Figure 9:
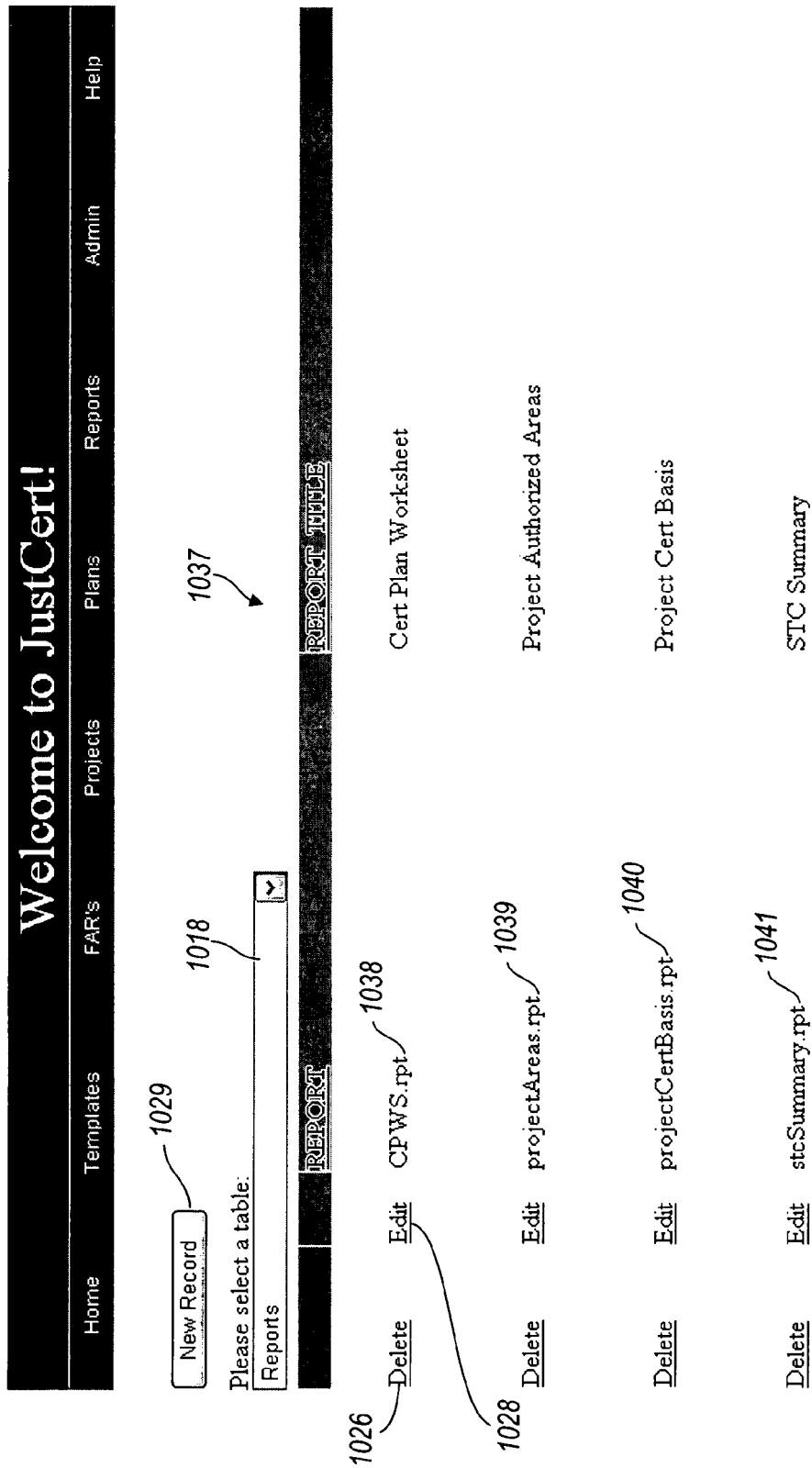
FIG. 9 illustrates the "Master Tables" tab of the "Admin" drop-down list displaying the "Reports" selection.

If the administrative user D selects the "Reports" selection 1018, the certification tool 10 displays the default reports 1037 available in the database 14, as shown in FIG. 9. For example, the default reports can include "CPWS.rpt" 1038, "projectAreas.rpt" 1039, etc. This function allows the administrative user D to define the naming of the reports presented within the certification tool 10, or to delete them.

For example, the "CPWS.rpt" 1038 (CPWS report) describes the contents of a certification plan for the selected project and plan including a description of the plan, list of authorized users C assigned to the plan, list of the FAR, the MOC, and documents identified for compliance approval. The "projectCertBasis.rpt" 1040 describes the FARs and Special Rules included in the project, as described herein.

The "stcSummary.rpt" 1041 is a summary report for a project that includes a description of the project, listing of the certification basis, authorized users C, assigned MOC, and the CPWS report for each plan within the project. Additional reporting capability based on the authorized user C authorizations and activity, FAR and Special Rule library components, project completion analysis and certification activity look-ahead are included within the scope of the certification tool 10. Each report can be viewed using a suitable viewing device 12, or printed by the certification tool 10 (not shown).

Figure 10:
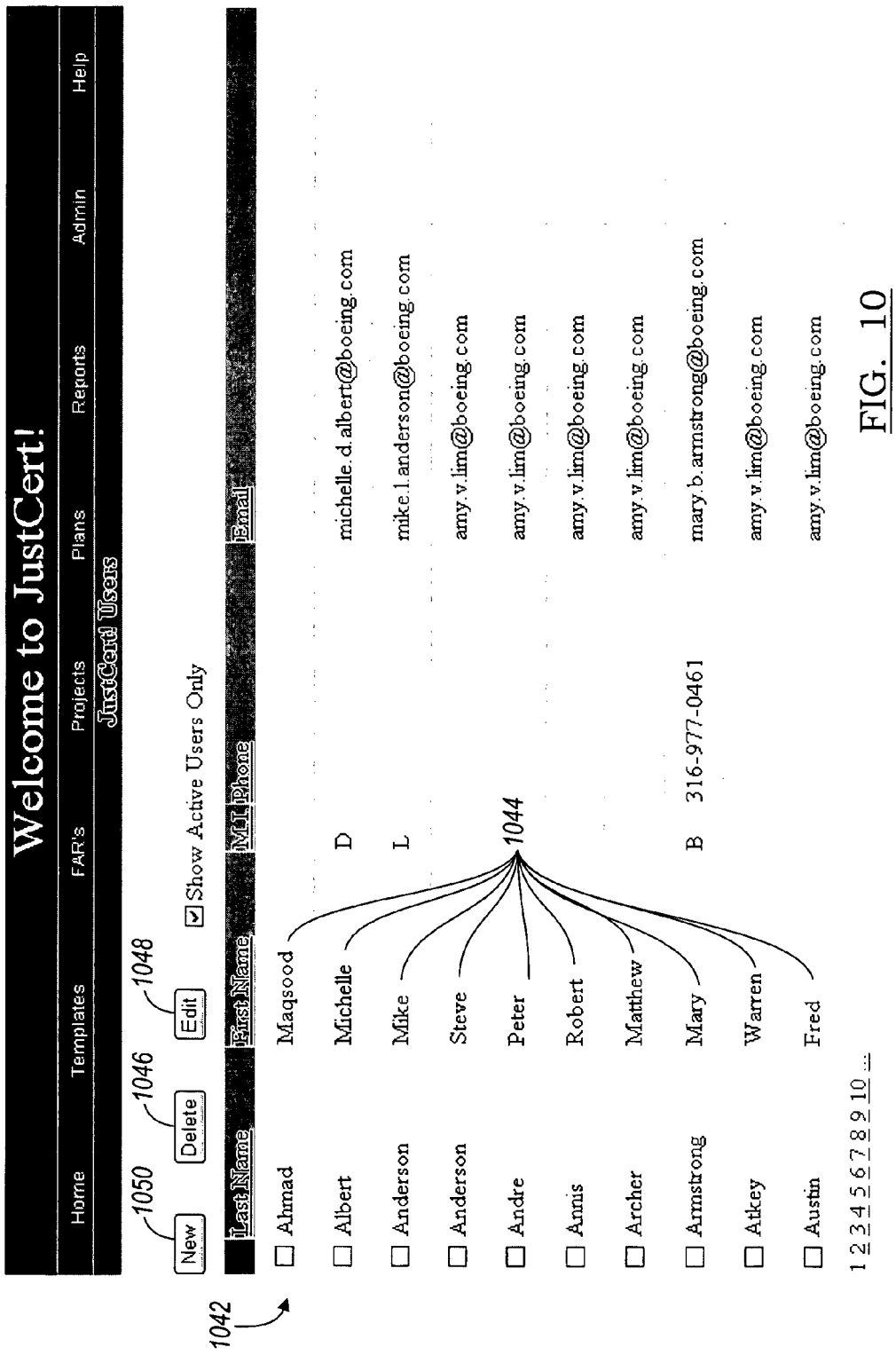
FIG. 10 illustrates the "Users" tab of the "Admin" drop-down list.

If the administrative user D selects the "Users" selection 1004 (FIG. 5), the certification tool 10 displays all the authorized users for the certification tool 10 on a "JustCert! Users" screen 1042, as shown in FIG. 10. The administrative user D can then manage the authorized users by selecting a listed authorized user 1044 and then selecting a "Delete" button 1046 or an "Edit" button 1048. The "Edit" button 1048 enables each authorized user to be assigned to one or more specific user roles shown in the drop-down list 1102 (FIG. 13). To add new authorized users, the administrative user D selects the "New" button 1050 and inputs the identification of the individual and the authorized user role or roles for that person.

Figure 11:
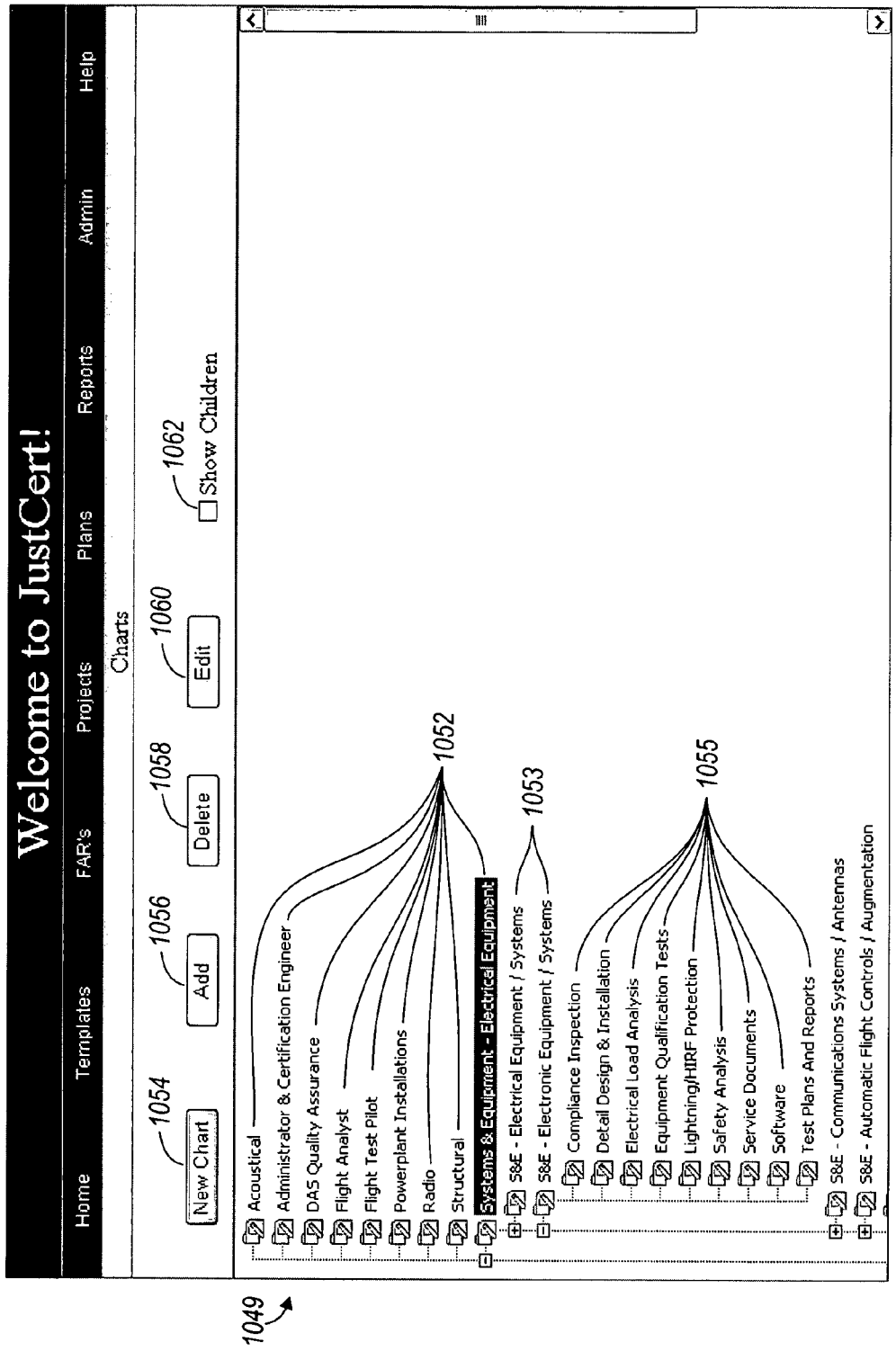
FIG. 11 illustrates the "FAA Charts" tab of the "Admin" drop-down list.

Each authorized user C is assigned to the "Authorized Representative" user role shown in the drop-down list 1102 (FIG. 13) and they are additionally authorized specific approval authority by the FAA. This additional specific authority is managed by the coordinator user E (FIG. 13). With reference to FIG. 11, if the coordinator user E selects the "FAA Charts" selection 1006 (FIG. 5), the certification tool 10 displays a "Charts" screen 1049. The FAA authorizes individuals to perform specific tasks within specific functional areas defined by the FAA in a series of charts (Ref: FAA Order 8110.37 and FAA Order 8100.9). The "Charts" screen 1049 displays the list of FAA charts in the database 14 as a tree hierarchy with roots 1052. The roots 1052 represent the chart, the branches 1053 represent the functional areas within the chart, and the branches 1055 represent the delegated functions to which one authorized user C can be assigned. The coordinator user E can select the desired functional area or root 1052 and select the "New Chart" button 1054, the "Add" button 1056, the "Delete" button 1058, the "Edit" button 1060 or the "Show Children" selection 1062. The "New Chart" button 1054 enables the coordinator user E to add a new branch 1053 to the roots 1052. This data supports the assignment of authorizations in the certification tool 10, as shown on FIG. 12.

Figure 12:
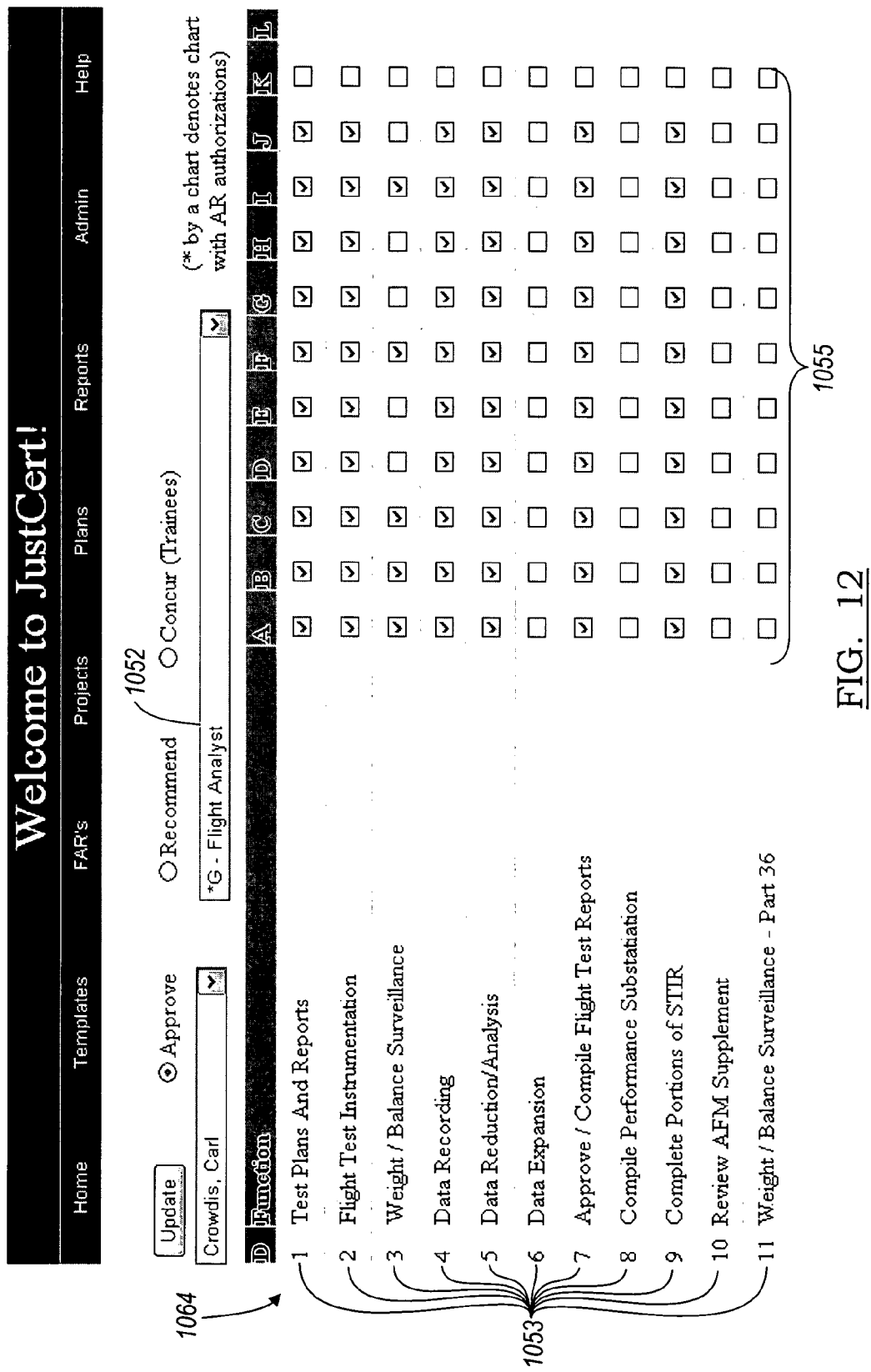
FIG. 12 illustrates the "AR Functions" screen of the "Admin" drop-down list.

With reference to FIG. 12, if the coordinator user E selects the "AR Functions" selection 1008, the certification tool 10 displays an "AR Functions" screen 1064. The "AR Functions" screen 1064 maps the chart root 1052, functional area branch 1053 and delegated function branches 1055 to the particular authorized user C. The coordinator user E then records the specific authorizations for the authorized user C by selecting the check boxes on the form. The certification tool 10 additionally enables the coordinator user E to define the authorized areas for "concurrence" separately from the authorized areas for "recommend" or authorized trainee areas for each AR. The certification tool 10 uses these authorizations to enforce "authority to recommend or approve" and authorization to record trainee involvement within the certification project.

With reference to FIG. 13, a screen 1100 for assigning user roles is shown. The screen 1100 displays the authorized user roles for the certification tool 10 in the drop-down list 1102 (previously described herein), a partial list of the objects in the certification tool 10 that require specific authorization to access or use in drop-down list 1104, and a list of privileges 1106 for assigning privileges to a particular user, such as "copy," "delete," "edit," "insert" or "view" authorization. Thus, the screen 1100 enables the DAS administrator H to define relationships between the user roles and the access controlled objects. Once the DAS administrator H has selected the user role, the object and the privileges, the DAS administrator H selects an "Update" button 1108 to save this information to the database 14.

Figure 15:
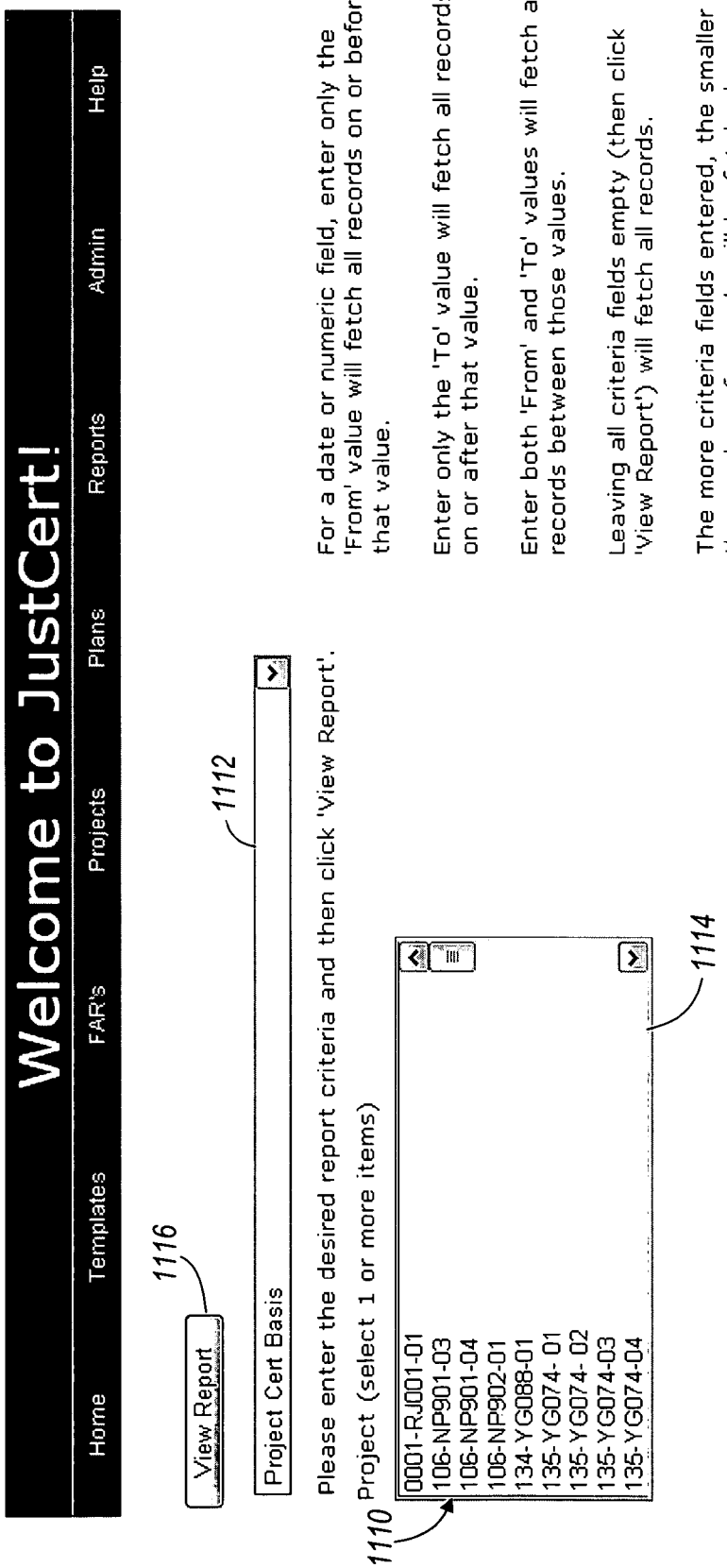
FIG. 15 illustrates the report selections from the "Reports" drop-down list.
Figure 16:
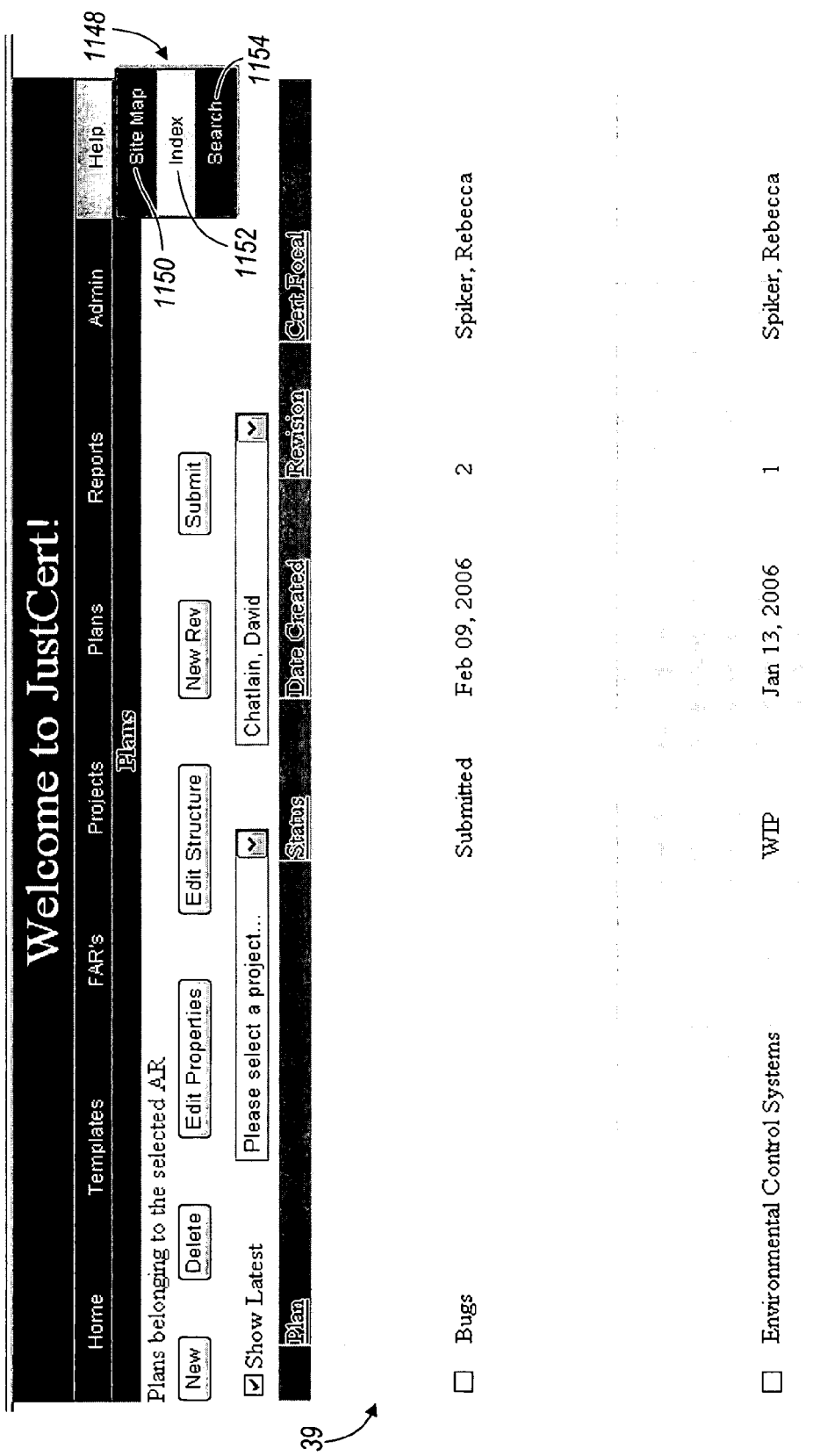
FIG. 16 illustrates the help selections from the "Help" drop-down list.

If the "Reports" selection 1018 (FIG. 9) is selected by the administrative user D, a "Reports" screen 1110 is displayed by the certification tool 10 as shown in FIG. 15. The "Reports" screen 1110 provides access to the reporting features of the system. AR assignments, Project descriptions, Certification Basis or Compliance Summaries can be selected from a drop-down list 1112. User-defined selection criteria are supported to allow the data for the selected report to be limited by a range of dates, to a specific project or projects, or for a selected AR. The criteria matching that selection from the drop-down list 1112 can then be displayed in a window 1114 by selecting view report 1116. All reports are presented on a screen and may be printed (not shown). Selected reports can also be stored in files using formats that limit the possibility for them to be altered (not shown). With reference now to FIG. 16, the "Help" menu tab 1148 includes a "Site Map" selection 1150, an "Index" selection 1152, and a "Search" selection 1154. Thus, the "Help" menu tab 1148 provides access to user assistance with the software system, which is common to internet enabled computing environments.

With reference back to FIG. 4, on the "Project Properties" screen 38, when defining a new project the originating user A is then required to enter specific information about the project requiring certification, including the Project Number 36, title of the project 40, definition of the project 42, and the focal user B's name 44. The originating user A is also required to enter specific information regarding the specific project type. For example, if the certification tool 10 is being used to certify aircraft, the originating user A is required to enter the variable tab 46 (a unique aircraft identifier typically used by aircraft manufacturers, which can be in five-digit alpha-numeric format, to provide a more meaningful descriptor of the aircraft), serial number 48, model number 50, aircraft make 52, and customer name 54 for the specific aircraft. After this information is entered by the originating user A, the originating user A selects the "Update" button 56 to save this information to the database 14.

With further reference to FIG. 2, once the originating user A has inputted the data and selected the "Update" button 56, at operation 58, the certification tool project number is assigned, a project number is requested from the regulating agency (in this example, the FAA), and the variable tab 46, serial number 48, model number 50, aircraft make 52, and airline customer name 54 are stored in the database 14. The certification tool project number is defined as a combination of the project number assigned by the originating user A, the permanent identification number of the aircraft and the revision level of the project. This can be desirable in instances where the regulating agency, such as the FAA, requires a record for every modification made to an approved project. Thus, for example, a certification tool project number could be "A123-RB345-01," which indicates that the project number is "A123," the permanent aircraft identification is "RB345" and the revision level is "01."

Figures 17, 18:
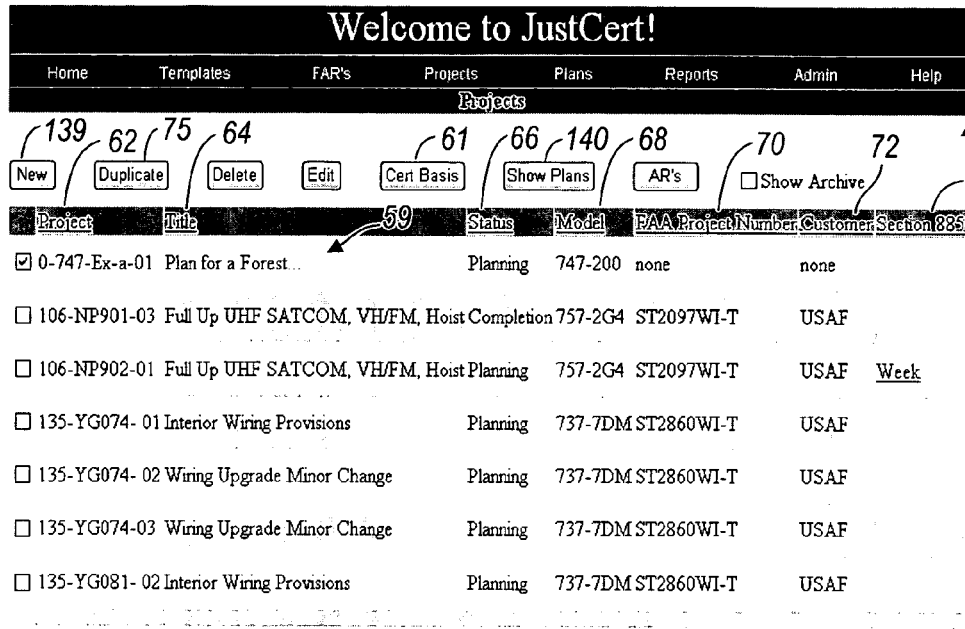
FIG. 17 illustrates the screen of the software listing available projects.
FIG. 18 illustrates the screen of the software for editing a copied project to define a new project or to modify the properties of an existing project.

Alternatively, with reference back to FIG. 4, the originating user A can define a project by copying a prior project. In order to copy a prior project, the originating user A can select "Project List" from the "Project" drop-down list 34 to display a "Projects" screen 57. With reference now to FIG. 17, an exemplary project list 59 is shown. The project list 59 lists a certification tool project number field 62, project title field 64, a field 66 for the status of the project, an aircraft model field 68, FAA Project Number field 70, a customer field 72, and the "Section 8856" field 73 ("Section 8856" is a document specific to FAA certification completed by the airline manufacturer that involves a compiled record of the completed certification project). The originating user A selects the project desired to be copied and then selects the "Duplicate" button 75. This copies the prior project and displays the prior project with edit fields for modifying the prior project with new data associated with the new project, as shown in FIG. 18. Generally, the originating user A can modify the project information consisting of the Project Number 36, title of the project 40, definition of the project 42, and the focal user B's name 44. Specific aircraft information is modified by changing one or more fields pertaining to the variable tab 46, the serial number 48, the model number 50, the aircraft make 52, and the customer name 54.

Figure 19:
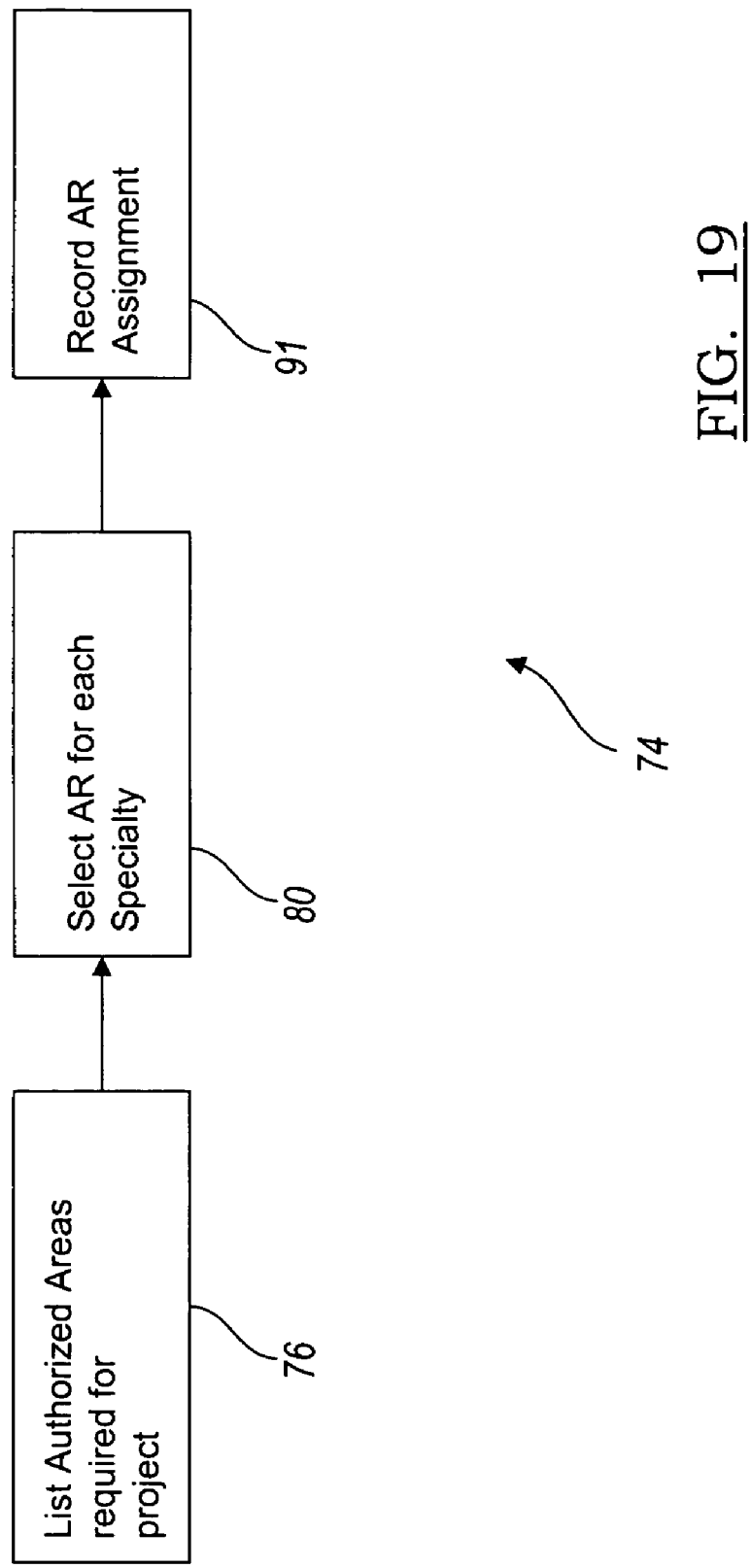
FIG. 19 is a simplified block diagram illustrating the process flow used to identify preferred authorized users or representatives (AR) for a project.
Figure 20:
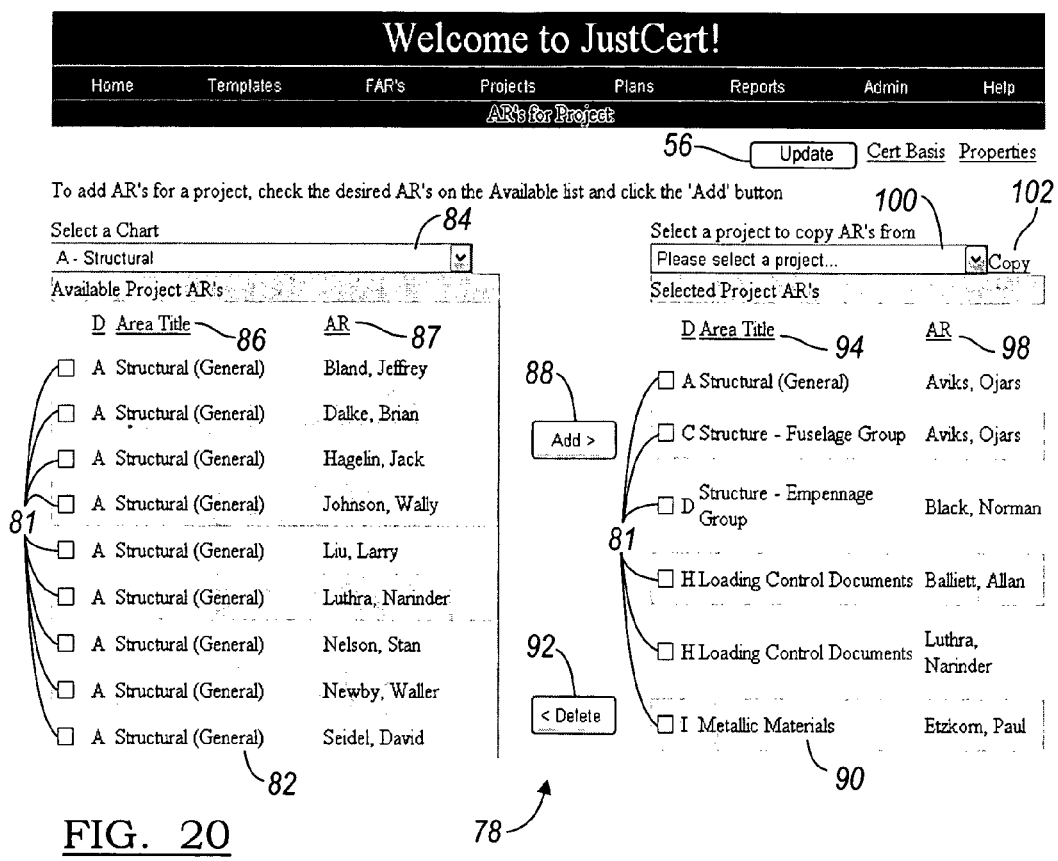
FIG. 20 illustrates the screen of the software for selecting the desired ARs for a project.

With reference back to FIG. 2, next, at operation 69, the originating user A is asked to identify preferred authorized users C for the project. The authorized users C are FAA ARs who are familiar with, and hold FAA delegated authority for, certifying particular functions or features in an aircraft. With reference now to FIG. 19, a process flow diagram 74 is shown for identifying the preferred authorized users C. In operation 76, the originating user A determines which specialties are required for the project. With reference to FIG. 20, the certification tool 10 displays the available authorized users C per area and selected authorized users C per area in a two-column grid format 78. With reference back to FIG. 19, the originating user A, in operation 80, selects the desired authorized user C for each specialty. With reference to FIG. 20, a left grid 82 allows the originating user A to select authorized users C through a "Chart" drop-down list 84. The "Chart" drop-down list 84 includes a list of charts for the authorized users C. The left grid 82 can include an "Area Title" field 86 of various areas, such as structural (general) and a related field "AR" 87 listing the authorized users C who are certified to work in that specific area, based on information received from the database 14. The originating user A can advance through the many authorized users C for the numerous areas through the use of numbered links on the bottom of the display (not specifically shown). The originating user A can select a desired authorized user C for an area by, for example, selecting a check box button 81 and then selecting the "Add>" button 88 to transfer that selection of authorized user C for the area into an adjacent grid 90 representing "Selected Project ARs."

The grid 90 displays the selected authorized users C for the project using an "Area Title" field 94 and selected authorized users C for the particular area titles in an "AR" field 98. If an authorized user C needs to be removed from the grid 90, the originating user A can select the authorized user C from the grid 90 and then select the "<Delete" button 92 to remove that person from the grid 90.

With reference to FIG. 19, once the originating user A has selected the desired authorized user C, the certification tool 10 records the authorized user C in operation 91. Then, in operation 96, the certification tool 10 retains the information regarding the authorized user C and makes that information available to the focal user B.

In the alternative, the originating user A can select authorized users C for a particular area from copying authorized users C associated with a prior project. In order to copy the authorized users C, the originating user A uses the "Select a project to copy AR's from" drop-down list 100 (FIG. 20). The drop-down list 100 then displays all prior projects that are stored in the database 14 (not shown). The originating user A selects one of the prior projects and then selects the "Copy" button 102. Using the "Copy" button 102 will add the authorized users C associated with the prior project to the grid 90. The originating user A can then modify the copied authorized users C by using the "Add>" button 88 and the "<Delete" button 92. Each selection of the "Add>" button 88 or the "<Delete" button 92 will save this information to the database 14.

With reference again back to FIG. 2, after the originating user A has defined the preferred authorized users C for the project in operation 58, the originating user A begins, in operation 104, to define the certification basis. The certification basis is a list of all the FARs retrieved from the database 14 that the authorized user A, in consultation with the FAA, has determined apply to the aircraft. The certification basis is established for each major or minor change, which will be described in greater detail herein.

With reference now to FIG. 21, the originating user A defines the certification basis by first selecting the project from the "Project" screen 57 (FIG. 17) and then selecting the "Cert Basis" button 61 in FIG. 17. The "Cert Basis" screen 103 (FIG. 21) is then displayed. The default display lists all the FARs, and includes a hyperlink to the FAA website for each one (not specifically shown). The originating user A can toggle between the FARs and the Special Rules, explained herein, by selecting the "Special Rules" button 106.

With regard to the Special Rules, the certification tool 10 includes a library for "Special Rules." The process to define a special rule is prescribed by law and provides a means for the FAA to grant approval for unique configurations that are not specifically addressed in the FARs. The Special Rules can be in the form of "Equivalent Safety Findings," "Special Conditions" or "Exemptions." The Special Rule becomes part of the Certification Basis for an aircraft, but they are typically defined on a model specific or case-by-case basis. The certification tool 10 facilitates the inclusion of Special Rules in a project in the same manner as FARs. As both the FARs screen and the Special Rules FAR screen are substantially similar in design and operation, only the FARs screen as shown in FIG. 21 will be discussed herein.

The certification tool 10 displays the applicable regulations and selected regulations in a two-column grid format 107. The certification basis is displayed in a grid 108. A grid 116 displays the FAR Number 117 in one column, the Amendment level 118 in a separate column, a column entitled "Latest" 120 in which a designator (in this example, an "X") indicates whether it is the latest amendment, and a column entitled "Title" 122 that indicates the title of the amendment. The originating user A can add additional regulations to the certification basis provided in grid 108 by selecting a desired FAR Number 117 and selecting the "Add>" button 124.

Selecting the "Add>" button 124 moves the selected FAR from the grid 116 to the grid 108. The originating user A can advance through the many FARs through the use of numbered links 126 on the bottom of the screen.

If, however, the originating user A desires to remove a FAR or Special Rule from the certification basis provided in the grid 108, the originating user A can select the FAR from the grid 108 and then select the "<Delete" button 128 to remove that regulation from the grid 108 using the check boxes 81, as previously discussed. Selecting the "Delete All" button 129 will remove all of the regulations from the grid 108.

In the alternative, the originating user A can select the FARs for the certification basis by copying the FARs associated with a prior project. In order to copy the FARs, the originating user A can use the "Please select a project . . . " drop-down list 130. The drop-down list 130 displays all prior projects that are stored in the database 14. The originating user A selects one of the prior projects and then selects the "Copy" button 132. Using the "Copy" button 132 adds the desired FARs associated with the prior project to the grid 108. The originating user A can then modify the copied FARs by using the "Add>" button 88 and the "<Delete" button 92.

After this information is entered by the originating user A, the certification tool 10 saves this information to the database 14. Next, with reference back to FIG. 2, after the originating user A has completed the certification basis, the certification tool 10 notifies the focal user B that the project is defined.

Figure 22:
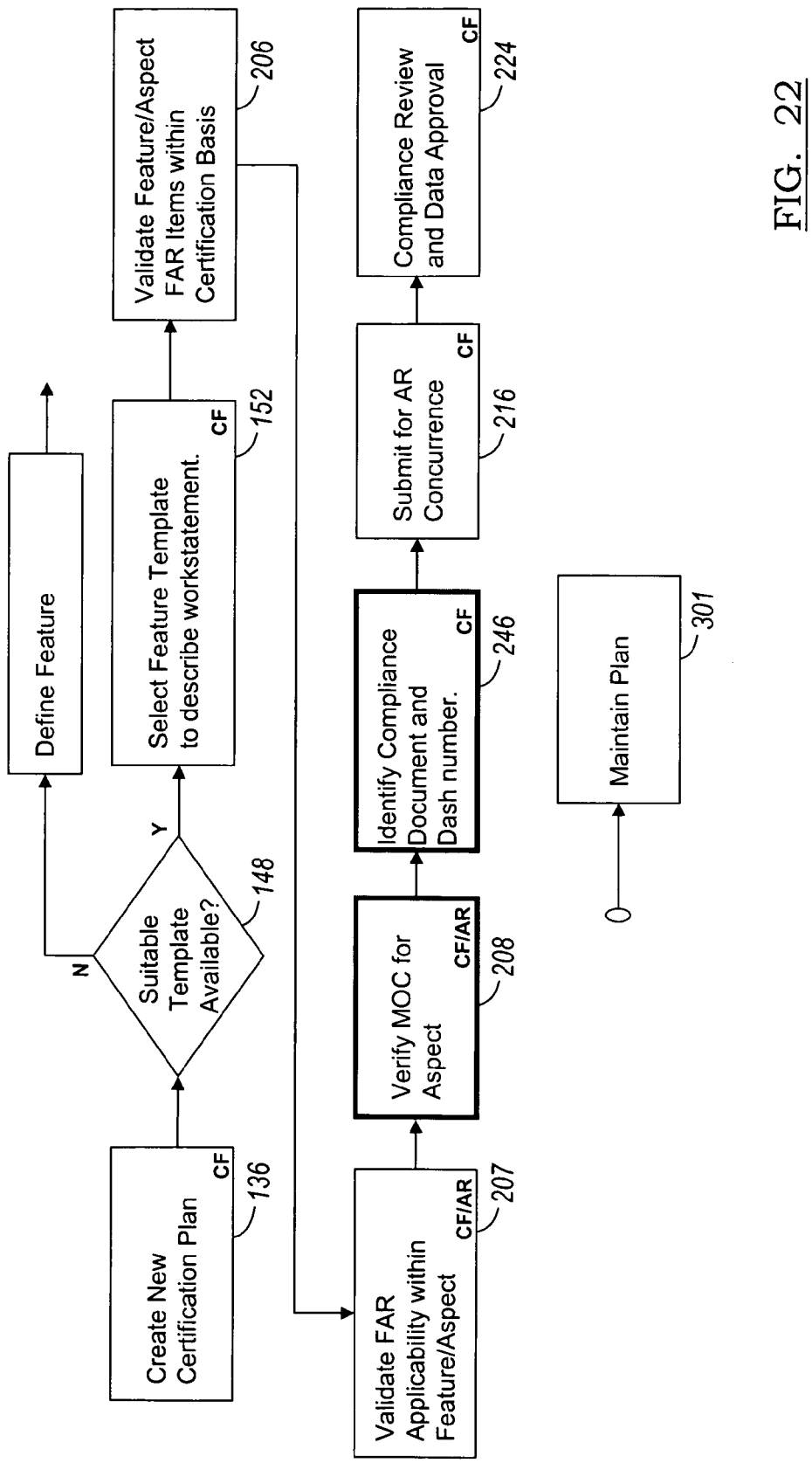
FIG. 22 is a simplified block diagram illustrating the process flow for developing a certification plan for a project.

With reference now to FIG. 22, in operation 136, a new certification plan is created. The certification tool 10 requires a minimum of one plan for each project. Multiple plans, illustrated in FIG. 25, are supported within a single project. The certification tool 10 also provides capability, if desired, to create a plan hierarchy where a plan is dependent on another plan (not illustrated). Within the certification tool 10, each plan is defined and executed using a single process, as described herein.

Figures 23, 24:
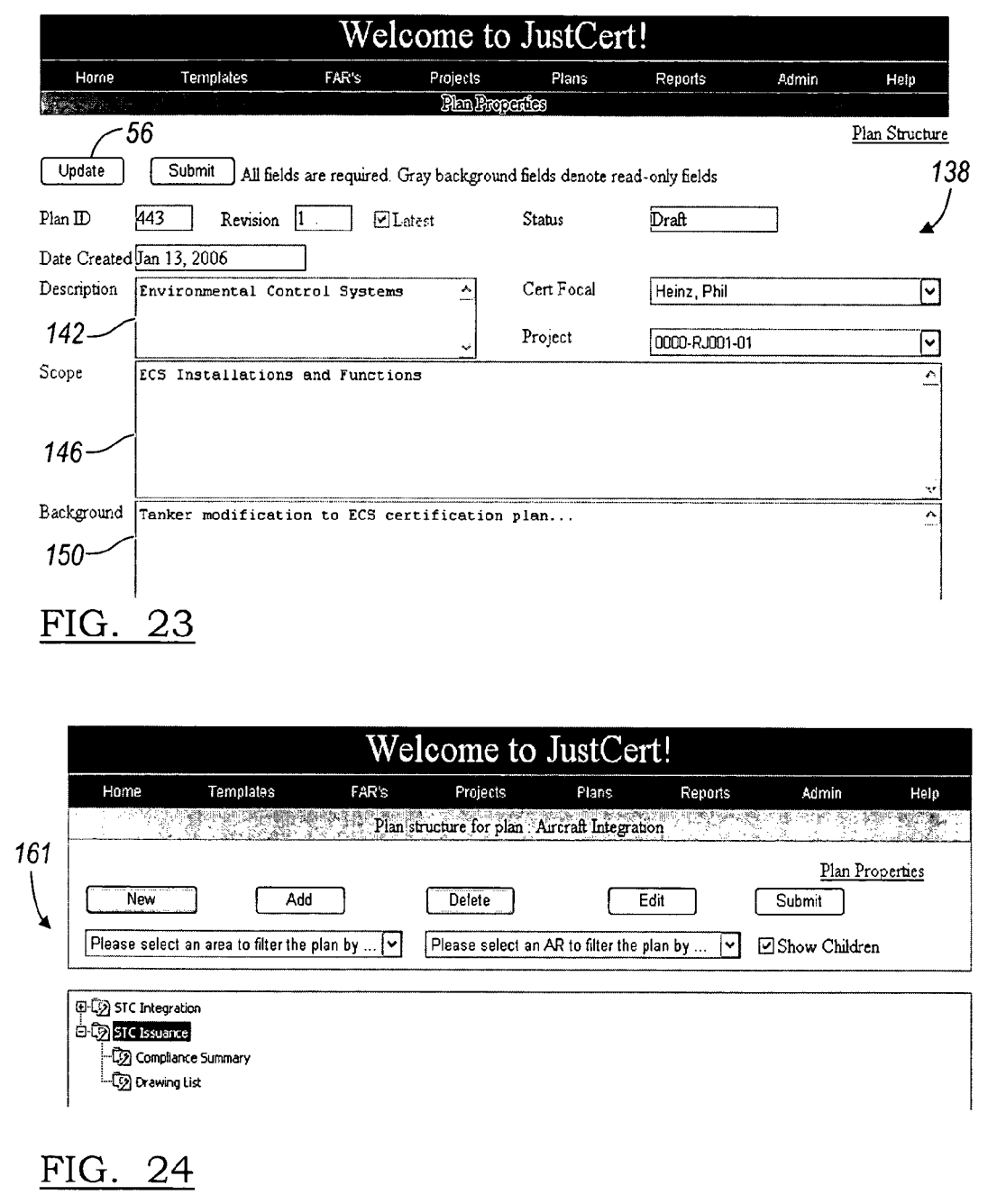

The certification plan joins the configuration definition (or a portion of the configuration definition, in the case of multiple plans) to the compliance requirements for the project. With reference to FIG. 17, the focal user B can create a new certification plan by selecting the project from the "Project" drop-down list 34 (FIG. 4) and then selecting the "New" button 139 (FIG. 17). Then the focal user B will fill in a "Plan Properties" screen 138 defining the certification plan, as shown in FIG. 23. The "Plan Properties" screen 138 includes text boxes for inserting a plan description field 142, a plan scope field 146 and a plan background field 150. Then, the user selects the "Update" button 56 to save the new plan to the database 14. In order to view the certification plan, the focal user B can select the "Show Plans" button 140 (FIG. 17). This will display a list of plans for the selected project (FIG. 25).

Once the new plan is created, the plan is added to a "Plans" screen 39, as shown in FIG. 25. The "Plans" screen 139 lists a "Plan" column 159 in which the plan title is displayed, a "Status" column 164 in which the status of the plan is displayed, a "Date Created" column 166 in which a date on which the plan was created is displayed, a "Revision" column 168 for listing a revision level for the plan, and a "Cert Focal" column 170 for giving a focal user B name for a given plan. After the focal user B selects the proper plan, the focal user B can select the "Edit Structure" button 172. The "Plan structure" screen 161 of FIG. 26 is then displayed, listing the features and their aspects.

Figure 27:
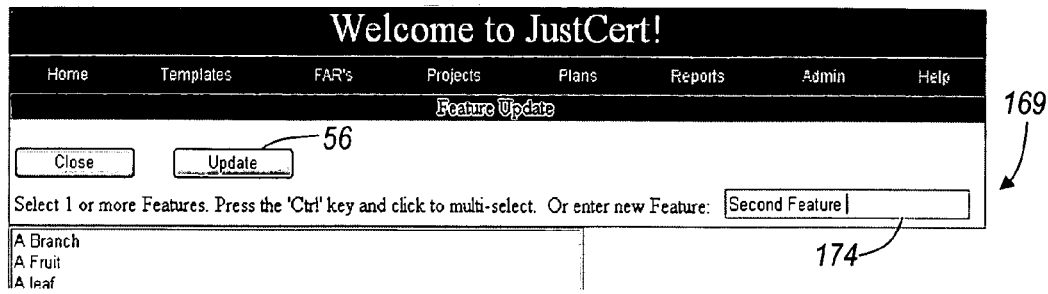
FIG. 27 illustrates the "Feature Update" screen of the software used to select features from a library to include in a plan or to create a new feature.
Figure 33:
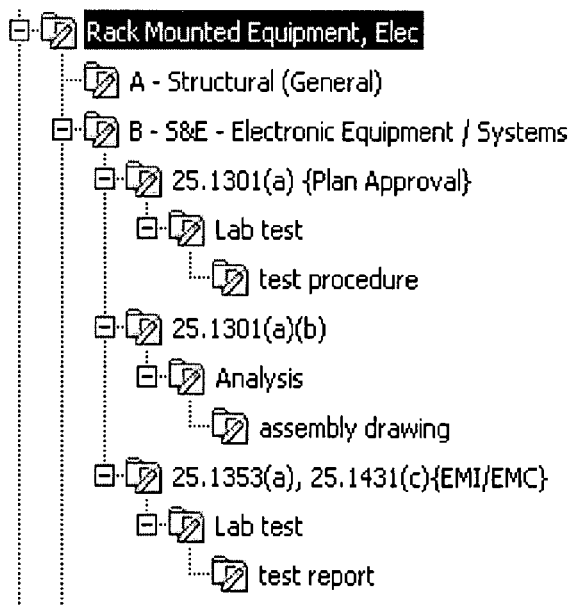
FIG. 33 illustrates an exemplary defined plan hierarchy.

The focal user B then enters feature data for the plan (FIG. 24). Features are the main branches of the hierarchy data structure (FIG. 33) associated with the certification plan. The feature data can be classified as an aircraft system (such as hydraulics, electrical power distribution or flight controls) or monuments (such as lavatories, galleys, seating or entry doors). If the plan is new, without any entries, the cover part of the "Plan structure" screen 161 will be blank, as shown in FIG. 26. To add a feature to the plan, the focal user B will select a "New Feature" button 171, as shown in FIG. 26. The focal user B determines if a suitable template exists for the feature in the database 14 (library). If the feature exists in the database 14, the focal user B can select the existing feature, as shown in FIG. 27, and select the "Update" button 56. The certification tool 10 copies the selected feature or features into the plan 152 from the database 14. After it is included in the plan, it can be modified as needed to include the information specific to the new project, using the process of FIG. 28.

Figure 28:
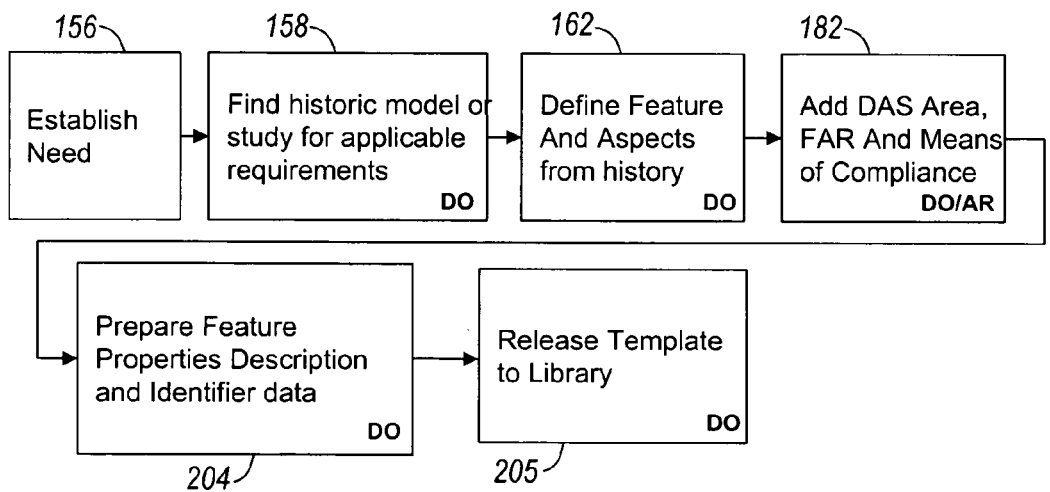
FIG. 28 is a simplified block diagram showing the process to define and maintain a feature that can also be retained in a certification template library.

With reference to FIG. 28, to define a new feature, at operation 156, the hierarchy of the feature is developed. If the feature is developed by originating user A for the database 14, it becomes a database item and is available to be included in a plan. However, if the feature is developed in a plan, it is completed by the same process sequence. After a feature is developed in a plan by focal user B, the originating user A can copy the feature from the plan to the database 14 (not shown). The originating user A can add feature properties description and an identifier (FIG. 28 at 204), and release the feature to the database 14 (FIG. 28 at 205). This allows the re-use of historic certification data with a minimum level of effort.

Figure 29:
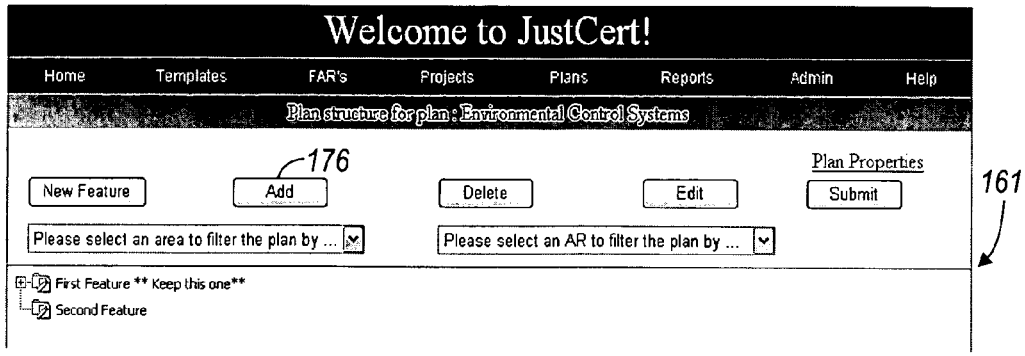
FIG. 29 illustrates the "Plan structure" screen of the software when two features are defined in the plan

The focal user B can also add features to the plan by defining a new feature, as shown in FIG. 26. As the new feature is part of a hierarchy, the feature must be defined one level at a time. The focal user B finds historical models or studies applicable requirements in operation 158. With reference to FIG. 26, the focal user B opens the plan, as described above, to display the "Plans" screen 39 (FIG. 25). After selecting the proper plan, the focal user B can select the "Edit Structure" button 172 from the "Plans" screen 39 (FIG. 25) to open the plan and display the feature list (FIG. 26). On the "Plan structure" screen 161 of FIG. 26, the focal user B selects the "New Feature" button 171 and then the "Feature Update" screen 169 is displayed (FIG. 27). The focal user B types the name of the new feature (for example, "Second Feature") in the text box 174. The focal user B then selects the "Update" button 56 to add the new feature to the plan, as shown in FIG. 29. This process can be repeated until all the desired features are defined for the plan.

Figure 30:
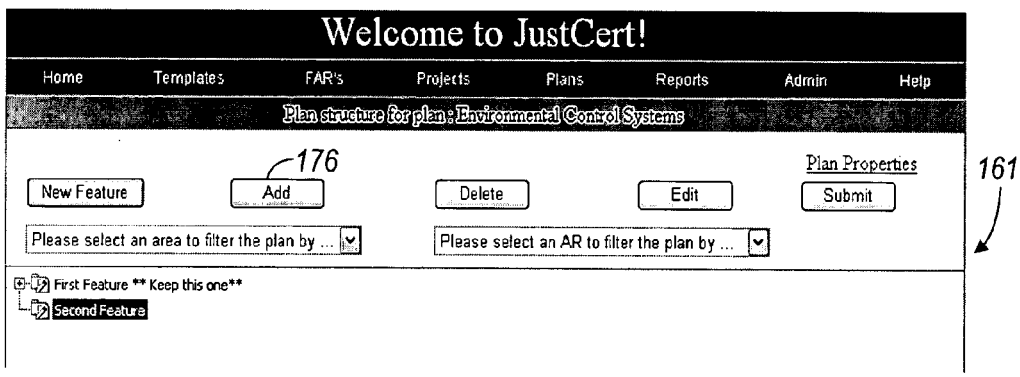
FIG. 30 illustrates the "Plan structure" screen of the software showing a procedure used to add an aspect.
Figure 31:
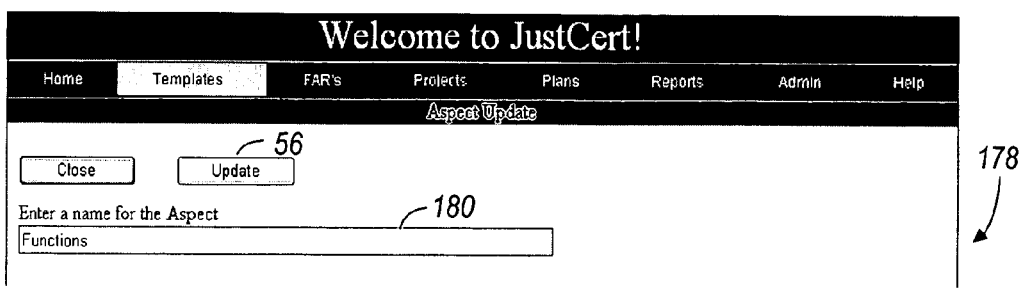
FIG. 31 illustrates the "Aspect Update" screen of the software for naming and adding an aspect to a feature.
Figure 32:
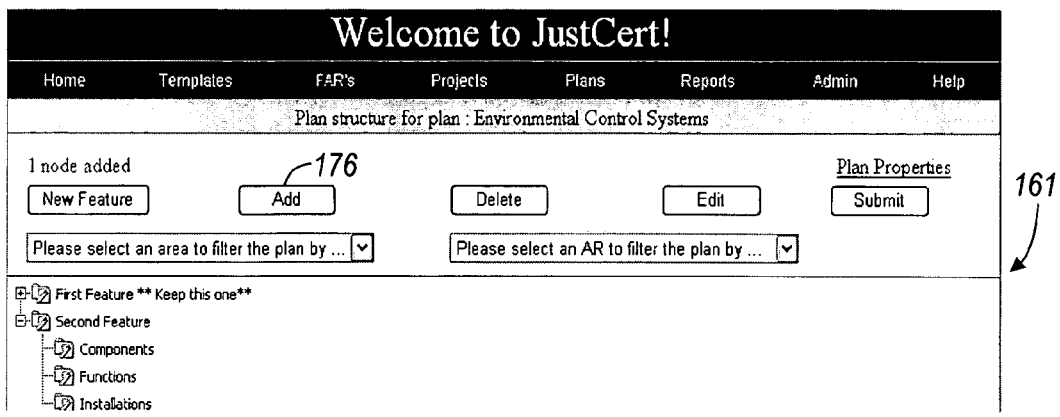
FIG. 32 illustrates the "Plan structure" screen of the software after all of the aspects have been added to the feature.

After the new features have been added, with reference now to FIG. 30, the focal user B must add aspects to the new features. Aspects coordinate the compliance requirements for the features and are comprised of components, installations and functions; however, there is no limit to the number of aspects that may be included in a feature. In order to add an aspect, the focal user B highlights the feature on the "Plan structure" screen 161 and selects the "Add" button 176. Then, an "Aspect Update" screen 178 is displayed, as illustrated in FIG. 31. The focal user B is prompted to enter the name of the aspect in a text box 180. After the name has been entered, the focal user B selects the "Update" button 56 to add the aspect to the feature. Each aspect must be added individually, so the above process must be repeated until each of the components, functions and installations are associated with the particular feature, as shown in FIG. 32.

Figure 34:
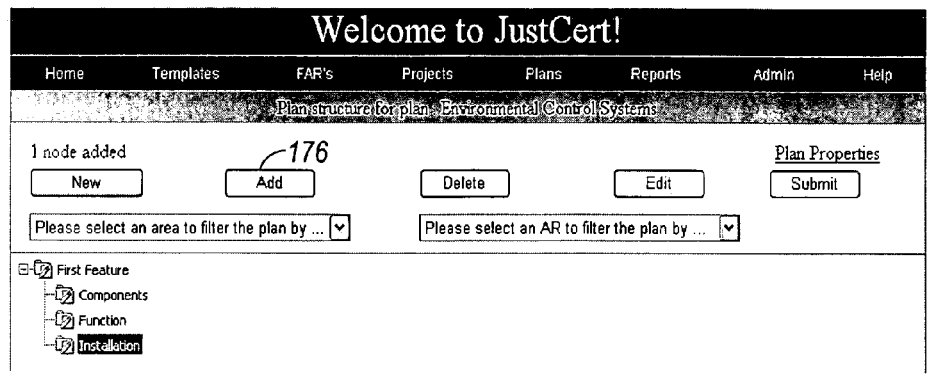
FIG. 34 illustrates the "Plan structure" screen of the software showing a procedure used to add an AR and Authorized Area to an aspect.
Figure 35:
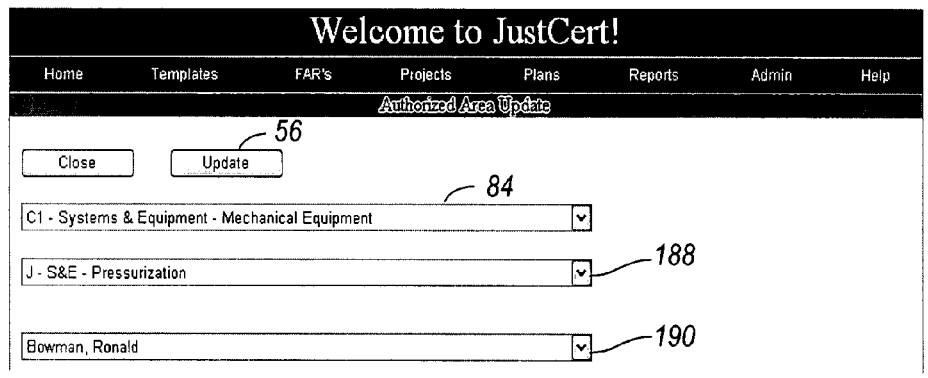
FIG. 35 illustrates the "Authorized Area Update" screen of the software for selecting an AR and Authorized Area.

After the aspect is added, the aspect must be defined by adding one or more authorized users C associated with that aspect, one or more groupings of FARs applicable to the aspect, and one or more means of compliance (MOC) for the aspect in 182 (FIG. 28). The aspect requires approval from the authorized user C with authority over that specific area defined in the aspect. In order to define the authorized user C, the focal user B can highlight the aspect to define and then select the "Add" button 176, as shown in FIG. 34. Then the "Authorized Area Update" screen 186 is displayed, as shown in FIG. 35. The focal user B selects the chart from a "Chart" drop-down list 84, which includes various areas of interest, then an authorized area from an "Authorized Area" drop-down list 188. The authorized areas are subparts of the chart area. For example, the chart can be "Systems & Equipment—Mechanical Equipment" and the authorized area can be "S&E—Pressurization." For each of the authorized areas of the chart, the authorized users C who are delegated in that area based on information assigned to the project can be selected from an "Authorized Users C" drop-down list 190. Once the chart, authorized area and authorized user C have been selected for the aspect, the focal user B can select the "Update" button 56 to save this information in the database 14.

Figure 36:
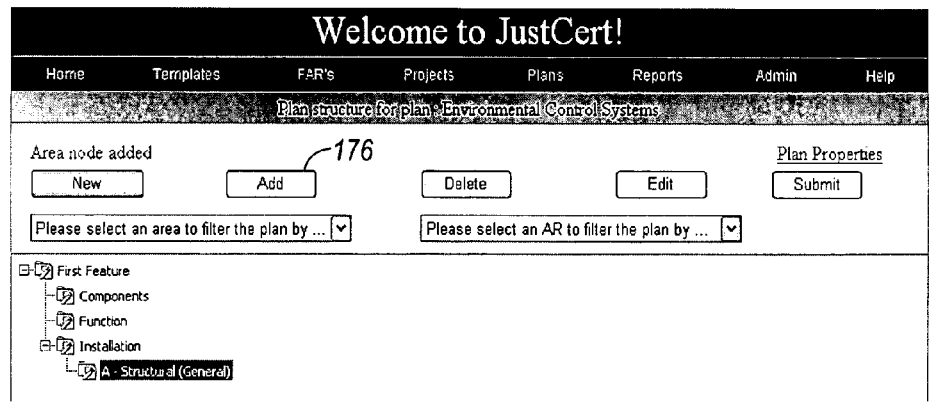
FIG. 36 illustrates the "Plan structure" screen of the software showing a procedure used to add a FAA regulation (FAR) to the Authorized Area.
Figure 37:
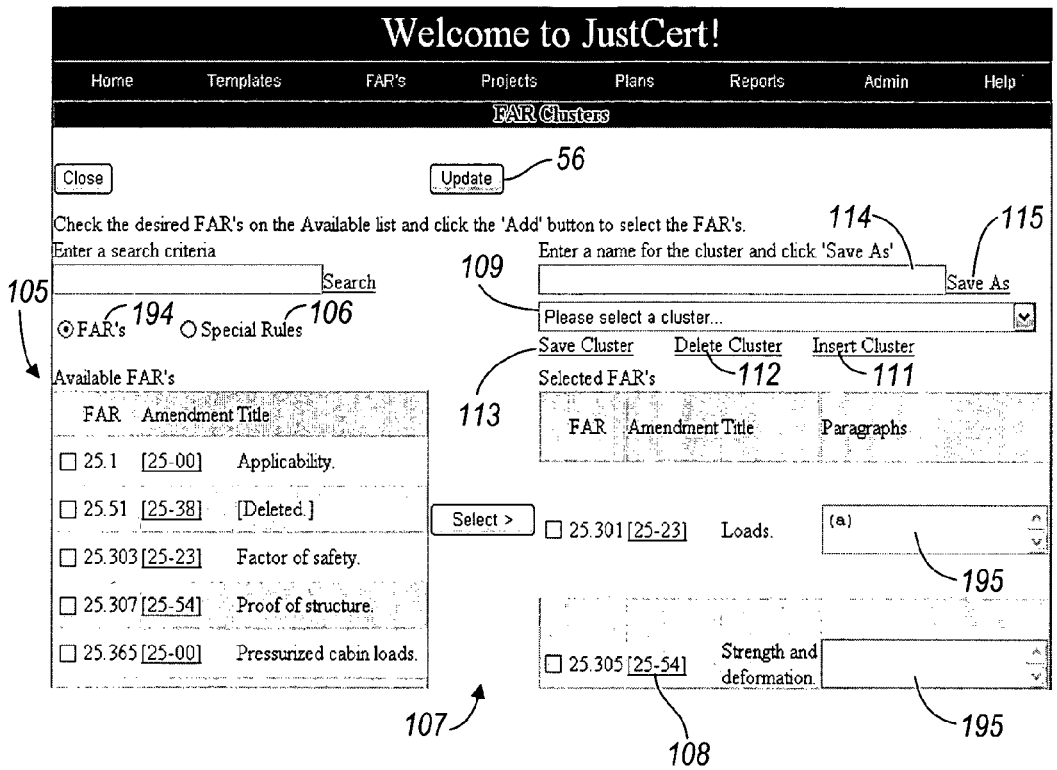
FIG. 37 illustrates the "FAR Clusters" screen of the software showing a procedure used to select one or more appropriate FAR(s)

Next, after the authorized areas have been updated, the appropriate FARs must be associated with each particular area. Multiple groups of FARs may be included with each authorized area. In order to associate the FARs with a given authorized area, the focal user B can highlight the authorized area and select the "Add" button 176, as shown in FIG. 36. The "FAR Clusters" screen 105 will be displayed, as shown in FIG. 37, and then the focal user B can select the FAR button 194 to display the associated FARs in the grid 108; however, the FARs that are available for selection are limited to the certification basis of the project (FIG. 2 at 104), as discussed previously. Then, the focal user B adds the subparagraph details to the specific rules selected for the aspect in a text box 195. The focal user B then selects the "Update" button 56 to save these changes to the plan.

Figure 38:
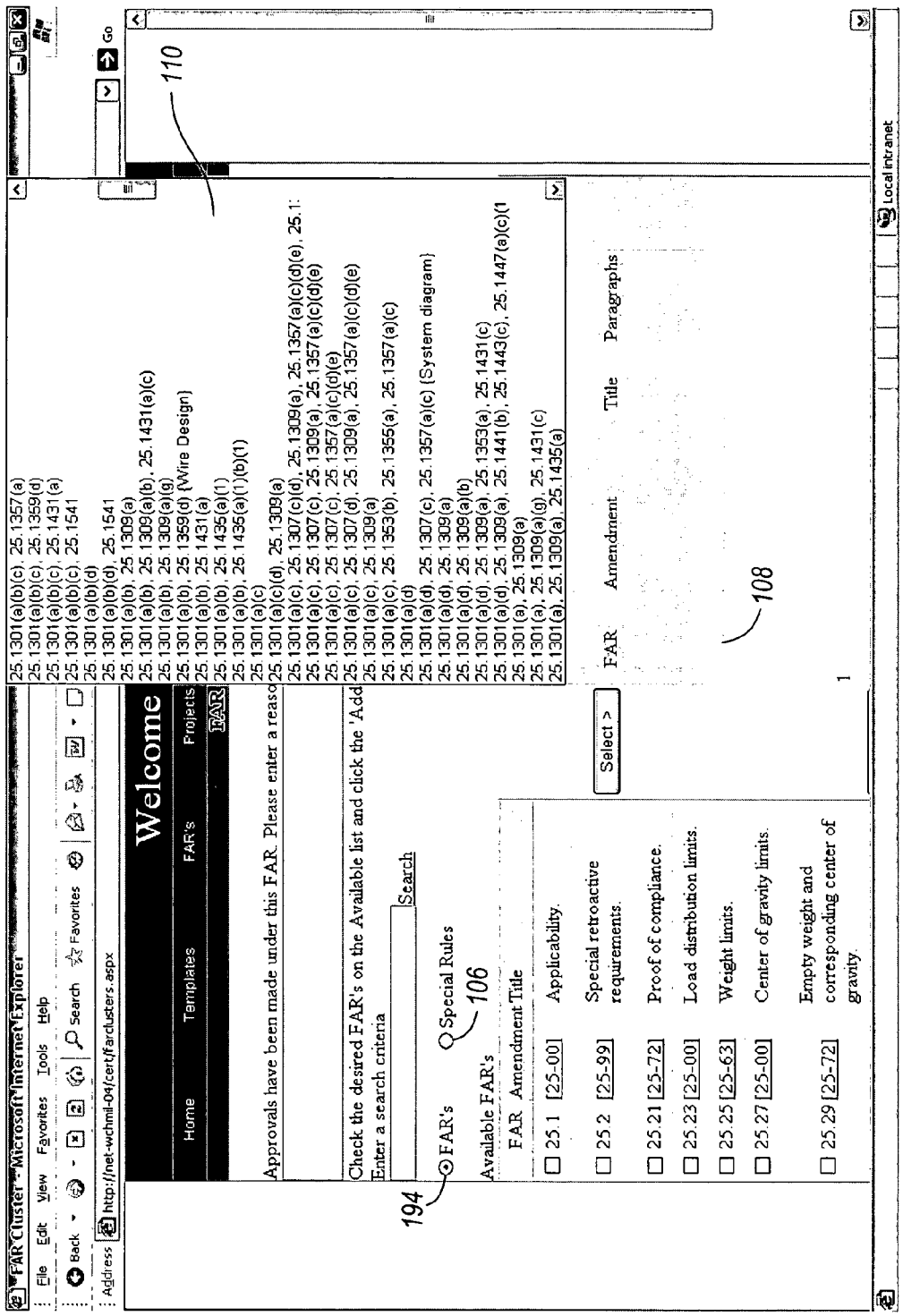
FIG. 38 illustrates some of the available FAR clusters on the "FAR Clusters" screen.

The certification tool 10 provides an alternate means to select the FARs for an authorized area by retaining a library of "clusters" in the database 14. A "cluster" is a list of FARs, including paragraph and subparagraph designations that are commonly used for compliance approval by authorized users C within their authorized area. With reference to FIG. 37, the focal user B can select a cluster from the drop-down list 109 and a list of available clusters 110 will be displayed, as shown in FIG. 38. The focal user B can highlight a cluster and select "Insert Cluster" 111 (FIG. 37). The certification tool 10 will then display the FARs and the subparagraph information from the cluster in the "FAR Clusters" screen 105. After the cluster data has been displayed, it can be modified to add or remove FARs or change the subparagraph detail, as previously described. Functionality is provided to remove a cluster from the database 14 using the "Delete Cluster" 112 operation. It is also possible to save a modified cluster using the "Save Cluster" 113 operation. After a list of FARs has been defined, it can be saved as a cluster by entering a name in text box 114 and selecting "Save As" 115. The cluster functionality helps to expedite the plan development and additionally enables a focal user B (who may not be familiar with all of the FARs) to identify obscure or rarely invoked requirements. After the FARs have been updated for the aspects, the focal user B must then add the MOC to the FAR.

Figure 39:
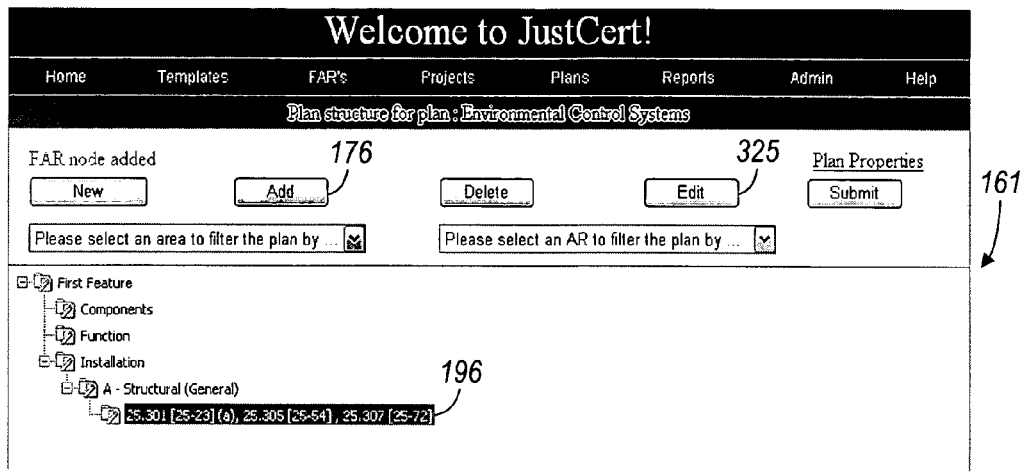
FIG. 39 illustrates the "Plan structure" screen of the software showing a procedure used to add a means of compliance "MOC" to the FAR Cluster.
Figure 40:
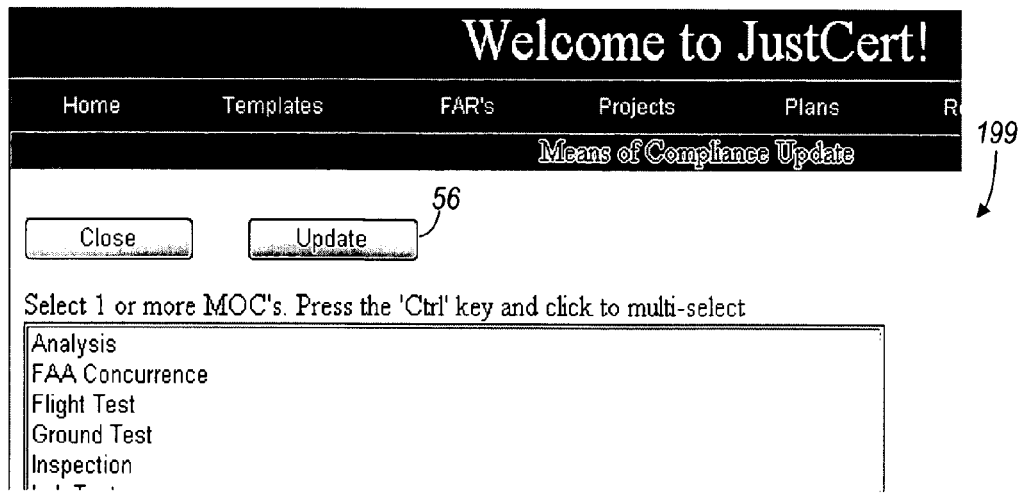
FIG. 40 illustrates the "Means of Compliance Update" screen of the software showing a procedure used to select an appropriate MOC.

The MOC for an aspect can be selected from various possible MOC: analysis; similarity analysis; laboratory testing; ground testing; and flight testing. The MOC invoke sets of process requirements for that FAR before the aspect can be certified. The focal user B can add one or more MOC to the FAR by highlighting the federal rules 196 associated with the aspect and selecting the "Add" button 176 from the "Plan structure" screen 161, as shown in FIG. 39. Then, the "Means of Compliance Update" screen 199 is displayed, as shown in FIG. 40. The focal user B highlights or selects the desired MOC from a list of the available MOC. In order to select multiple MOC, the focal user B can hold down the "Ctrl" key (not shown). After the desired MOC are highlighted, the focal user B selects the "Update" button 56. After the MOC has been added to the aspect of the feature, the focal user B must add the compliance document identification.

Figure 41:
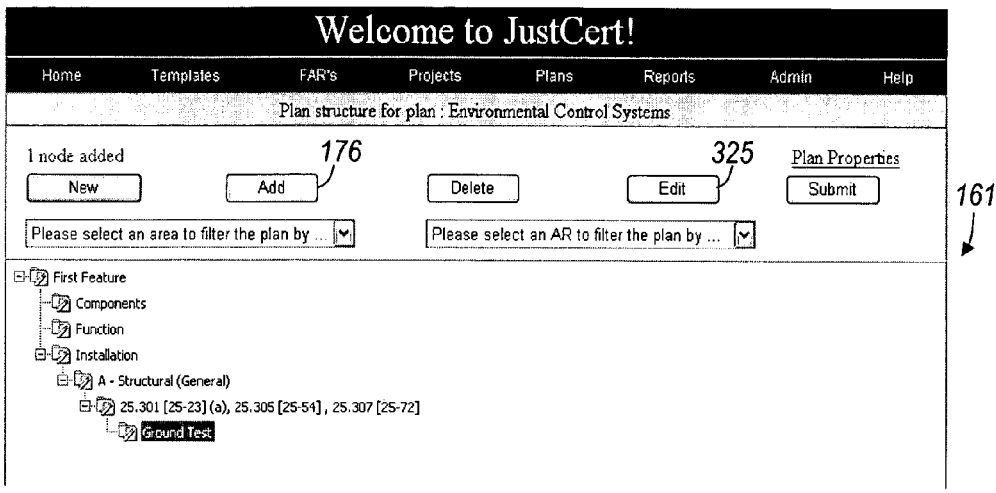
FIG. 41 illustrates the "Plan structure" screen of the software showing a procedure used to add a document to the MOC within the aspect.
Figure 42:
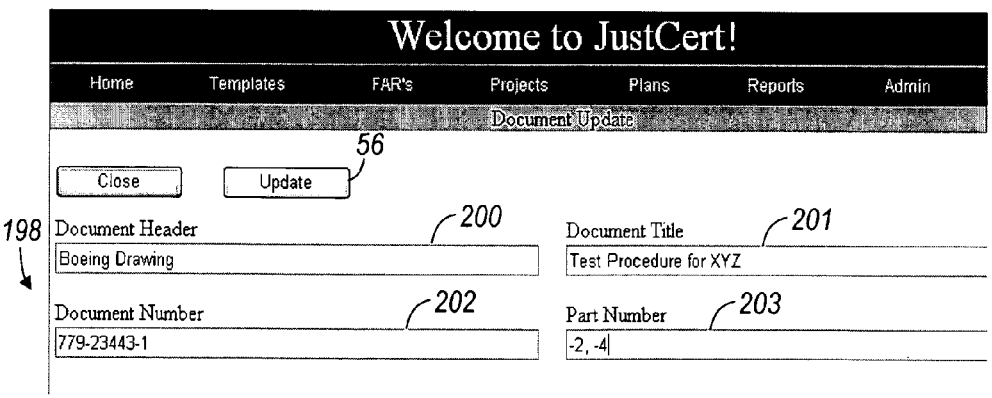
FIG. 42 illustrates the "Document Update" screen of the software showing a procedure used to identify or define an appropriate document.

With regard to aircraft and the FAA, compliance with every requirement must be documented. The documents are developed by the applicant (typically the aircraft manufacturer) and submitted to the FAA, as required by Title 14 of Code of Federal Regulations, Part 21. The documents are then evaluated as evidence of compliance by the FAA. If the FAA finds them satisfactory, the FAA or their designated representative will prepare a record of compliance document (for example, an FAA Form 8100-9 (FIG. 61) or FAA Form 8110-3). In order to identify the compliance document to the certification tool 10, the focal user B can highlight the MOC for the aspect from the "Plan structure" screen 161 and select the "Add" button 176, as shown in FIG. 41. A "Document Update" screen 198 will open, as shown in FIG. 42, and the focal user B enters the document header in field 200, the document title in field 201, the document number in field 202, and the part number in field 203. If the MOC requires a test, the part number entered in field 203 for the part to be tested is also required. Since the part number may be unknown when the plan is defined, an entry of "tbd" is acceptable. The existence of "tbd" will become visible in the system metrics, as will be discussed herein. The focal user B can then select the "Update" button 56 and the document will be added to the aspect. When the document identification is added, the certification planning for that branch of the feature is completed.

If the focal user B selected features for the project from the library, with reference now to FIG. 22, the certification tool 10 validates the FARs in the selected features that are included in the certification basis for the project and if required, in operation 206 generates error entries, described herein. The focal user B completes the appropriate corrective action for each of the error entries and determines the applicability of the FARs to the features and aspects defined in the project in operation 207. The validation of the applicability of the FARs is generally done as a conference between the focal user B and the authorized users C. Once both the focal user B and the authorized users C agree on the FARs selected for the project, then in operation 208, the focal user B and the authorized users C can verify the MOC for each aspect in the project. After the focal user B and the authorized users C reach an agreement the focal user B can "submit" the plan for concurrence from authorized user C.

Figure 43:
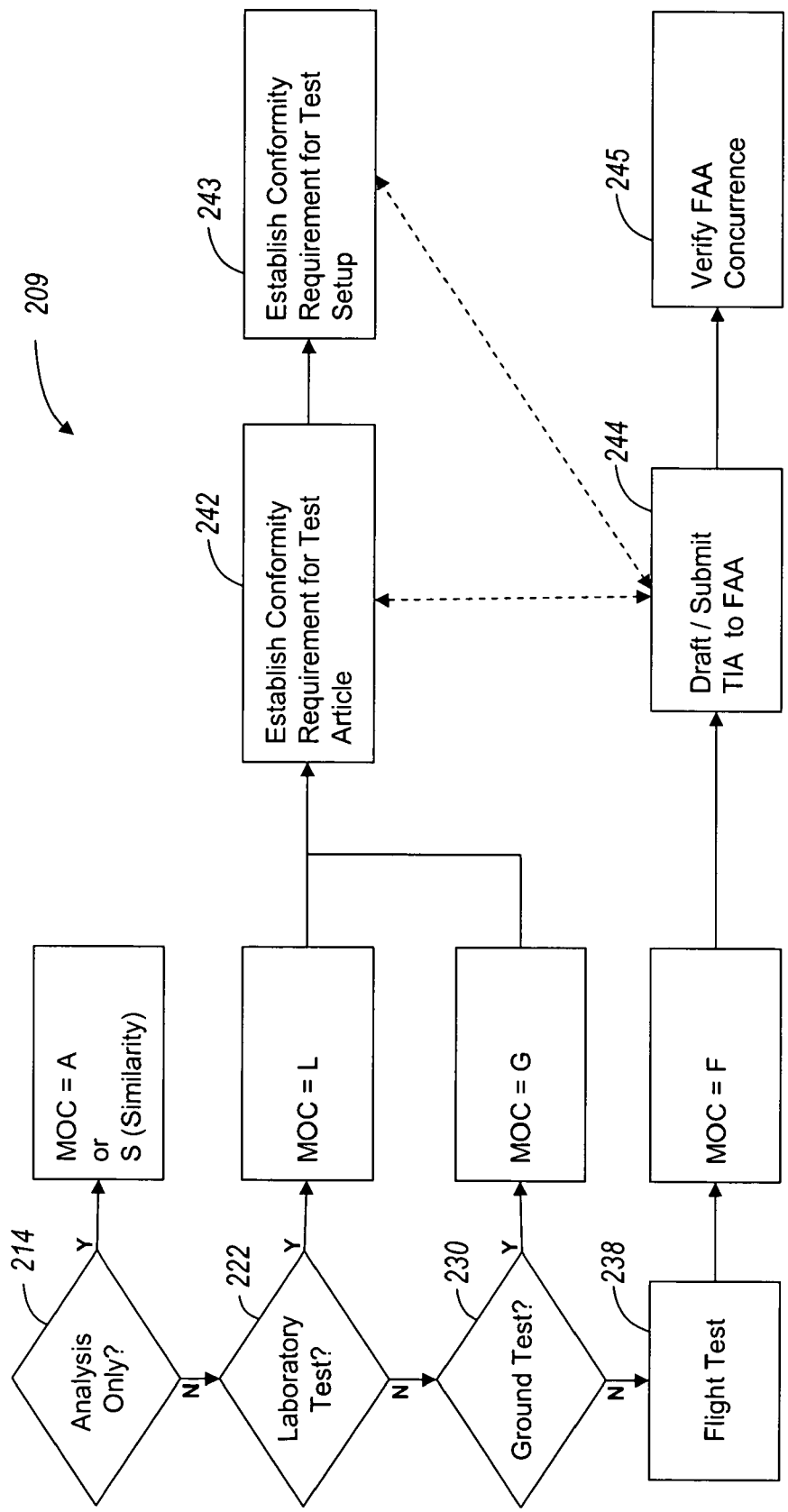
FIG. 43 is a simplified block diagram showing the process flow used to determine the conformity requirements associated with the selected MOC.
Figure 44:
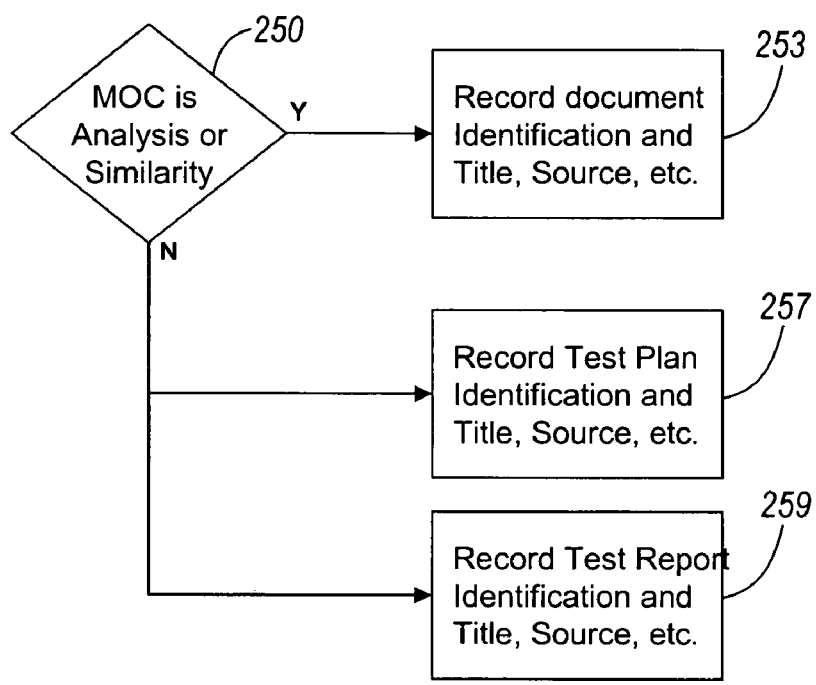
FIG. 44 is a simplified block diagram showing the process flow used to identify compliance deliverable documents and part numbers.

With reference now to FIG. 43, a process flow diagram 209 for the verification of the MOC is shown. The certification tool 10 defines conformity requirements ("conformity" is a physical inspection of a configuration conducted by the FAA or their designated representative to determine if the "as built" configuration is compliant with the "as defined" requirements). If the MOC is only analysis, the certification tool 10 determines the appropriate letter "A" for analysis or "S" for similarity in operation 214. Analysis and similarity do not require FAA conformity inspections (FIG. 44 at 253). If it is a laboratory test, the certification tool 10 assigns "L" for laboratory test in operation 222. A "laboratory test" requires conformity inspection of the test item itself and of the test item in the test configuration. The certification tool 10 identifies these requirements and prepares a list to report to an unrelated external conformity requirement management system (FIG. 44 at operations 257 and 259). If the MOC is a ground test, the certification tool 10 assigns "G" for ground test in operation 230. A ground test requires FAA conformity of the aircraft prior to testing. The certification tool 10 identifies this requirement and prepares a list to report to an unrelated external conformity requirement system (FIG. 44, at operations 257 and 259). If the MOC is a flight test, the certification tool 10 assigns "F" in operation 238. If a flight test is required, the certification tool 10 identifies the requirement and supplies a list to an external conformity requirement management system (FIG. 44 at operations 257 and 259).

Figure 45:
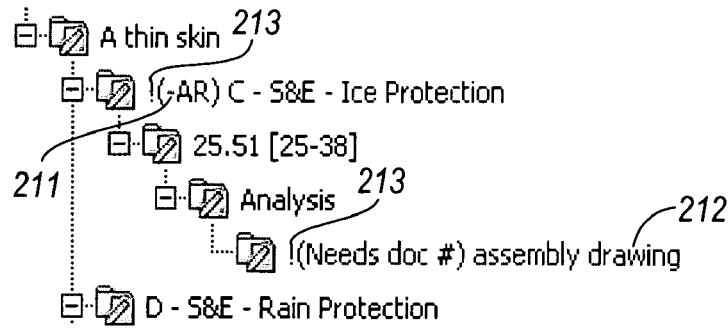
FIG. 45 illustrates a first exemplary error in the certification plan.
Figure 46:
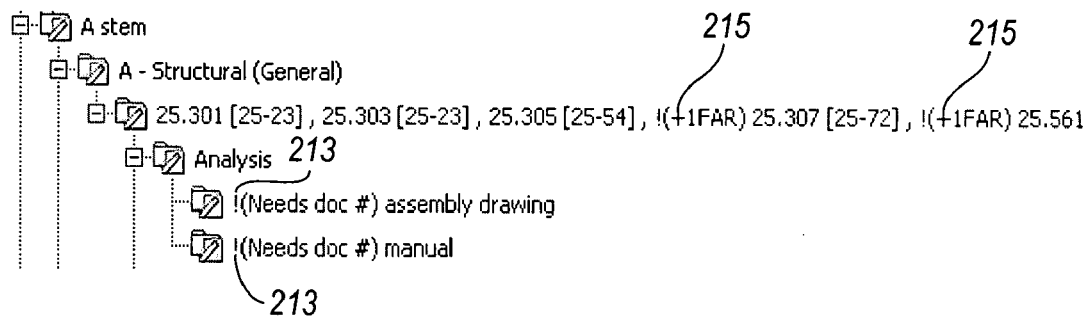
FIG. 46 illustrates a second exemplary error in the certification plan

With reference to FIG. 45, during the execution of operation 204, 210 and throughout the completion of the certification plan, the certification tool 10 illustrates inconsistencies in the certification plan as error entries 212. Error entries identify requirements for focal user B to correct or resolve the discrepancy. There are three classes of error entries: missing data which are identified by a !(missing data) entry 211; a missing FAR from the project certification basis (FIG. 2 at 104) identified by !(−FAR), where the (−) sign indicates the regulation is missing; and a duplicate or unresolved FAR identified by !(+FAR) 215, where the (+) indicates the same FAR appears twice within the project with different amendment levels and the certification tool 10 cannot decide which amendment level is the most appropriate, as shown in FIG. 46. The error entries 212 can also be in a contrasting color, such as red. All of the error entries 212 must be resolved before the certification plan can be submitted for AR approval in operation 216 (FIG. 22).

In operation 216, the focal user B can submit the certification to the authorized users C for concurrence. In order to submit the certification plan for concurrence, the focal user B can select the plan from the "Plans" screen 39, as shown in FIG. 25, and then select the "Submit" button 220. The focal user B verifies that the authorized users C have concurred the certification plan in operation 224 of FIG. 22.

Figure 47:
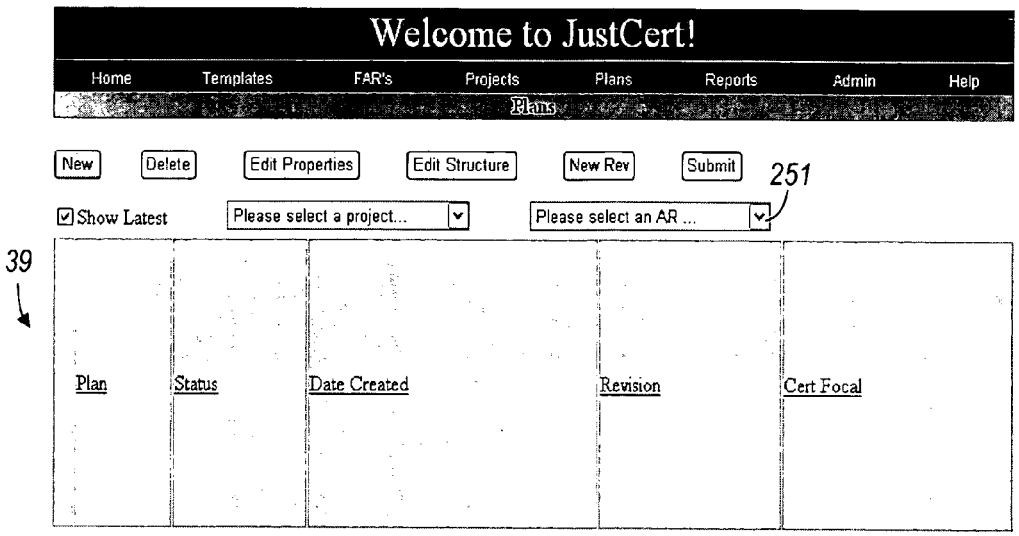
FIG. 47 illustrates the "Plans" screen and a first procedure used by the AR to approve the plan.
Figure 48:
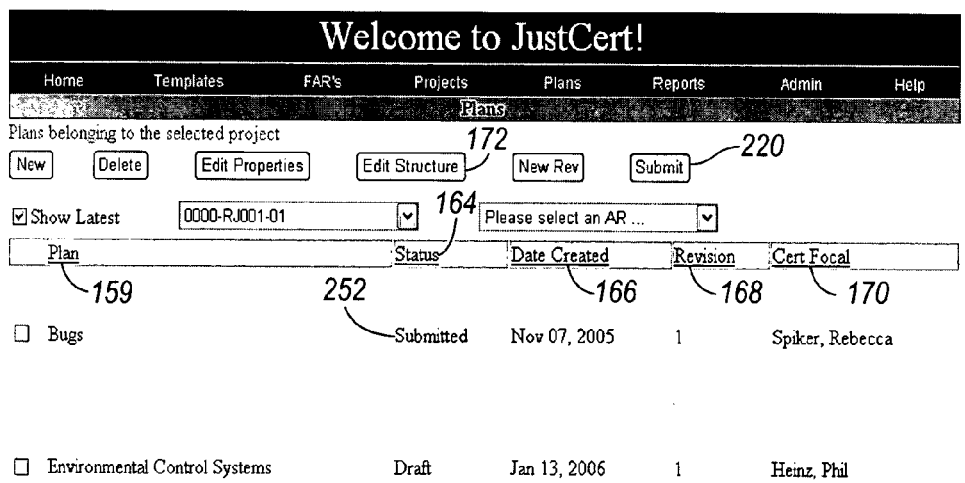
FIG. 48 illustrates the "Plans" screen and a second procedure used by the AR to approve the plan.
Figure 49:
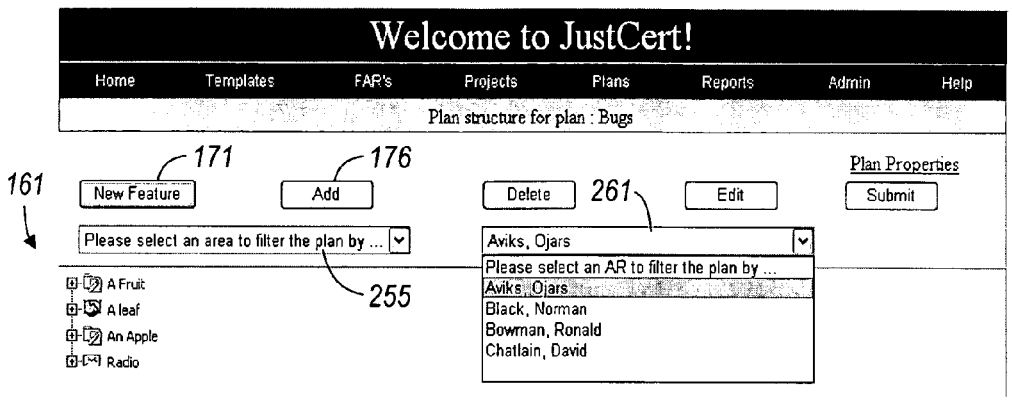
FIG. 49 illustrates the "Plan structure" screen and a third procedure used by the AR to approve the plan.
Figure 50:
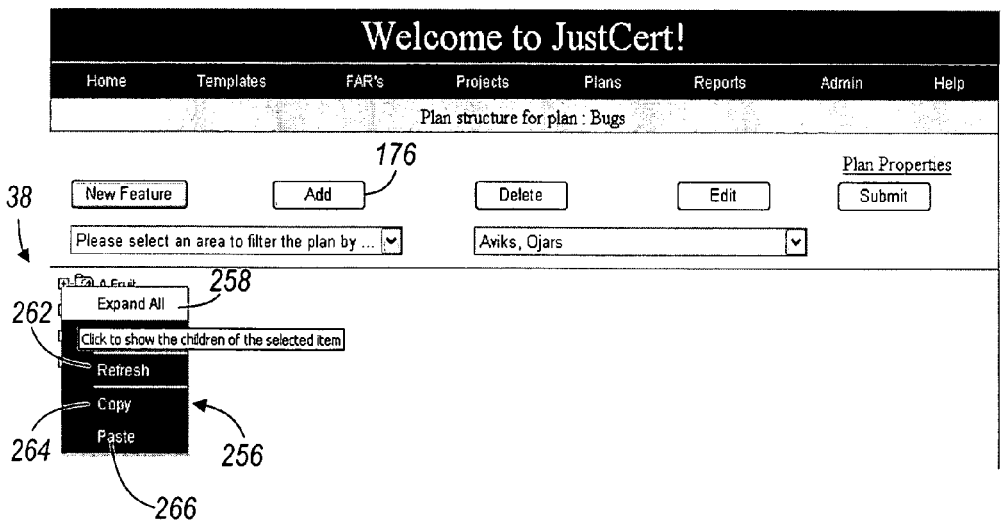
FIG. 50 illustrates the "Plan structure" screen and a fourth procedure used by the AR to approve the plan.
Figure 56:
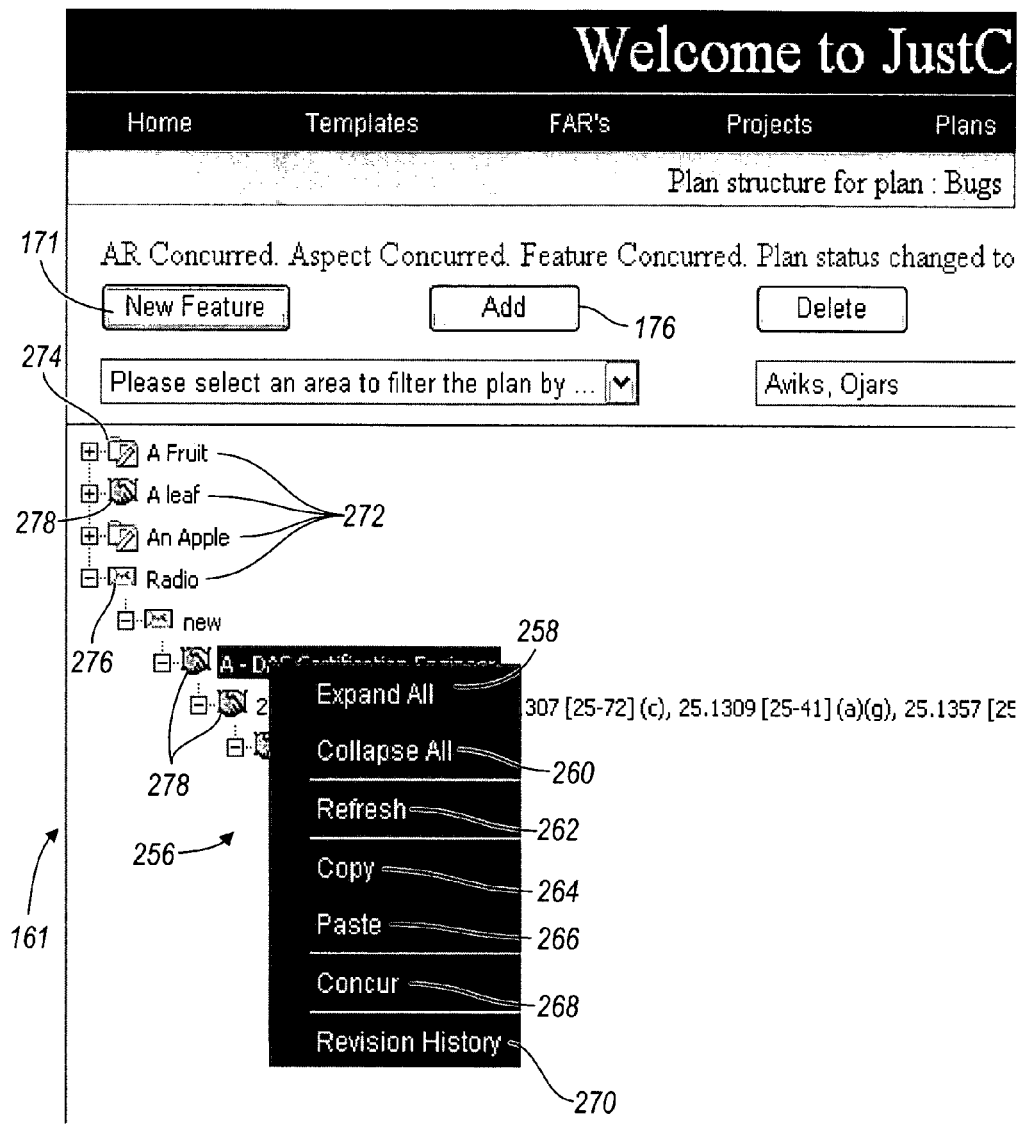
FIG. 56 illustrates the "Plan structure" screen and a first procedure used by the AR to grant or revoke concurrence with the plan.
Figure 56A:
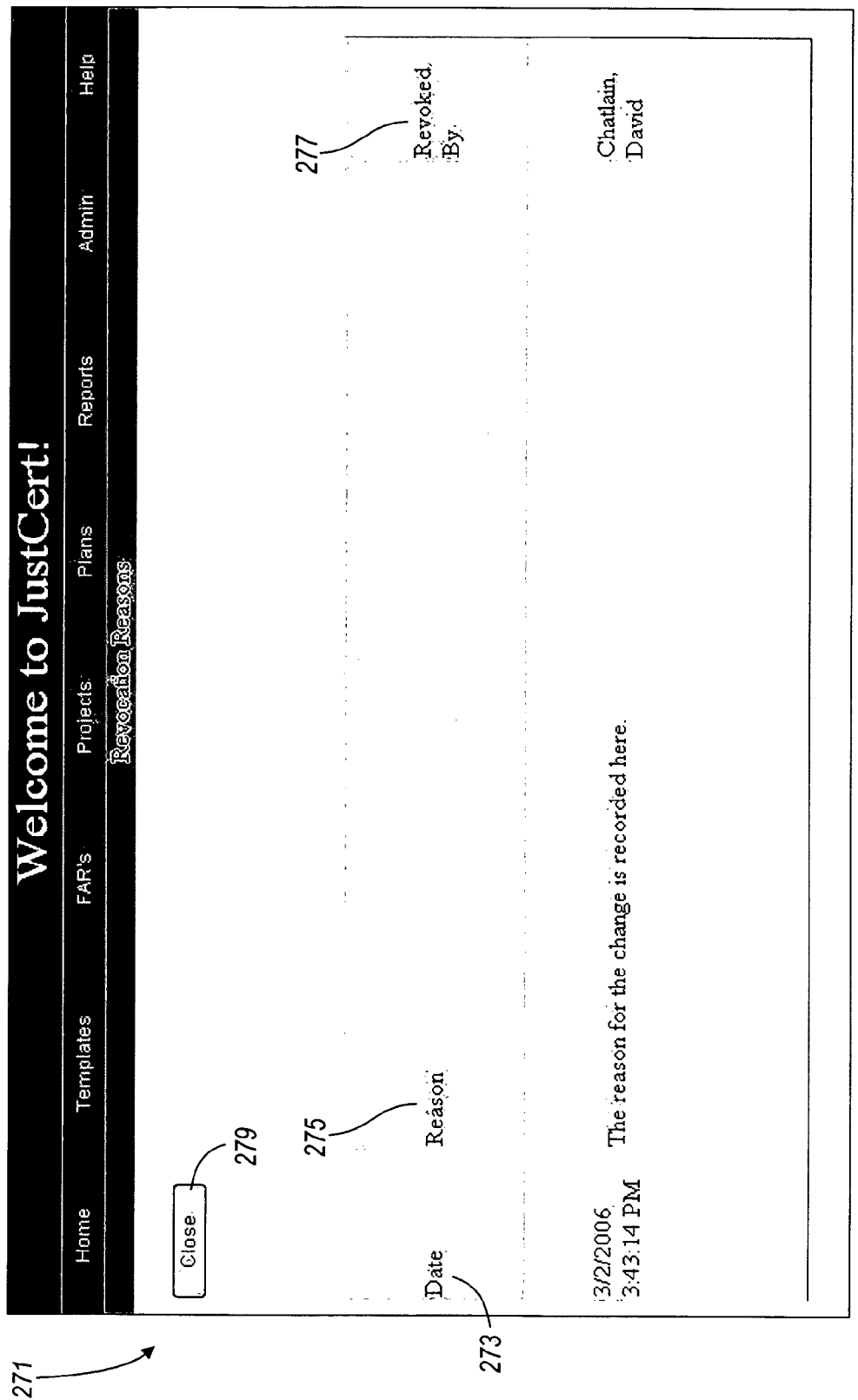
FIG. 56a illustrates the "Revocation Reasons" screen.

The authorized users C can concur with the certification plan by opening the plan on their user input devices 12, as described with reference to FIGS. 3 and 25. Alternatively, the authorized user C can select the appropriate plans with an "Authorized User" filter drop-down list 251, as shown in FIG. 47. This will display the plans associated with that particular authorized user. Then, with reference to FIG. 48, the authorized user C selects the plan with a "Submitted" identifier 252 in the "Status" column 164 on the "Plans" screen 39. The authorized user C can filter the features in the plan by "Authorized Area" 255 or "Authorized User" 261, as shown in FIG. 49. The authorized user C then selects the feature to be concurred by highlighting the authorized area or. FAR in the feature and using right-clicking menus (for example, to pull up a right-hand menu 256 from the "Plan structure" screen 161, as shown in FIG. 50) to select "concur," as will be described herein. As shown in FIG. 56, the right-hand menu 256 includes "Expand All" 258, "Collapse All" 260, "Refresh" 262, "Copy" 264, "Paste" 266, "Concur" 268, and "Revision History" 270. With the exception of "Copy" 264 and "Paste" 266, which are commonly known in the art, the above options will be described herein. Briefly, with regard to the "Expand All" 258, "Collapse All" 260 and "Revision History" 270 options, first, the "Expand All" 258 and "Collapse All" 260 options allow the authorized user C to expand the entire hierarchy under the selected/highlighted feature or to collapse the hierarchy under the feature. Second, the "Revision History" 270 option enables the authorized user C to view a list of the reasons for revisions to the feature on a "Revocation Reasons" screen 271, as shown in FIG. 56a. Each revision made to the plan (revocation) will be listed on the "Revocation Reasons" screen 271 in a grid with a "Date" field 273, a "Reason" field 275 and a "Revoked By" field 277.

To close the "Revocation Reasons" screen 271, the authorized user C selects a "Close" button 279.

Figure 51:
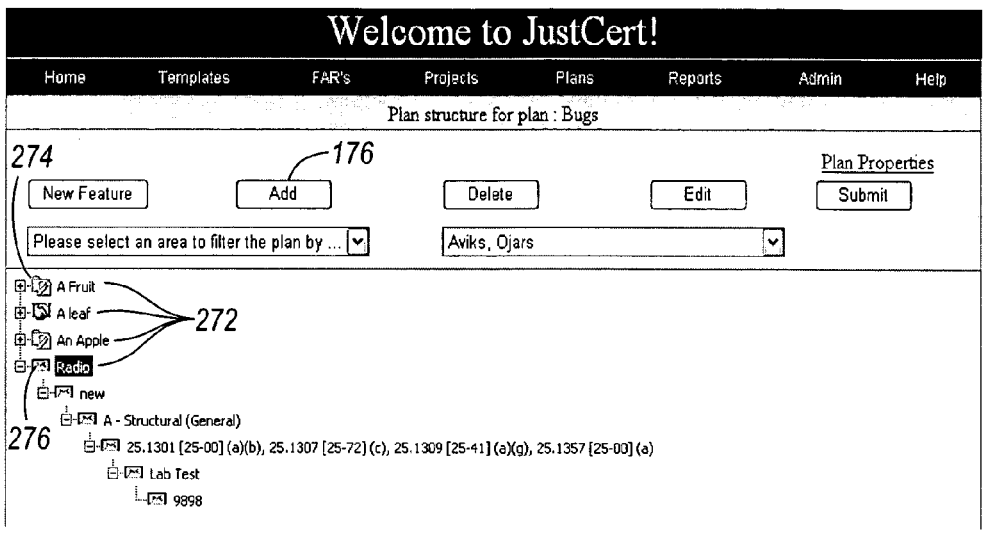
FIG. 51 illustrates the "Plan structure" screen and a fifth procedure used by the AR to approve the plan.
Figure 52:
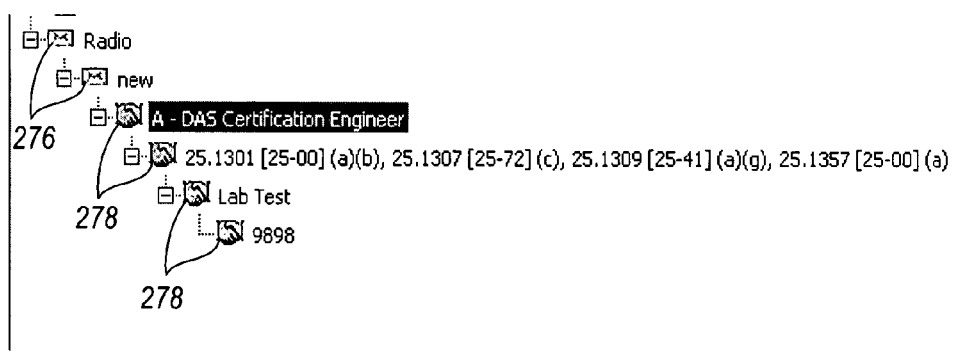
FIG. 52 illustrates the hierarchy of a plan that has concurrence from the AR.

In order to concur with the certification plan, the authorized user C can select "Expand All" 258 to display an entire branch 272, as shown in FIG. 51. If the icon next to the displayed data is a folder icon 274, then the data in that section is in a "draft" status. If the icon is an envelope icon 276, then the data is submitted. The authorized user C selects the branch 272 with the envelope icon 276 for approval. Then, the authorized user C can review each aspect of the feature and select the "Concur" option 268 (FIG. 56) with the aspect highlighted to concur with the selected functional area or FAR within the aspect, as shown in FIG. 52. A concurred aspect will have a handshake icon 278. Once the aspect is concurred, the authorized area, FARs and MOC for that aspect are placed under revision control and any subsequent changes require a reason for revision statement. When a revision to the FARs or the MOC occurs, the status for the aspect is revised to "submitted" by the certification tool 10 and the authorized user C must review and grant concurrence again. After concurrence, the certification tool 10 can begin to execute the certification plan by monitoring the (external) engineering document repository for the availability of the documents identified within the plan in operation 226 (FIG. 1). The authorized users C can modify and maintain the certification plan, however, as needed, in operation 301 (FIG. 22).

Figure 53:
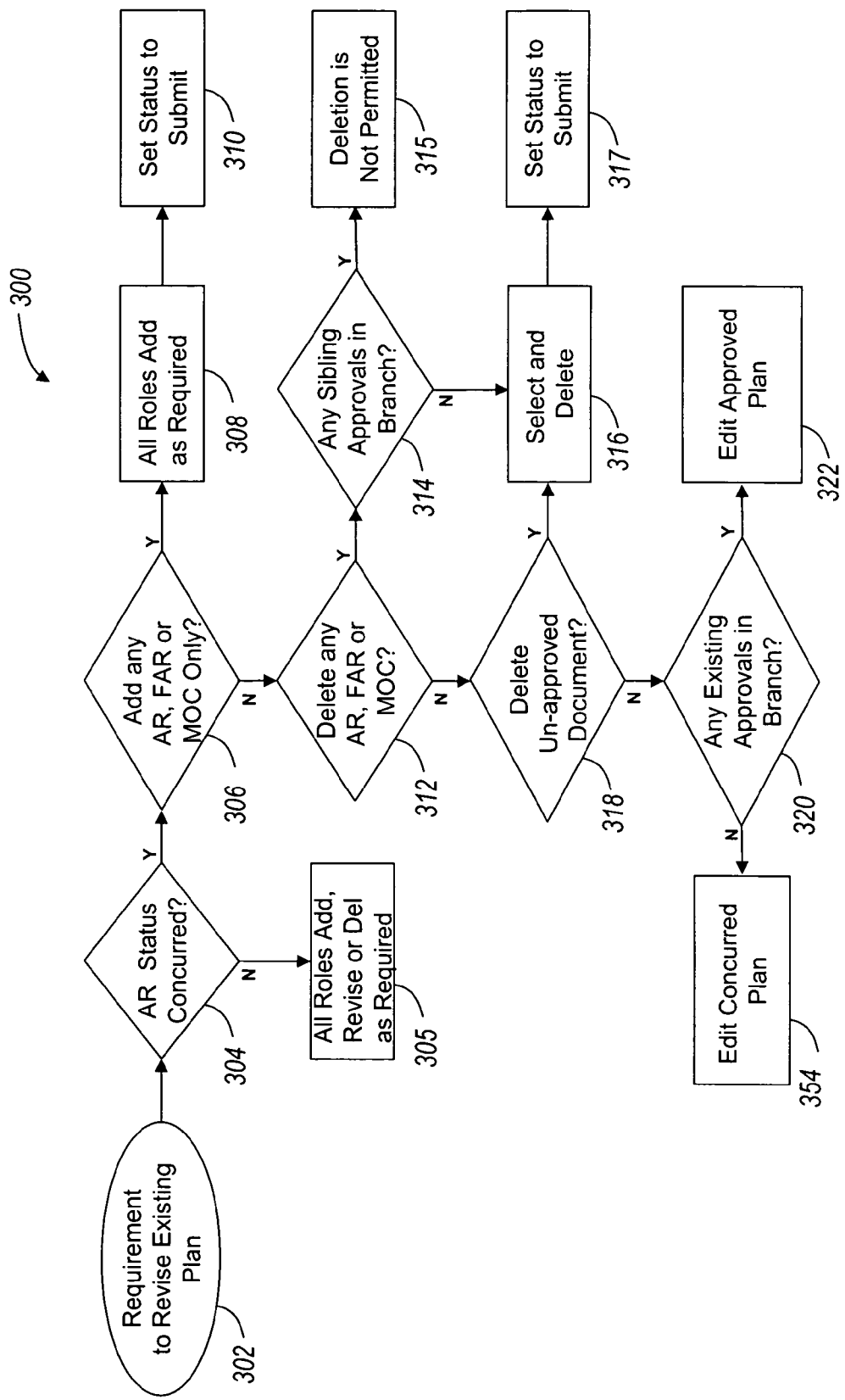
FIG. 53 is a simplified block diagram showing the process flow used to edit a plan with existing data approval.

With reference now to FIG. 53, a process to revise a certification plan is shown generally as 300. The process to revise a certification plan starts at operation 302, where there is an established need to revise a certification plan. If the authorized user C's status on the affected branch is not "concurred," the certification plan may be completed as required by all users at operation 305. If the status of the effected branch in the certification plan is "concurred" at operation 304 (exemplified in FIG. 52 at 278), and if the required change is to add any FARs or MOC at operation 306, then the focal user B is permitted to add these features at operation 308 and the certification tool 10 will revise the branch status to "submit" in operation 310.

If, however, the revision at operation 312 includes deletion of the authorized user C, FARs or MOC, then at operation 314, the certification tool 10 will determine if there are any sibling documents within that branch of the certification plan that have been granted "approved" status. If there are approved siblings, then deletion is not permitted at operation 315. If, however, there are not any sibling documents in "approved" status, deletion is permitted at operation 316; and, in operation 317, the certification tool 10 will revise the branch status to "submit." If the requirement for revision to the certification plan is for deletion of an un-approved document in operation 318, deletion is permitted. If the requirement for revision to the plan at operation 302 does not involve adding or deleting the authorized users C, FARs or MOC, then the revisions are dependent on the existence of any "approved" documents within the branch at operation 320.

Figure 54:
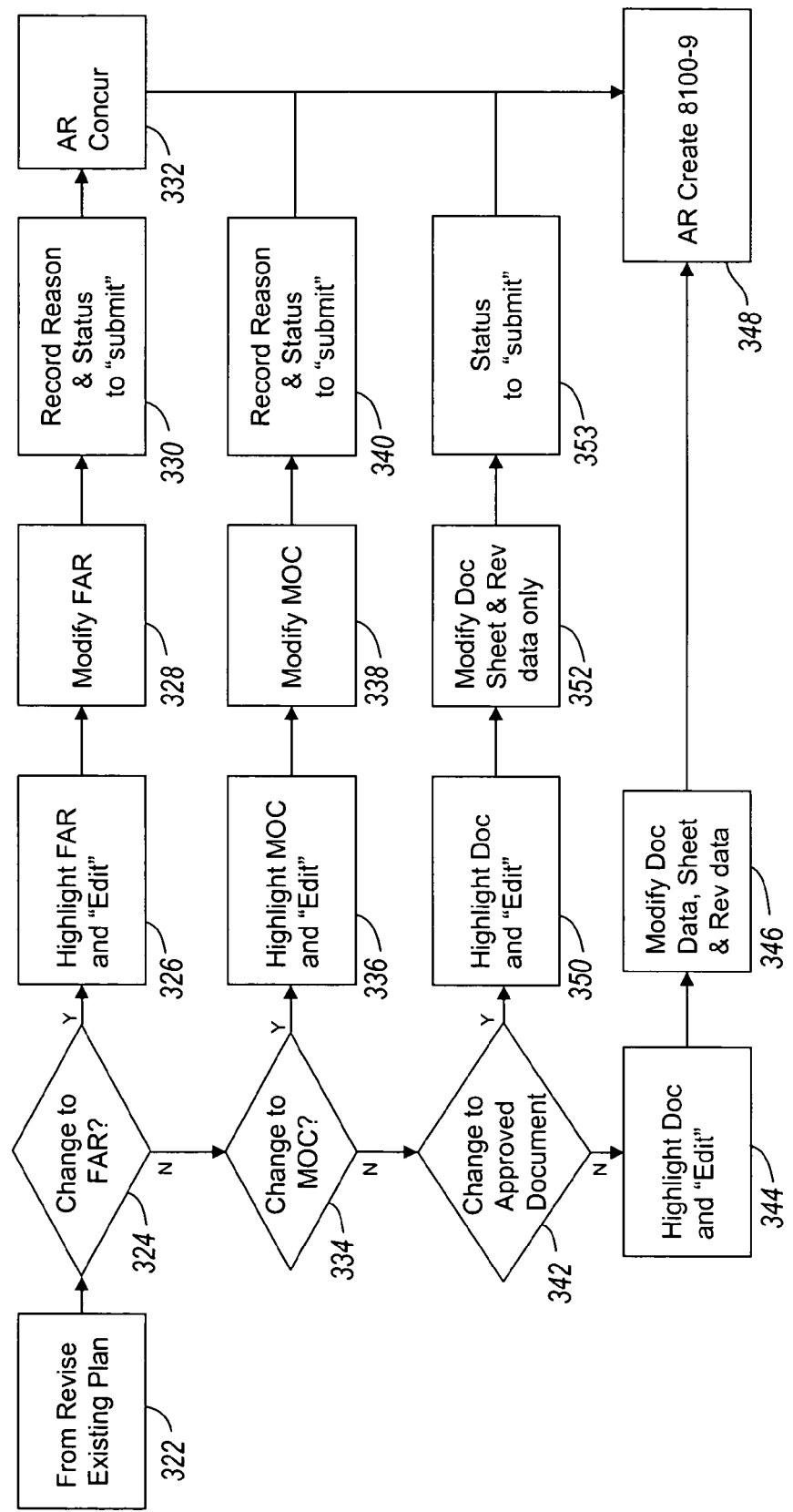
FIG. 54 is a simplified block diagram showing the process flow used to edit an approved plan.
Figure 54A:
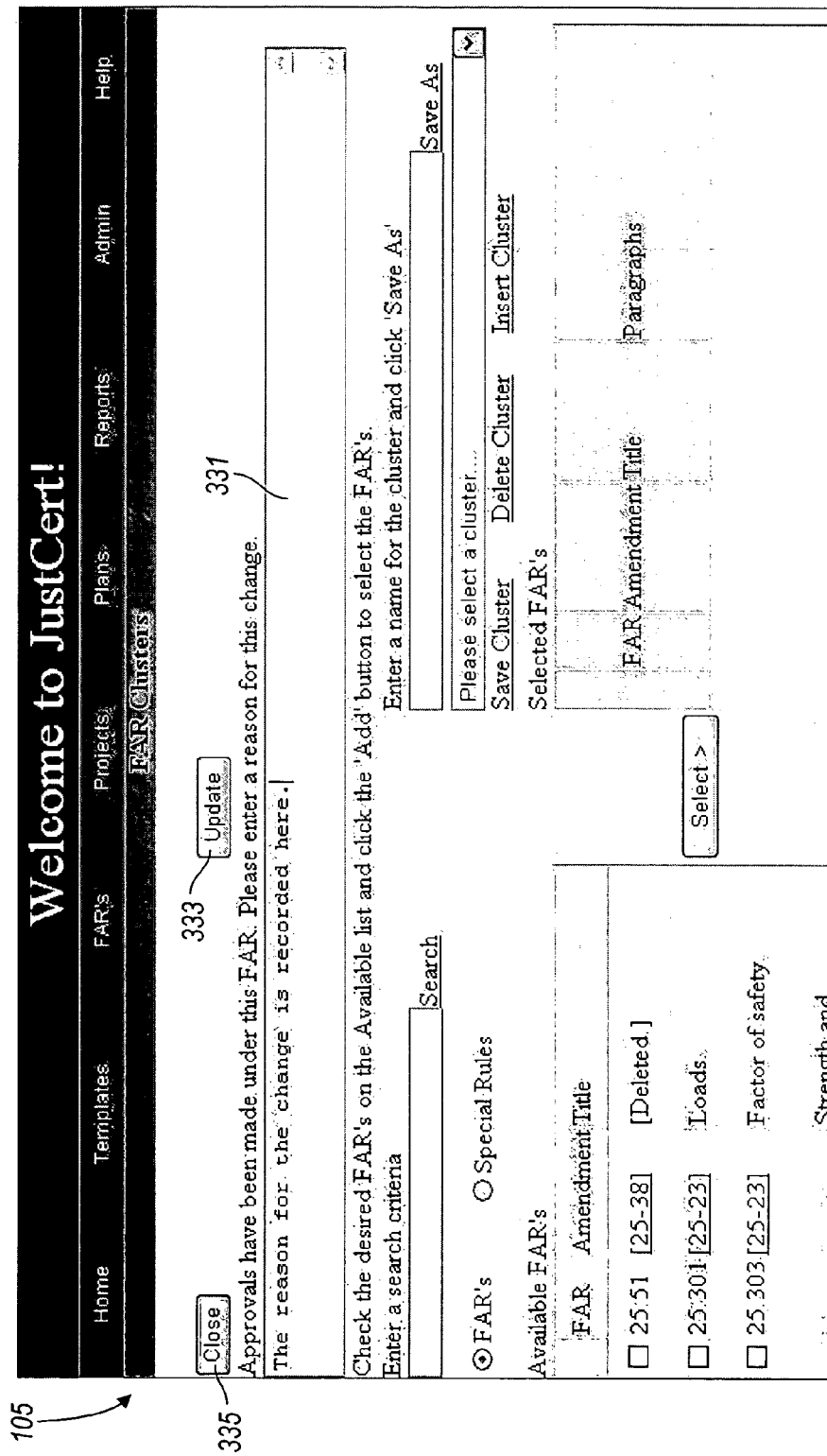
FIG. 54a illustrates the "FAR Clusters" screen and a procedure used to record a change to the plan.

If the requirement to revise the existing plan requires editing of a concurred plan and there are sibling documents in "approved" status, the certification tool 10 enables changes based on the desired revision at operation 322. With reference to FIG. 54, if the requirement for the revision is to the FARs, at operation 324, the effected FARs are highlighted at operation 326, and the focal user B selects an "Edit" button 325 (FIG. 39) and modifies the FARs at operation 328, as previously described herein. The certification tool 10 will record the reason for the change at operation 330. In order to record the reasons for change, with reference to FIG. 54a, the certification tool 10 displays the "FAR Clusters" screen 105 with a text box 331. The text box 331 enables the reason for change to the approvals of the FARs to be entered. Once entered, the focal user B selects one "Update" button 333 to save the reason for change in the database 14. Then, the certification tool 10 revises the status of the branches under the FAR to "submitted." The certification tool 10 will provide revised information regarding the changes to the conformity requirement to an unspecified external system, which will show the change in the status (not shown). The authorized user C will have to grant subsequent concurrence at operation 332, as previously described herein.

If, however, the requirement for revision to the concurred plan is to change the MOC at operation 334, the focal user B highlights the MOC, selects an "Edit" button 325 (FIG. 41) at operation 336 and modifies the MOC at operation 338, as previously described herein. A reason for the change will be recorded at operation 340. The concurrence of the authorized user C is not required to approve changes to the MOC.

If, however, the requirement for revision to the certification plan 10 requires a change to a document title (FIG. 42 at 201), document number (FIG. 42 at 202) or document type (FIG. 42 at 200) at operation 342, the change is permitted if the document is not in "approved" status. The focal user B then highlights the document, selects the "Edit" button 325 (not specifically shown) in operation 344, and then in operation 346 modifies the document data, sheet and revision data of the document. Then, the authorized user can create the 8100-9 form in operation 348.

If the document is in the "approved" status, then editing is limited to the sheet/revision data associated with the document in operation 342. The focal user B then highlights the document, selects the "Edit" button 325 (not specifically shown) in operation 350 and modifies the document sheet and revision data in operation 352. After the sheet/revision data for the document is revised for an "approved" document, in operation 353, the status is revised to "submitted" for the document. Then, the document status is set to "update," indicating that a revision to the existing approval may be required (not shown).

Figure 55:
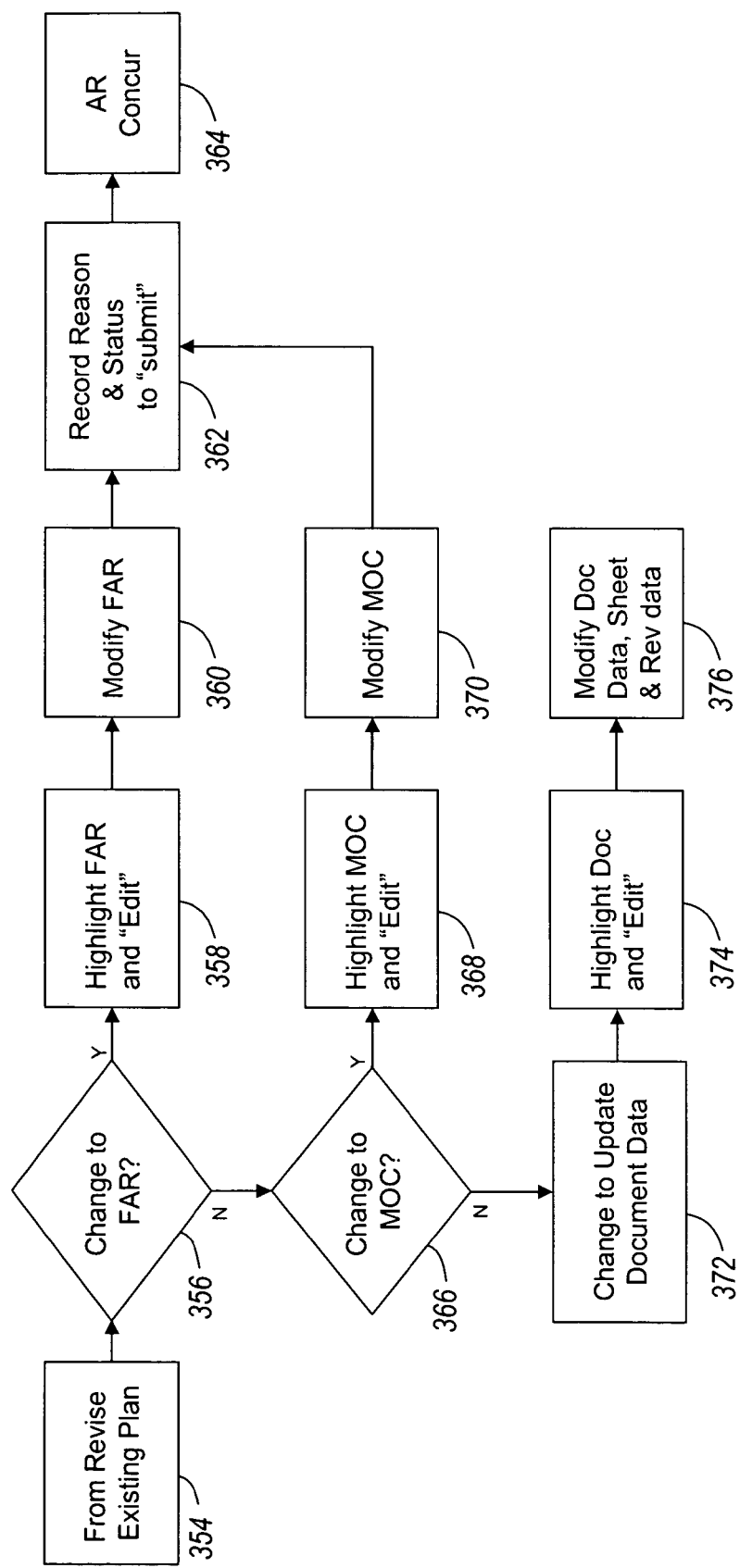
FIG. 55 is a simplified block diagram showing the process flow used to edit a concurred plan.

With reference back to FIG. 53, if the requirement to revise the existing certification plan requires editing of a concurred plan and there are not any sibling documents in "approved" status, the concurred plan is edited in operation 354. With reference to FIG. 55, the certification tool 10 enables revisions to a concurred plan depending upon the type of revision desired. If the requirement for the revision is to the FARs at operation 356, then the effected FARs are highlighted, and the focal user B selects the "Edit" button 325 (FIG. 39) at operation 358 and modifies the FARs at operation 360, as previously described herein. The certification tool 10 will record the reason for the change (FIG. 54 at 332) and revise the status to "submitted" at operation 362. The authorized user C will have to grant subsequent concurrence at operation 364 for this revision, as previously described herein.

If, however, the requirement is to modify the MOC at operation 366, then the effected MOC are highlighted, and the focal user B selects the "Edit" button 325 (FIG. 41) at operation 368 and modifies the MOC at operation 370, as previously described herein. The reason for the revision is then recorded and the status is changed to "submitted" at operation 362. The authorized user C will have to grant subsequent concurrence at operation 364 for this revision, as previously described herein.

If, however, the requirement for revision to the certification plan is to update document data at operation 372, the document properties are changed by highlighting the document and selecting the "Edit" button 325 (not specifically shown) in operation 374. Then, in operation 376, the focal user B modifies the document data, sheet data and revision data. After the revised certification plan has been concurred in operation 364 by the authorized users C, the certification tool 10 continues to execute the certification plan in module 22, as shown in FIG. 1.

To execute the certification plan in module 22, the certification tool 10 can monitor an external database (not shown) for receipt of the completed compliance documents. Once the certification tool 10 locates completed compliance documents corresponding to the compliance documents in the certification plan, the certification tool 10 copies the current document sheet and revision status, includes those records with the document record in the certification plan, and notifies the authorized user C assigned to that aspect to review the document. If the compliance document is of the type that is not maintained in the external database, then the focal user B has the responsibility of manually inputting these documents into the certification plan and notifying the authorized user C. As the compliance documents are updated or received from the external database, the authorized users C review the documents and make a determination of compliance. If the authorized user C determines the documents can be approved, the authorized user C will prepare the Form 8100 (operation 400 in FIG. 57) which contains notes and approval record information required for the certification tool 10 to produce a FAA 8100-9 approval.

Figure 57:
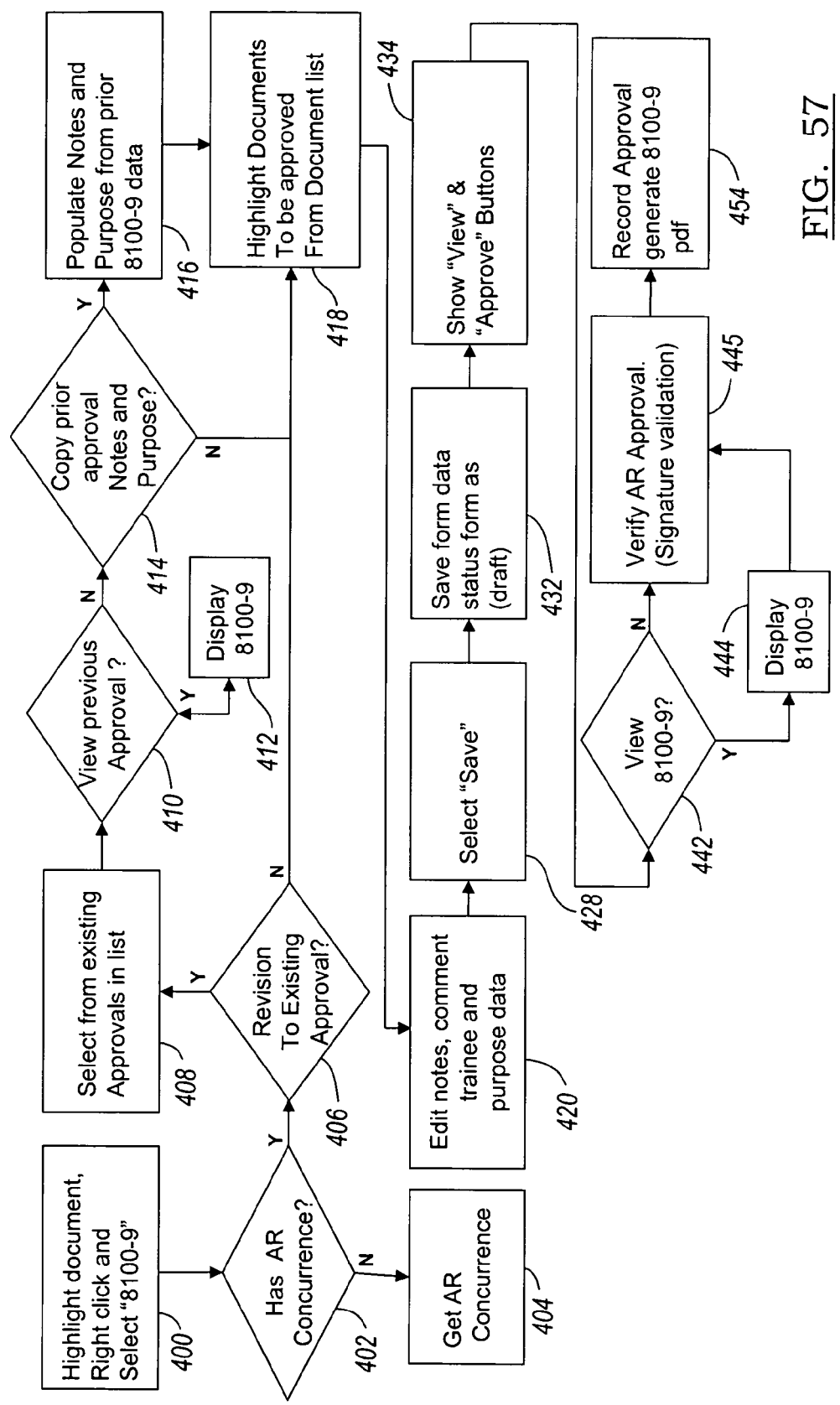
FIG. 57 is a simplified block diagram showing the process flow used for compliance review and data approval.
Figure 58:
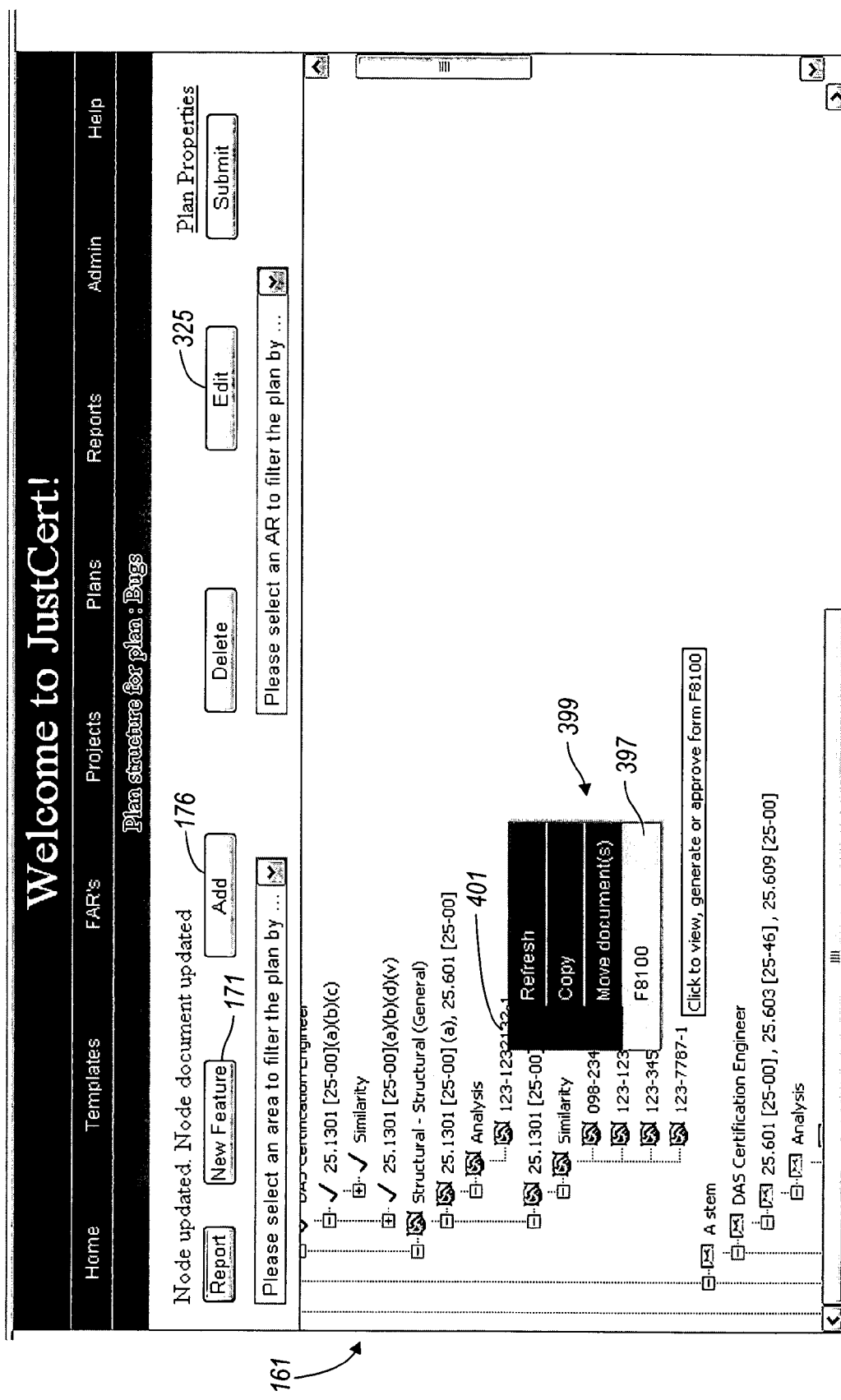
FIG. 58 illustrates the "Plan structure" screen and a first procedure used by the AR to grant compliance approval to that portion of the plan.

With reference now to FIG. 57, a method is provided for a authorized user C to document data review and approval. After the initial compliance review of the certification plan is complete, the authorized users C, from the "Plan structure" screen 161 as shown in FIG. 58, highlight a desired document 401, then right-click and select a "F8100" selection 397 from the right-click menu 399 at operation 400 of FIG. 57. At operation 402, the certification tool 10 determines if there has been concurrence from the authorized users C. If there has been no concurrence, then in operation 404, the certification tool 10 gets concurrence from the authorized users C.

If there has been concurrence from the authorized users C, following an external review of the document 401, and if the authorized users C determine the document can be approved, then beginning in operation 406, the certification tool 10 records the approval action. The certification tool 10 determines if the approval is a revision to or supercession of an existing approval. If the approval is a revision to or supercession of an existing approval, then in operation 408, the authorized users C select from existing approvals, as shown in 462 FIG. 64. In operation 410, the authorized users C can view a selected previous approval. If the authorized users C decide to view the previous approval, the certification tool 10 will display the prior 8100-9 form (not shown) in operation 412. If the authorized users C decide not to view the previous approval, then at operation 414, authorized users C can choose to copy the content from the selected previous approval to a new Form 8100. Then, in operation 416, the certification tool 10 will populate notes and the purpose data from the selected Form 8100 form to a new Form 8100. The certification tool 10 then goes to operation 418.

If, however, in operation 406 the certification tool 10 determines the approval is not a revision or supercession of an existing approval, a Form 8100 is presented for the authorized user C to select at operation 418 the document(s) 401 (FIG. 59) to be included on the approval.

Figure 59:
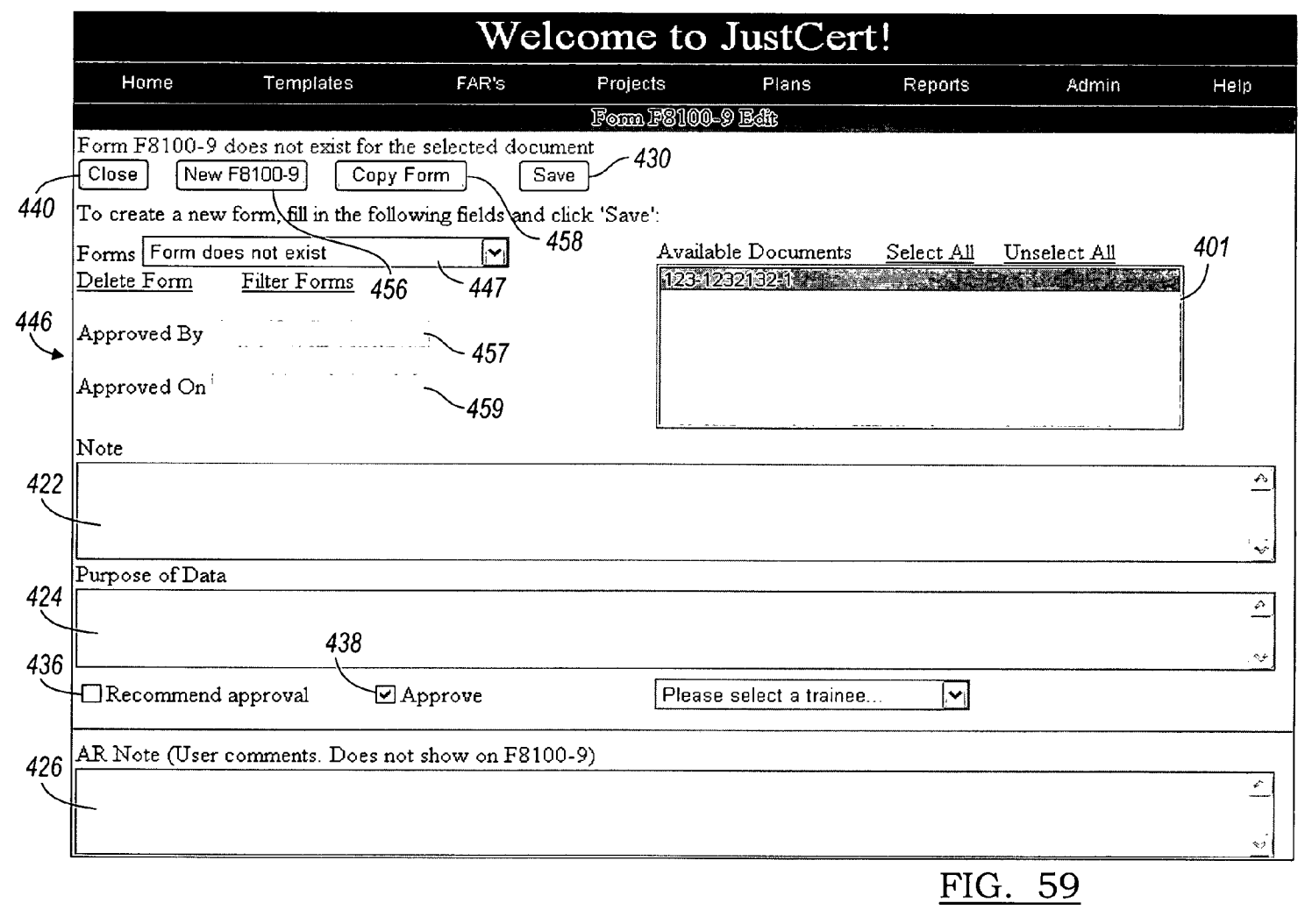

At operation 420 of FIG. 57, the authorized user C can then enter or modify the comments to appear on the 8100-9 form in a "Notes" dialog box 422, as shown in FIG. 59. The authorized user C enters the purpose of the data in a text box 424.

The authorized user C can then select "Recommend approval" 436 or "Approve" 438. As the FAA reserves certain responsibilities for approval that it determines to be "inherently governmental functions," the authorized user C is responsible to assess the compliance document that is submitted and to provide to the FAA a written recommendation that the data under consideration is acceptable (recommended approval). The process for making a recommendation is the same as the process for approval of data, except the authorized user C is not permitted to complete a final determination. The certification tool 10 will recognize the recommended approval as a final approval, as there is no additional action required from the authorized user C. The compliance documents and the recommendation from the authorized user C are transmitted to the FAA for FAA approval (not shown). If desired, the authorized user C can also enter comments to be saved to the database 14 regarding the plan that are not displayed on the 8100-9 form in a text box 424.

In operation 428 (FIG. 57) the authorized user C can then select the "Save" button 430 to save the Form 8100 form to the database 14, or the "Close" button 440 to abandon the Form 8100 form.

Figure 60:
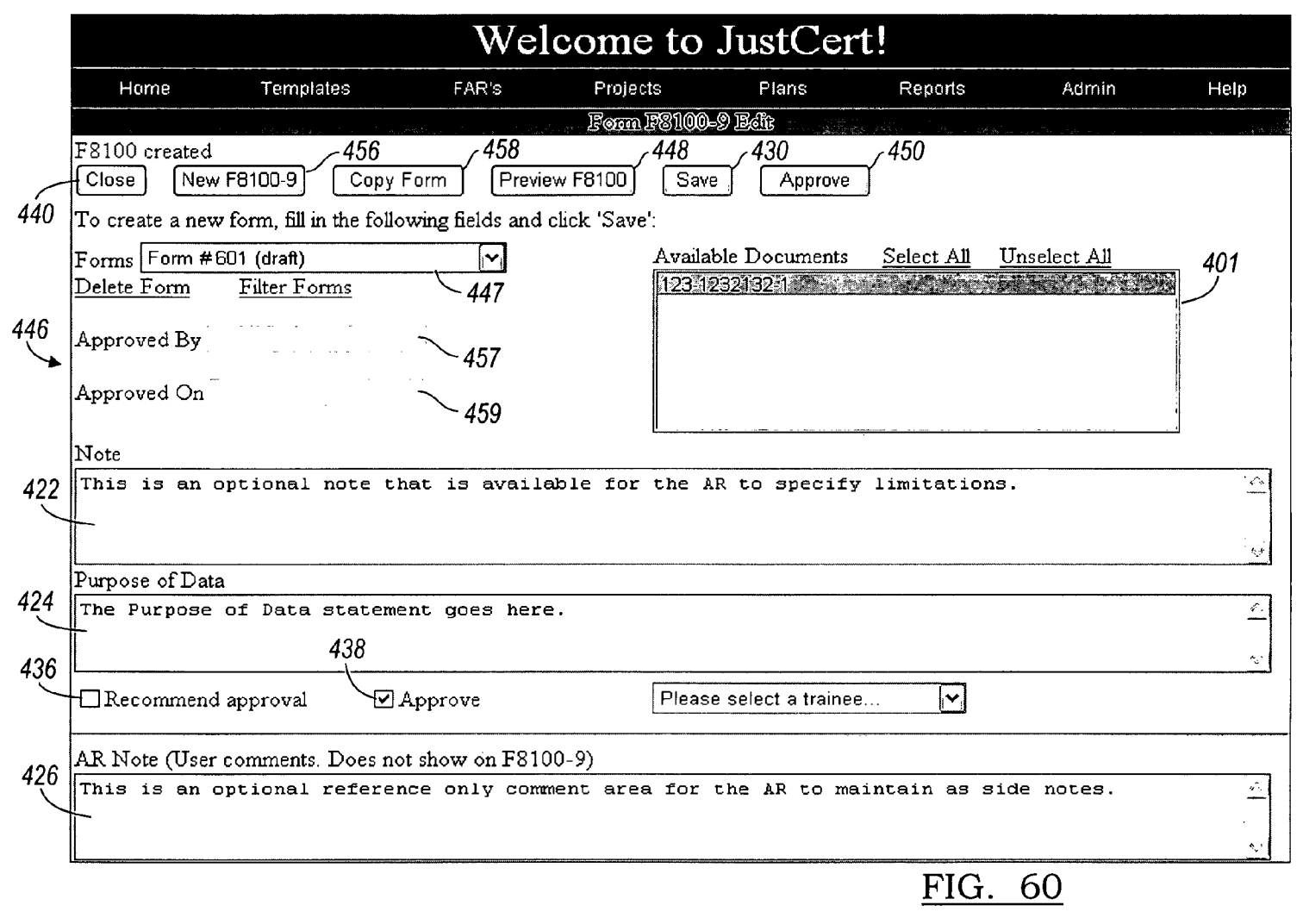

In operation 432 the certification tool 10 saves the data entered in the Form 8100 and in operation 434, the certification tool 10 displays the "Preview F8100" 448 and "Approve" selection 450, as shown in FIG. 60.

In operation 442, the authorized user C can decide to display the 8100-9 form and, if desired, in operation 444, the certification tool 10 displays the 8100-9 data (FIG. 57).

Figure 61:
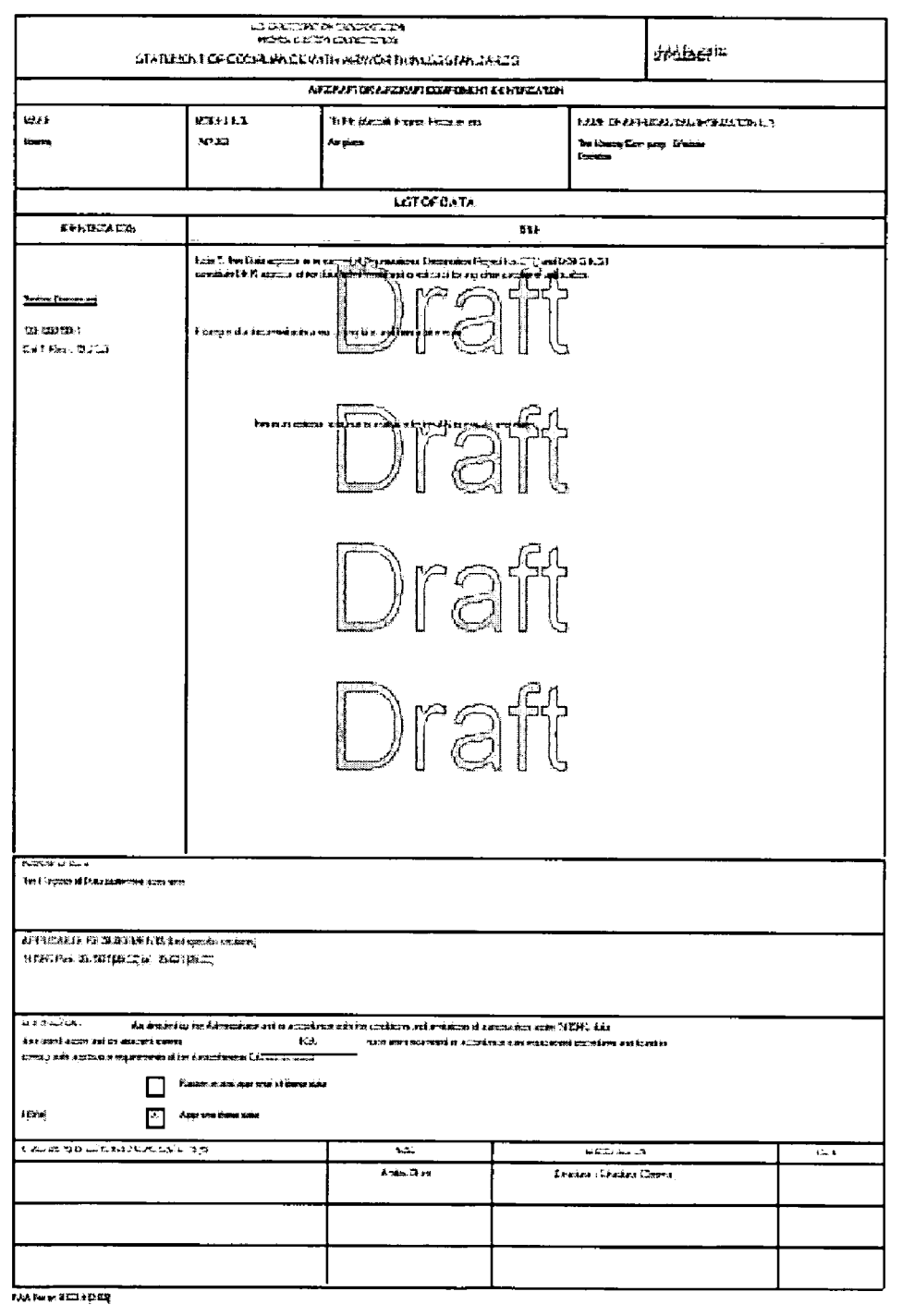
Figure 62:
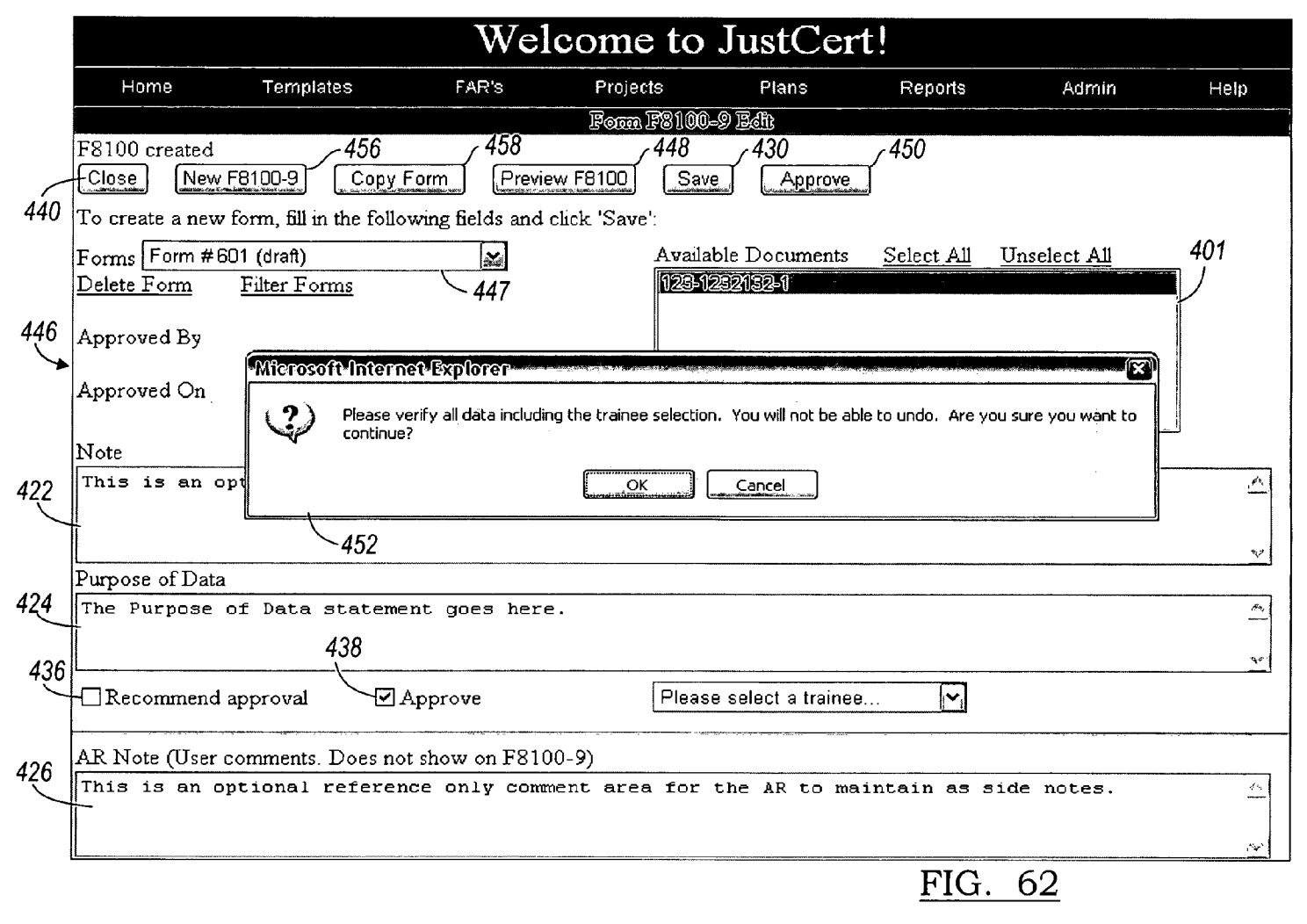
Figure 63:
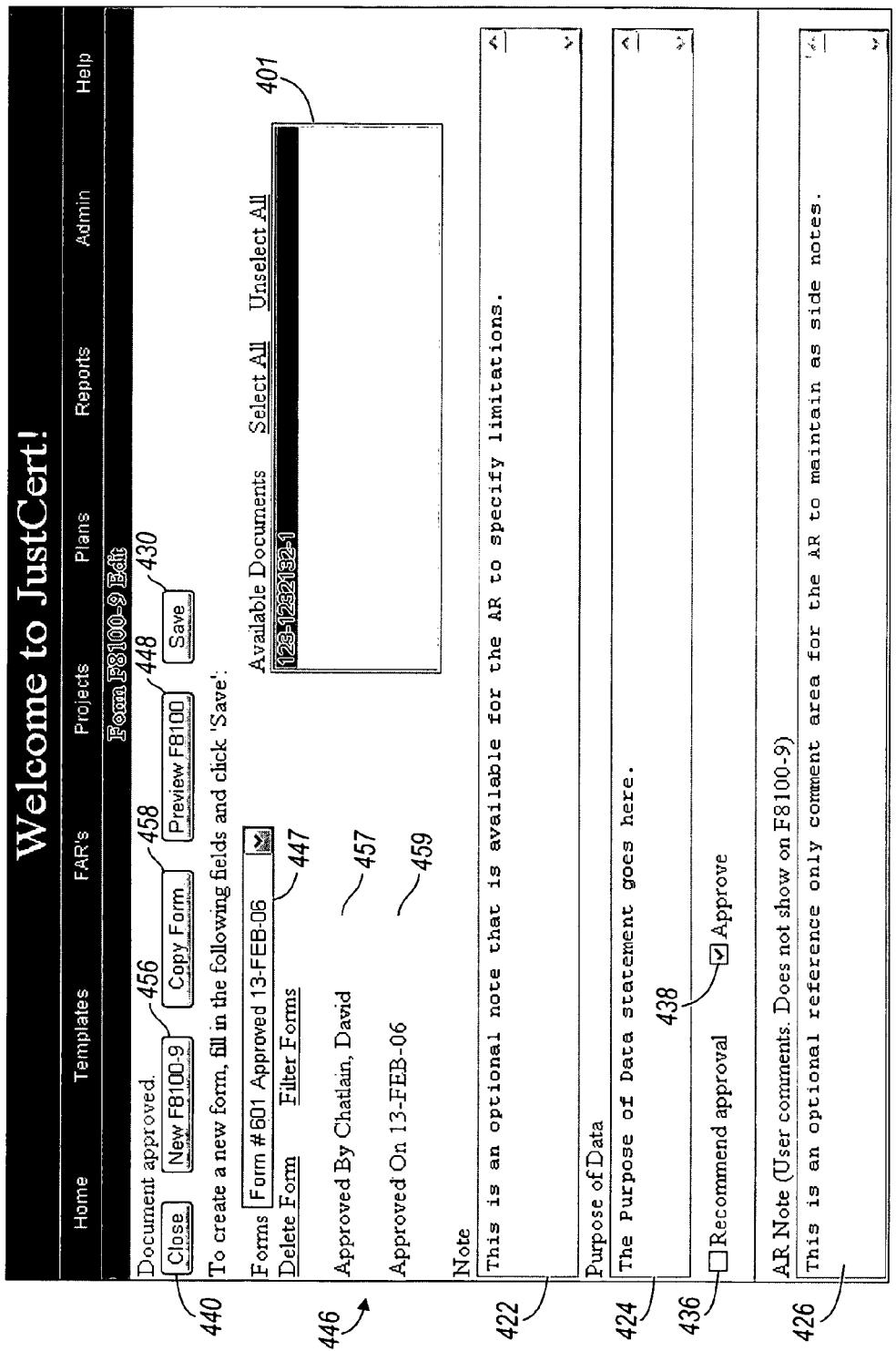
FIG. 63 illustrates an approved Form 8100-9 as indicated on the "Form F8100-9 Edit" screen.

With additional reference to FIG. 60, after the authorized user C has saved the Form 8100 form, the "Form F8100-9 Edit" screen 446 includes a "Preview F8100" button 448 to display the FAA Form 8100-9 report (FIG. 61). In operation 445, the certification tool 10 generates the Form 8100 form into a desired format (such as .pdf file format by the Adobe utility) and displays the report, as shown in FIG. 61, upon the authorized user C selecting the "Preview F8100" button 382 (FIG. 60). If the authorized user C selects "Approved," there will be a prompted message 452 to confirm the approval as shown in FIG. 62. If responded in the affirmative, the certification tool 10 will record the approval, update the status for the document and prepare a permanent file for the record as shown in FIG. 57 at operation 454. Once the form is approved, the authorized user C granting approval will be displayed in an "Approved By" box 457 along with a date of approval displayed in an "Approved On" box 459, as shown in FIG. 63. In operation 445 (FIG. 52), if the authorized user C chooses to not approve, they can select the "close" button 440 (FIG. 60).

As best shown in FIGS. 62 and 63, a "Tracker Number" 460 specific to the form will also be displayed on the "Form F8100-9 Edit" screen 446 in a drop-down list 447. The "Tracker Number" 460 will be shown on the 8100-9 form and may additionally be included on the form as a barcode (not shown). The "Tracker Number" 460 for the form will also include in parenthesis a status field 462 of the form. For example, if the status field 462 of the form is listed as "draft," then the form has not been approved. An "draft" form can be deleted by highlighting the form and selecting the "Delete Form" selection 464. If the form is approved, the status field 390 will have an approval date field 394 and cannot be deleted (FIG. 63).

With reference to FIG. 64, once the authorized user C has completed document approval, if some aspect of the approved document changes and it is necessary to revise the approval (FIG. 57 at operation 406) (for instance, if the revision level of the document was changed) to supersede the existing approval, the authorized user C can display the plan and highlight the document to be approved (FIG. 44), then right-click and select "F8100" from the right-click menu 399. The "Form F8100-9 Edit" screen 446 will appear with the selected document highlighted. The existing approvals for the selected document will appear in the drop-down list 447. If multiple documents are selected, all of the existing forms for each document will appear in the drop-down list 447. The authorized user C can pull down the list and select a prior approval (FIG. 57, operation 408). The note data from the selected approval will be populated onto the form. If the authorized user C chooses the "Close" button 440, the form will be abandoned. If the authorized user C chooses the "New F8100-9" button 456, the form will be cleared and a new form number will be established with a "draft" status field 462. If the authorized user C chooses a "Copy Form" button 458, the data that is currently displayed on the form will be copied to a new form number with an "draft" status field 462 (FIG. 57, operation 414). The authorized user C can edit any of the data associated with the new form and when it is "Saved," as previously discussed herein, the authorized user C will be presented with options to preview and approve the form (FIG. 57, operation 410). When the approval for the revised form is completed, the certification tool 10 will revise the status of the document to "approved." The certification tool 10 will continue to execute the plans within the project until all of the documents within the plans are in the approved status.

Figures 65, 66:
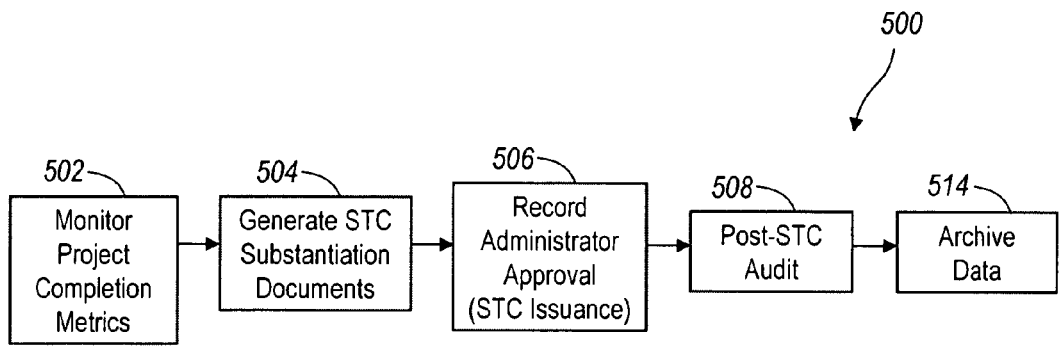
FIG. 65 is a simplified block diagram showing the process flow used to complete the project.
FIG. 66 illustrates the "Project Properties" screen of the software and a procedure used for promoting the project status.

With reference back to FIG. 1, once the authorized users C have approved each document, the certification tool 10 can provide the status to originating user A, who may begin the project completion tasks 24. With reference to FIG. 65, in operation 500, the certification tool 10 verifies project complication and issues the "project compliance summary" document. The "project completion document" contains a comprehensive summary, in a specified format, of all of the compliance activity.

In operation 502, the certification tool 10 can provide project status metrics to the originating user A, the focal user B and the authorized users C, or other external users who can monitor the project completion in the certification tool 10. The certification tool 10 can provide the status of all plans within the project. Typical metrics, which are supplied through the "Reports" menu tab 503 (FIG. 4) from the certification tool 10, include plan progress (such as draft to concurred to complete), percentage completion (such as document approval), time phased progress metrics, and any plan revisions that occurred after the date the project status advanced from "draft" to "work in progress." The project completion metrics can be available by the project or the certification area specialty. Additional reports can be available that describe compliance documentation to facilitate an audit of the certification file, if needed.

In operation 504, at the direction of the originating user A, after each plan within the project has been completely approved, the certification tool 10 generates type certification substantiation documents in a specified format. The final approval in the certification process is issued by a DAS Administrator H in operation 506. The DAS Administrator H is an authorized user C with administrative responsibility for the project. When the DAS Administrator H has completed review of the "Type Certification" documents, if the documents are approved, an FM Form 8100-9 is approved by the DAS Administrator H using the approval process described herein. The certification tool 10 records the DAS Administrator H approval and modifies the project status to "Audit." Following DAS Administrator H approval, at the direction of the originating user A, the certification tool 10 provides additional special reports, in a specified format, to support issuance of the certification (for instance; "Type Certificate", "Supplemental Type Certificate" or "Amended Type Certificate," as defined in Title 14 of Code of Federal Regulations, Part 21).

In operation 508, after the issuance of the certification, at the direction of the originating user A, the certification tool 10 changes the status of the certification plan to "Audit." A physical audit of the project records is completed to ensure that each approved document is available in the project files. The certification tool 10 can provide specified reports, available from the "Reports" menu tab 503 (FIG. 4), to support the audit activity. When the project is in the "Audit" status, the focal user B and the authorized users C are not permitted to modify any records. During the "Audit" status, the originating user A is permitted limited editing of the records for completeness. In order to promote the project to "Audit," the originating user A selects the desired project from the "Project Properties" screen 38 and selects "Edit." With reference to FIG. 66, for completion from the "Project Properties" screen 38, a completion date is entered in a text box 510 and the originating user A then selects the "Promote" button 512. The certification tool 10 then assigns the certification project an "Audit" status.

With reference to FIG. 65, once the originating user A has completed the audit of the certification project in operation 508, the certification project is assigned "Archive" status in operation 514. Once the certification project is assigned "Archive" status, the certification project cannot be edited, and the certification project is stored by the certification tool 10 in the database 14. In order to promote the project to "Archive," the originating user A selects the desired project from the "Project Properties" screen 38 and selects "Edit." With reference to FIG. 66, for completion from the "Project Properties" screen 38, a completion date is entered in a text box 510 and the originating user A then selects the "Promote" button 512. The certification tool 10 then assigns the "Archive" status. The data from the completed project is maintained within the certification tool 10 under the data retention requirements of the FAA, and remains available to support any additional requirements for the data that may eventuate.

While various embodiments have been described, those skilled in the art will recognize modifications or variations which might be made without departing from the inventive concept. The examples illustrate the disclosure and are not intended to limit it. Therefore, the description and claims should be interpreted liberally with only such limitation as is necessary in view of the pertinent prior art.

What is claimed is:

1. A method of preparing a certification project plan for certifying compliance for a mobile platform project with pre-defined regulations in a software system, the method comprising:
    using a computer system to run the software system;
    defining a project in the software system;
    defining a certification plan for the project in the software system;
    defining a plurality of elements associated with the project;
    providing a screen display in communication with the computer system;
    using the screen display to allow a user to select a different authorized representative, from a plurality of displayed names of authorized representatives along with a displayed indication of an area of expertise of each one of the authorized representatives, such that a specific authorized representative is selected for each of the elements;
    verifying the completion of the certification plan; and
    generating at least one document to indicate that the mobile platform is in compliance based on the completed certification plan.

2. The method of claim 1, further comprising:
    defining a certification basis for each of the elements in the project to form the certification plan.

3. The method of claim 2, further comprising:
    selecting at least one of the authorized representatives to each of the elements; and
    selecting at least one means of compliance (MOC) for each of the elements.

4. The method of claim 1, further comprising:
    providing a database including the regulations and further including special regulations;
    determining which of the regulations applies to each of the elements to form the certification basis for the element; and
    forwarding the determined regulations for each element to the authorized representative associated with the element for approval.

5. The method of claim 4, further comprising:
    selecting additional regulations to be added to the certification basis for the element.

6. The method of claim 5, further comprising:
    providing a database of a plurality of compliance documents associated with the regulations; and
    determining which of the plurality of compliance documents demonstrate compliance with the regulations.

7. The method of claim 6, further comprising:
    inputting data into the determined compliance documents to release the compliance documents for use with the certification plan;
    submitting the certification plan for approval by the authorized representatives; and
    accepting electronic approval of the certification plan by the authorized representatives to complete the certification plan.

8. The method of claim 7, further comprising:
    monitoring the release of documents; and
    notifying the authorized representative associated with the element whose compliance basis includes the released documents that the document is available for review.

9. The method of claim 1, further comprising:
    providing a database of a plurality of projects;
    defining the project by copying one of the projects in the database into the project; and
    modifying the copied project as necessary to define the project.

10. A method of preparing a certification project plan for certifying compliance for a project with regulations in a software system that runs on a computer, the method comprising:
    defining the project in the software system, which runs on the computer, the project including a plurality of elements;
    defining a certification basis for the element in the software system;
    selecting authorized representatives based on their delegated authorities from a database for the certification of the plurality of elements of the project;
    the system providing a display screen that displays names of authorized representatives adjacent to a displayed area of expertise of each one of the authorized representatives, and a selection box that enables a user to select specific ones of the displayed names of the authorized users;

selecting a means of compliance (MOC) of the element; and transmitting the certification basis for the element including the MOC to the authorized representatives for approval.

11. The method of claim 10, further comprising:

providing a database including the regulations;

determining which of the regulations applies to the element to form the certification basis for the element; and forwarding the determined regulations with the certification basis for the element to the authorized representative associated with the element for approval.

12. The method of claim 11, further comprising:

modifying the determined regulations to include or remove regulations.

13. The method of claim 12, further comprising:

providing a database of a plurality of compliance documents associated with the regulations; and determining which of the plurality of compliance documents demonstrate compliance with the regulations.

14. The method of claim 13, further comprising:

inputting data into the determined compliance documents to release the compliance documents for review with the certification basis;

compiling the released compliance documents associated with the element into a certification plan for the project including all elements associated with the project;

submitting the certification plan for approval by the authorized representatives; and accepting electronic approval of the certification plan by the authorized representatives to complete the certification plan.

15. The method of claim 11, further comprising:

providing a database of a plurality of elements;

defining the project by copying one of the elements in the database into the project; and modifying the copied element if necessary to define the element associated with the project.

* * * * *